(12) United States Patent
Hou et al.

(10) Patent No.: US 10,480,280 B2
(45) Date of Patent: Nov. 19, 2019

(54) DOWNHOLE TOOL AND METHOD OF USE

(71) Applicant: Downhole Technology, LLC, Houston, TX (US)

(72) Inventors: Yanan Hou, Houston, TX (US); Luis Miguel Avila, Houston, TX (US); Evan Lloyd Davies, Houston, TX (US); Duke Vanlue, Tomball, TX (US)

(73) Assignee: The WellBoss Company, LLC, Houston, TX (US)

( * ) Notice: Subject to any disclaimer, the term of this patent is extended or adjusted under 35 U.S.C. 154(b) by 119 days.

(21) Appl. No.: 15/899,147

(22) Filed: Feb. 19, 2018

(65) Prior Publication Data

US 2018/0171748 A1 Jun. 21, 2018

Related U.S. Application Data

(63) Continuation of application No. PCT/US2017/062379, filed on Nov. 17, 2017.
(Continued)

(51) Int. Cl.
*E21B 33/134* (2006.01)
*E21B 33/129* (2006.01)
(Continued)

(52) U.S. Cl.
CPC .......... *E21B 33/134* (2013.01); *E21B 33/124* (2013.01); *E21B 33/128* (2013.01);
(Continued)

(58) Field of Classification Search
CPC ... E21B 33/134; E21B 33/128; E21B 33/1285
See application file for complete search history.

(56) References Cited

U.S. PATENT DOCUMENTS

| 2,230,712 A | 2/1941 | Bendeler et al. |
| 2,683,492 A | 7/1954 | Baker |

(Continued)

FOREIGN PATENT DOCUMENTS

| EP | 0504848 | 9/1992 |
| EP | 0890706 | 1/1993 |

(Continued)

OTHER PUBLICATIONS

International Preliminary Report on Patentability, PCT/US2012/051938, 6 pages, dated Feb. 25, 2014.
(Continued)

*Primary Examiner* — D. Andrews
(74) *Attorney, Agent, or Firm* — Rao DeBoer Osterrieder, PLLC; John M. DeBoer

(57) ABSTRACT

A downhole tool suitable for use in a wellbore that includes a wedge mandrel having a distal end; a proximate end; an outer surface; and a flowbore extending through the wedge mandrel from the proximate end to the distal end. The tool includes a fingered member disposed around the wedge mandrel. The tool includes a ball seat insert made of a reactive metal-based material, the ball seat insert disposed in the flowbore and engaged with a first set of threads. The tool includes a support platform disposed in the flowbore and engaged with a second set of threads.

20 Claims, 37 Drawing Sheets

Related U.S. Application Data

(60) Provisional application No. 62/423,620, filed on Nov. 17, 2016.

(51) Int. Cl.
*E21B 33/128* (2006.01)
*E21B 33/124* (2006.01)
*E21B 33/12* (2006.01)

(52) U.S. Cl.
CPC ...... *E21B 33/1208* (2013.01); *E21B 33/1285* (2013.01); *E21B 33/1293* (2013.01)

(56) References Cited

U.S. PATENT DOCUMENTS

| | | |
|---|---|---|
| 2,797,758 A | 7/1957 | Showalter |
| 3,163,225 A | 12/1964 | Perkins |
| 3,343,607 A | 9/1967 | Current |
| 3,422,898 A | 1/1969 | Conrad |
| 3,687,196 A | 8/1972 | Mullins |
| 3,769,127 A | 10/1973 | Goldsworthy et al. |
| 3,776,561 A | 12/1973 | Haney |
| 4,359,090 A | 11/1982 | Luke |
| 4,388,971 A | 6/1983 | Peterson |
| 4,436,150 A | 3/1984 | Barker |
| 4,437,516 A | 3/1984 | Cockrell |
| 4,440,223 A | 4/1984 | Akkerman |
| 4,469,172 A | 9/1984 | Clark |
| 4,711,300 A | 12/1987 | Wardlaw et al. |
| 4,784,226 A | 11/1988 | Wyatt |
| 5,025,858 A | 6/1991 | Glaser |
| 5,048,606 A | 9/1991 | Allwin |
| 5,113,940 A | 5/1992 | Glaser |
| 5,147,857 A | 9/1992 | Raddatz et al. |
| 5,224,540 A | 7/1993 | Streich et al. |
| 5,246,069 A | 9/1993 | Glaser et al. |
| 5,253,714 A | 10/1993 | Davis et al. |
| 5,333,685 A | 8/1994 | Gilbert |
| 5,376,200 A | 12/1994 | Hall |
| 5,449,040 A | 9/1995 | Milner |
| 5,484,040 A | 1/1996 | Penisson |
| 5,819,846 A | 10/1998 | Bolt et al. |
| 5,839,515 A | 11/1998 | Yuan et al. |
| 5,842,517 A | 12/1998 | Coone |
| 5,927,403 A | 7/1999 | Dallas |
| 5,967,352 A | 10/1999 | Repp |
| 5,984,007 A | 11/1999 | Yuan |
| 6,167,963 B1 | 1/2001 | McMahan et al. |
| 6,241,018 B1 | 6/2001 | Eriksen |
| 6,353,771 B1 | 3/2002 | Southland |
| 6,354,372 B1 | 3/2002 | Carisella et al. |
| 6,425,442 B1 | 7/2002 | Latiolais et al. |
| 6,491,116 B2 | 12/2002 | Berscheidt et al. |
| 6,578,638 B2 | 6/2003 | Guillory |
| 6,708,768 B2 | 3/2004 | Slup et al. |
| 6,712,153 B2 | 3/2004 | Turley et al. |
| 6,899,181 B2 | 5/2005 | Simpson et al. |
| 7,044,230 B2 | 5/2006 | Starr et al. |
| 7,087,109 B2 | 8/2006 | Bredt et al. |
| 7,093,664 B2 | 8/2006 | Todd et al. |
| 7,255,178 B2 | 8/2007 | Slup et al. |
| 7,350,569 B2 | 4/2008 | Collins et al. |
| 7,350,582 B2 | 4/2008 | McKeachnie et al. |
| 7,475,736 B2 | 1/2009 | Lehr et al. |
| 7,484,940 B2 | 2/2009 | O'Neill |
| 7,735,549 B1 | 6/2010 | Nish et al. |
| 7,740,079 B2 | 6/2010 | Clayton et al. |
| 7,753,416 B2 | 7/2010 | Mazzaferro et al. |
| 7,762,323 B2 | 7/2010 | Frazier |
| 7,980,300 B2 | 7/2011 | Roberts et al. |
| 8,002,030 B2 | 8/2011 | Turley et al. |
| 8,016,295 B2 | 9/2011 | Guest et al. |
| 8,079,413 B2 | 12/2011 | Frazier |
| 8,113,276 B2 | 2/2012 | Greenlee et al. |
| 8,127,851 B2 | 3/2012 | Misselbrook |
| 8,167,033 B2 | 5/2012 | White |
| 8,205,671 B1 | 6/2012 | Branton |
| 8,211,248 B2 | 7/2012 | Marya |
| 8,231,947 B2 | 7/2012 | Vaidya et al. |
| 8,267,177 B1 | 9/2012 | Vogel et al. |
| D673,182 S | 12/2012 | Frazier |
| 8,336,616 B1 | 12/2012 | McClinton |
| 8,381,809 B2 | 2/2013 | White |
| 8,459,346 B2 | 6/2013 | Frazier |
| 8,469,088 B2 | 6/2013 | Shkurti et al. |
| 8,567,492 B2 | 10/2013 | White |
| 8,596,347 B2 | 12/2013 | Valencia et al. |
| 8,839,855 B1 | 2/2014 | McClinton et al. |
| 8,770,276 B1 | 7/2014 | Nish et al. |
| 8,770,280 B2 | 7/2014 | Buytaert et al. |
| 8,887,818 B1 | 11/2014 | Carr et al. |
| 8,893,780 B2 | 11/2014 | Greenlee et al. |
| 9,416,617 B2 | 8/2016 | Wiese et al. |
| 9,708,878 B2 | 7/2017 | Cooke, Jr. |
| 9,714,551 B2 | 7/2017 | Okura et al. |
| 9,790,763 B2 | 10/2017 | Fripp et al. |
| D806,136 S | 12/2017 | Saulou et al. |
| 9,845,658 B1 | 12/2017 | Nish et al. |
| 9,982,506 B2 | 5/2018 | Walton et al. |
| 2003/0188876 A1 | 10/2003 | Vick et al. |
| 2003/0226660 A1 | 12/2003 | Winslow et al. |
| 2003/0236173 A1 | 12/2003 | Dobson et al. |
| 2004/0003928 A1 | 1/2004 | Frazier |
| 2004/0045723 A1 | 3/2004 | Slup et al. |
| 2004/0216868 A1 | 11/2004 | Owen, Sr. |
| 2005/0183864 A1 | 8/2005 | Trinder |
| 2005/0194141 A1 | 9/2005 | Sinclair et al. |
| 2006/0243455 A1 | 11/2006 | Telfer |
| 2007/0039742 A1 | 2/2007 | Costa |
| 2007/0119600 A1 | 5/2007 | Slup et al. |
| 2008/0128133 A1 | 6/2008 | Turley et al. |
| 2008/0196879 A1 | 8/2008 | Broome et al. |
| 2008/0264627 A1 | 10/2008 | Roberts et al. |
| 2008/0277162 A1 | 11/2008 | DiFoggio |
| 2009/0038790 A1 | 2/2009 | Barlow |
| 2009/0090516 A1 | 4/2009 | Delucia et al. |
| 2009/0229424 A1 | 9/2009 | Montgomery |
| 2009/0236091 A1 | 9/2009 | Hammami et al. |
| 2010/0155050 A1 | 6/2010 | Frazier |
| 2010/0263876 A1 | 10/2010 | Frazier |
| 2010/0276159 A1 | 11/2010 | Mailand et al. |
| 2010/0326660 A1 | 12/2010 | Ballard et al. |
| 2011/0024134 A1 | 2/2011 | Buckner |
| 2011/0048740 A1 | 3/2011 | Ward et al. |
| 2011/0048743 A1 | 3/2011 | Stafford et al. |
| 2011/0088891 A1 | 4/2011 | Stout |
| 2011/0094802 A1 | 4/2011 | Vatne |
| 2011/0186306 A1 | 8/2011 | Marya et al. |
| 2011/0232899 A1 | 9/2011 | Porter |
| 2011/0259610 A1 | 10/2011 | Shkurti et al. |
| 2011/0277989 A1 | 11/2011 | Frazier |
| 2011/0290473 A1 | 12/2011 | Frazier |
| 2012/0061105 A1 | 3/2012 | Neer et al. |
| 2012/0125642 A1 | 5/2012 | Chenault et al. |
| 2012/0181032 A1 | 7/2012 | Naedler et al. |
| 2012/0234538 A1 | 9/2012 | Martin et al. |
| 2012/0279700 A1 | 11/2012 | Frazier |
| 2013/0032357 A1 | 2/2013 | Mazyar et al. |
| 2013/0048271 A1* | 2/2013 | VanLue ............... E21B 33/128 166/118 |
| 2013/0098600 A1 | 4/2013 | Roberts |
| 2013/0240201 A1 | 9/2013 | Frazier |
| 2013/0306331 A1 | 11/2013 | Bishop et al. |
| 2014/0020911 A1 | 1/2014 | Martinez |
| 2014/0027127 A1 | 1/2014 | Frazier et al. |
| 2014/0045731 A1 | 2/2014 | Daccord |
| 2014/0090831 A1 | 4/2014 | Young et al. |
| 2014/0116677 A1 | 5/2014 | Sherlin |
| 2014/0120346 A1 | 5/2014 | Rochen |
| 2014/0190685 A1 | 7/2014 | Frazier et al. |
| 2014/0224476 A1 | 8/2014 | Frazier |
| 2014/0345875 A1 | 11/2014 | Murphree et al. |
| 2014/0345878 A1 | 11/2014 | Murphree et al. |
| 2014/0374163 A1 | 12/2014 | Rui et al. |

(56) References Cited

U.S. PATENT DOCUMENTS

| | | |
|---|---|---|
| 2015/0013996 A1 | 1/2015 | Davies et al. |
| 2015/0068728 A1 | 3/2015 | Stage et al. |
| 2015/0083394 A1 | 3/2015 | Skarsen et al. |
| 2015/0144348 A1 | 5/2015 | Okura et al. |
| 2015/0239795 A1 | 8/2015 | Doud et al. |
| 2015/0252638 A1 | 9/2015 | Richards et al. |
| 2015/0275070 A1 | 10/2015 | Getzlaf et al. |
| 2015/0354313 A1 | 12/2015 | McClinton et al. |
| 2015/0368994 A1 | 12/2015 | Mhaskar et al. |
| 2016/0115759 A1 | 4/2016 | Richards et al. |
| 2016/0122617 A1 | 5/2016 | Murphree et al. |
| 2016/0123104 A1 | 5/2016 | Harris |
| 2016/0130906 A1 | 5/2016 | Garvey et al. |
| 2016/0160591 A1 | 6/2016 | Xu et al. |
| 2016/0201427 A1 | 7/2016 | Fripp et al. |
| 2016/0265305 A1 | 9/2016 | Davies et al. |
| 2016/0281458 A1 | 9/2016 | Greenlee |
| 2016/0305215 A1 | 10/2016 | Harris et al. |
| 2017/0044859 A1 | 2/2017 | Blair |
| 2017/0183950 A1 | 6/2017 | Gillis et al. |
| 2017/0260824 A1 | 9/2017 | Kellner et al. |
| 2017/0260825 A1 | 9/2017 | Schmidt et al. |
| 2017/0284167 A1 | 10/2017 | Takahashi et al. |
| 2017/0321514 A1 | 11/2017 | Crow |

FOREIGN PATENT DOCUMENTS

| | | |
|---|---|---|
| EP | 1643602 | 4/2006 |
| WO | 2007014339 | 2/2007 |
| WO | 2008100644 | 8/2008 |
| WO | 20091128853 | 9/2009 |
| WO | 2011097091 | 8/2011 |
| WO | 2016032761 | 3/2016 |
| WO | 2016182545 | 11/2016 |

OTHER PUBLICATIONS

International Search Report, PCT/US2012/051938, 3 pages, dated Jan. 3, 2013.
International Preliminary Report on Patentability, PCT/US2012/051940, 6 pages, dated Feb. 25, 2014.
Written Opinion dated Jan. 3, 2013 for Intl App No. PCT/US2012/051938 (5 pages).
Search Report and Written Opinion dated Feb. 21, 2013 for Intl App No. PCT/US2012/051936 (9 pages).
Search Report and Written Opinion dated Feb. 27, 2013 for Intl App No. PCT/US2012/051940 (10 pages).
Search Report dated Mar. 11, 2013 for Intl App No. PCT/US2012/051934 (3 pages).
Lehr et al., "Best Practices for Multizone Isolation Using Composite Plugs," Society of Petroleum Engineers, SPE 142744 ConocoPhillips and Baker Hughes Conference Paper, dated Jun. 8, 2011 (40 pgs).
International Preliminary Report on Patentability, PCT/US2012/051934, 6 pages, dated Feb. 25, 2014.
International Preliminary Report on Patentability, PCT/US2012/051936, 5 pages, dated Feb. 25, 2014.
Search Report dated Feb. 27, 2013 for Intl App No. PCT/US2012/051940 (3 pages).
Search Report dated Feb. 21, 2013 for Intl App No. PCT/US2012/051936 (3 pages).
Search Report and Written Opinion dated Mar. 11, 2013 for Intl App No. PCT/US2012/051934 (10 pages).

\* cited by examiner

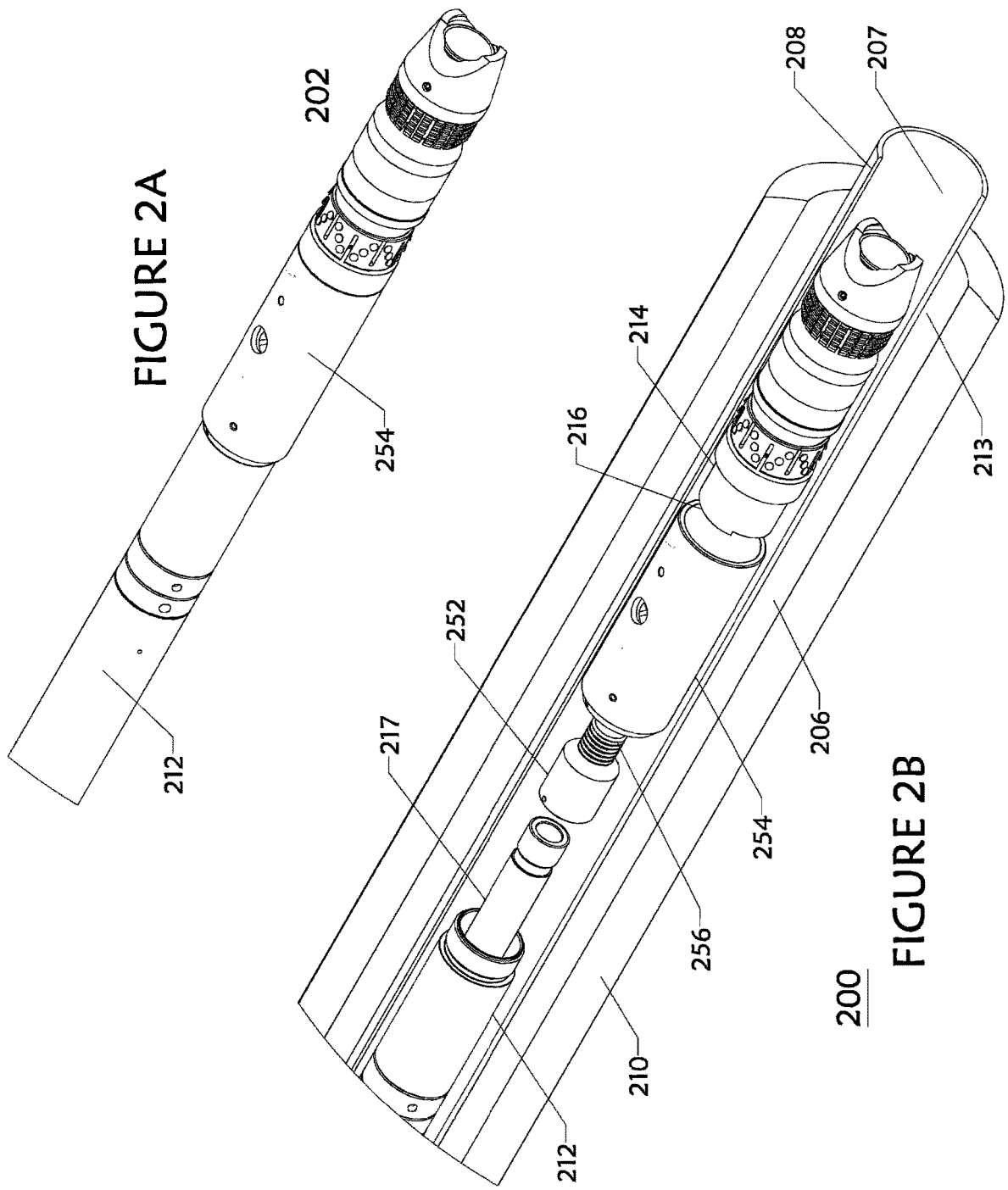

202

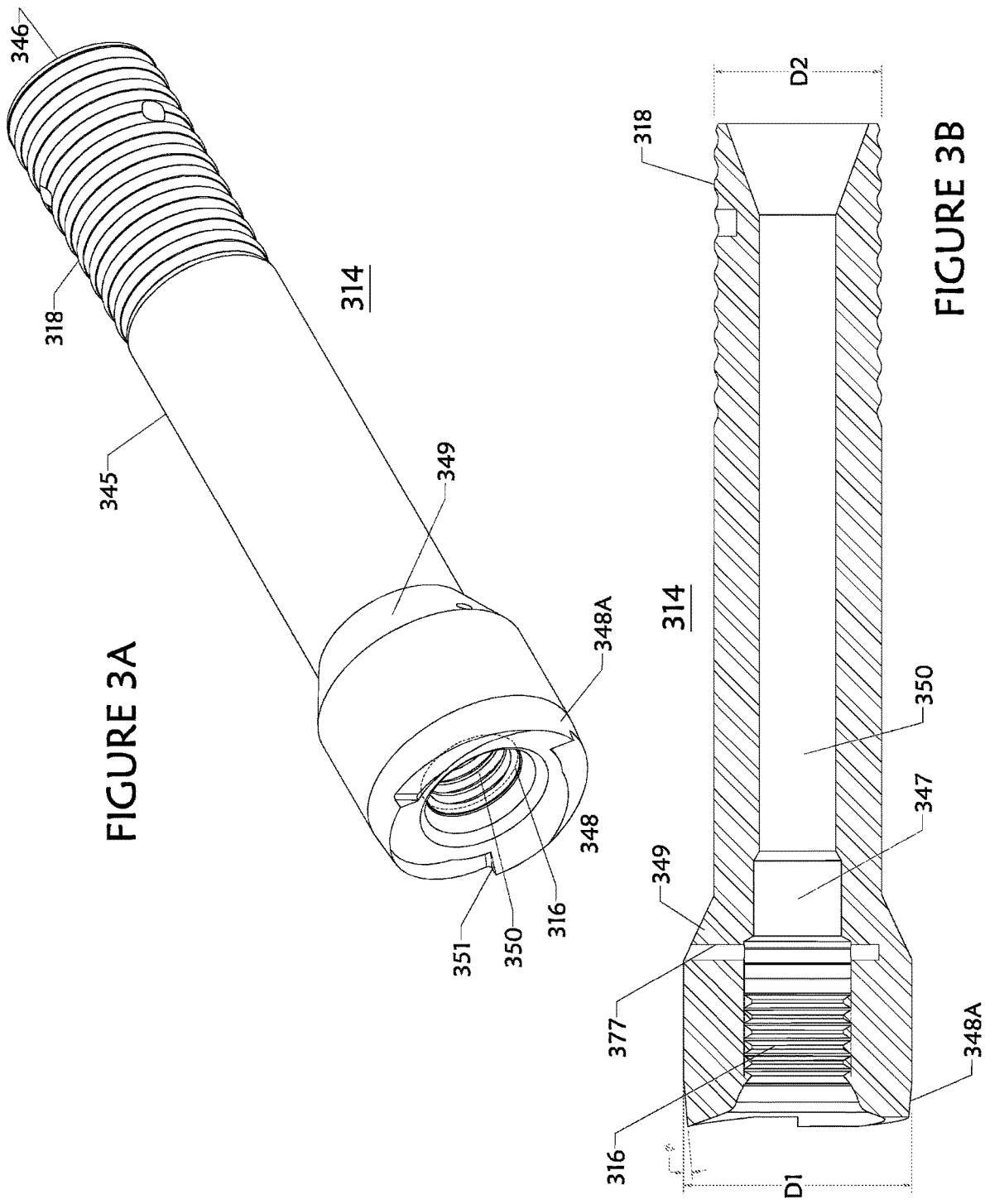

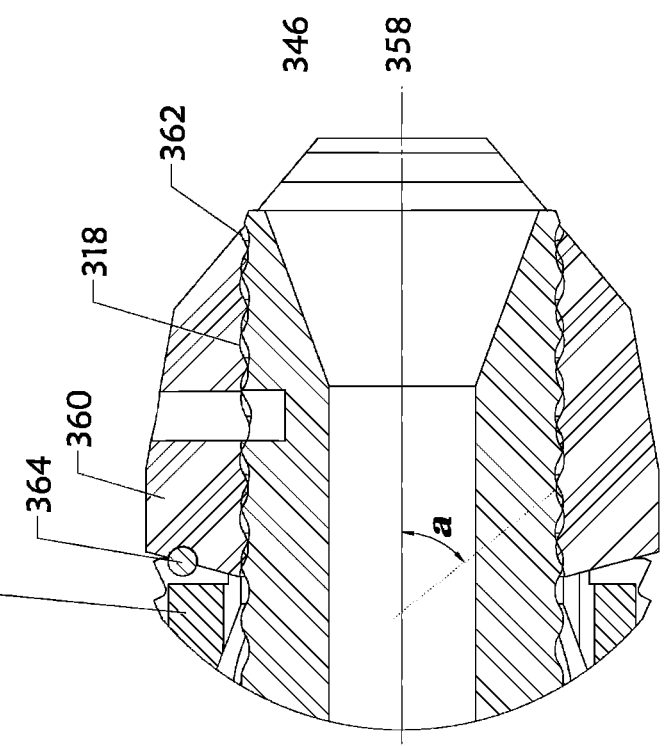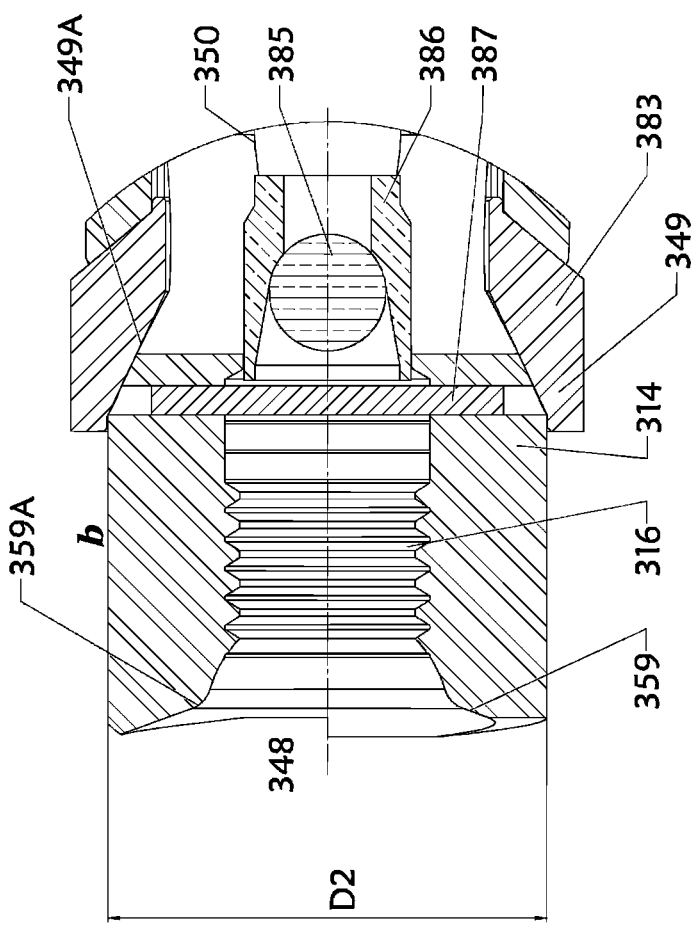

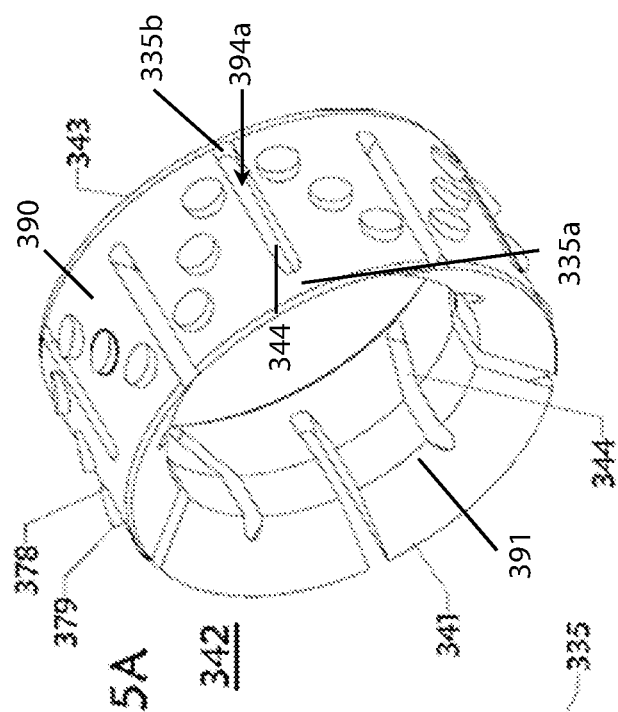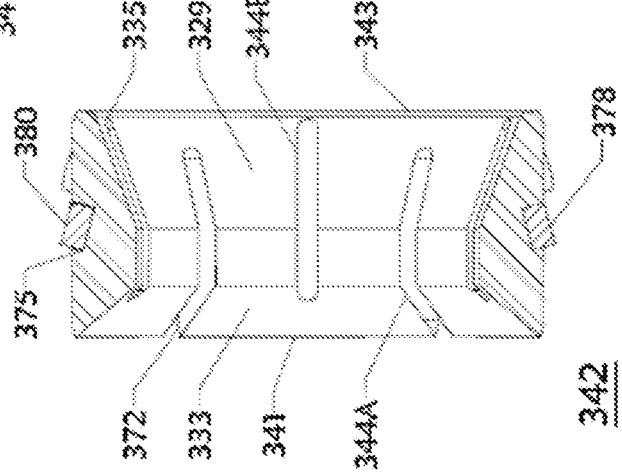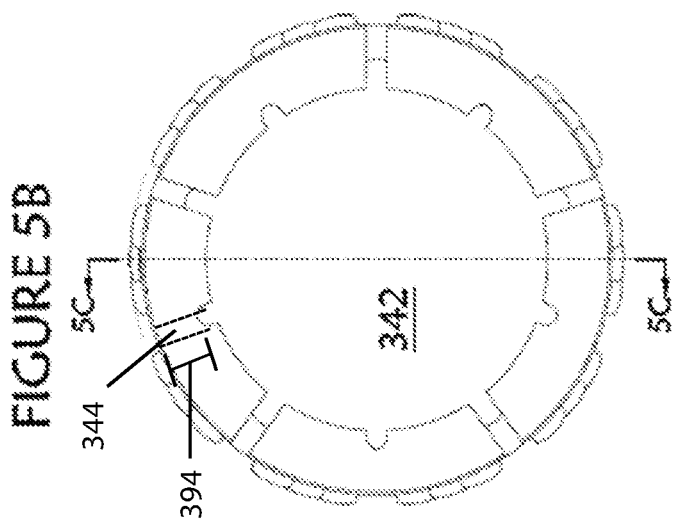

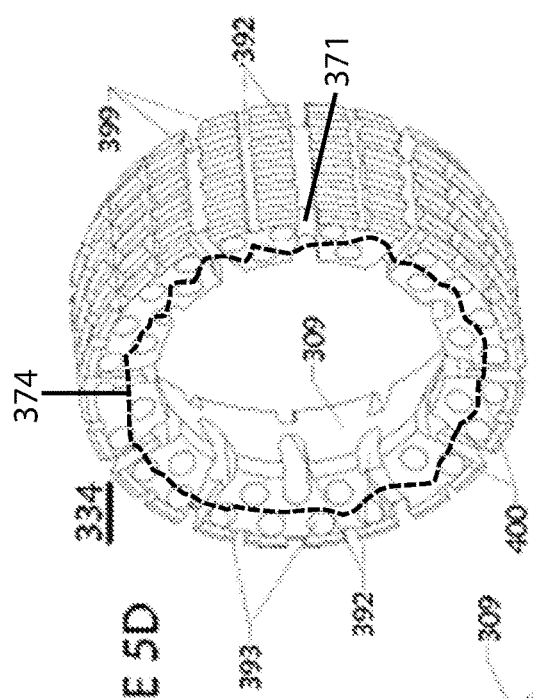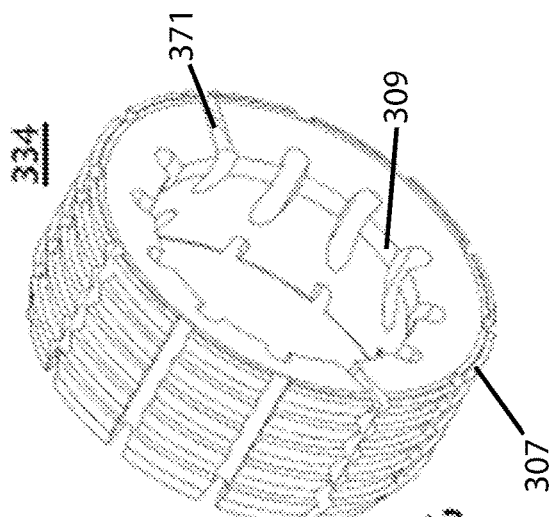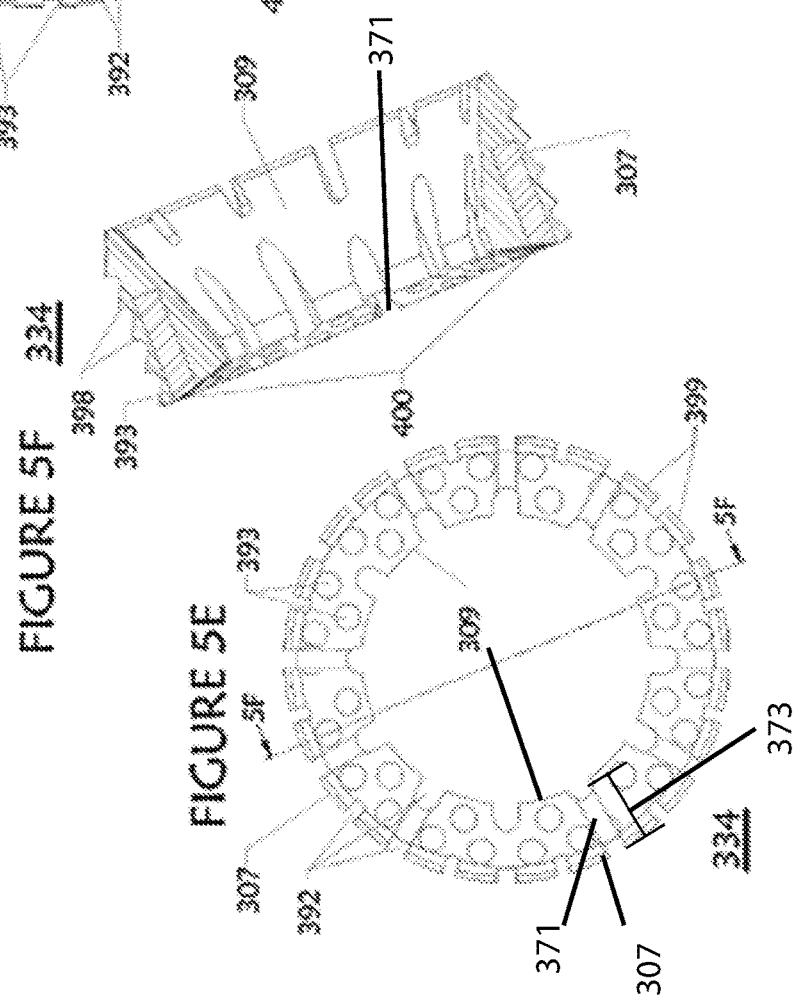

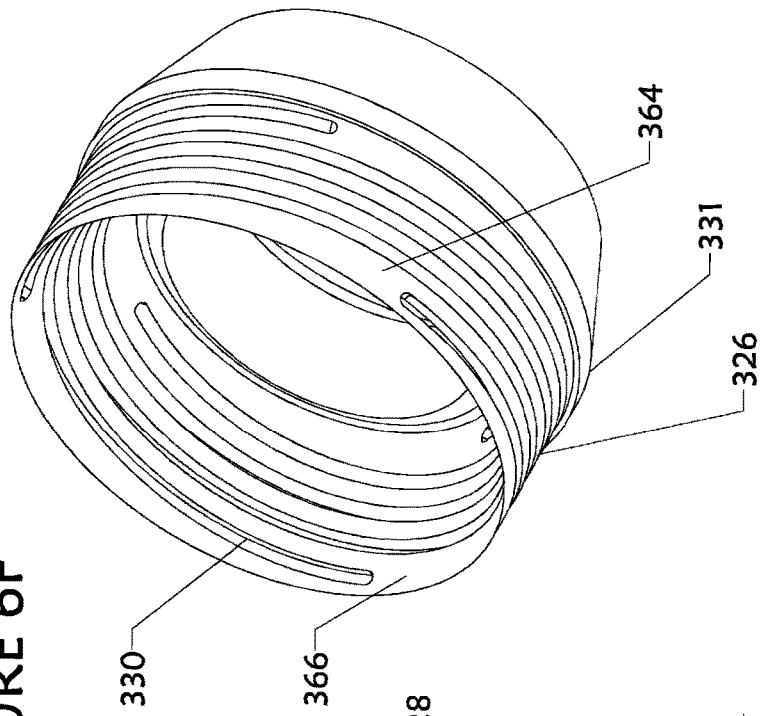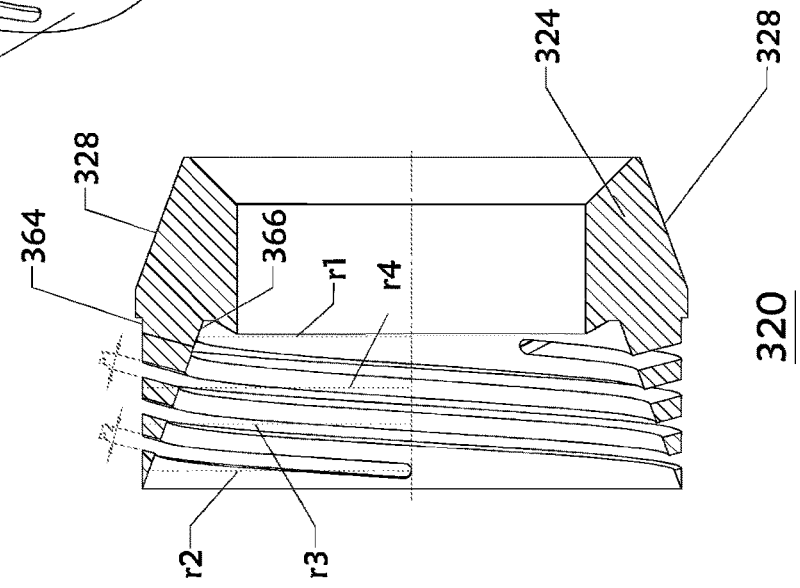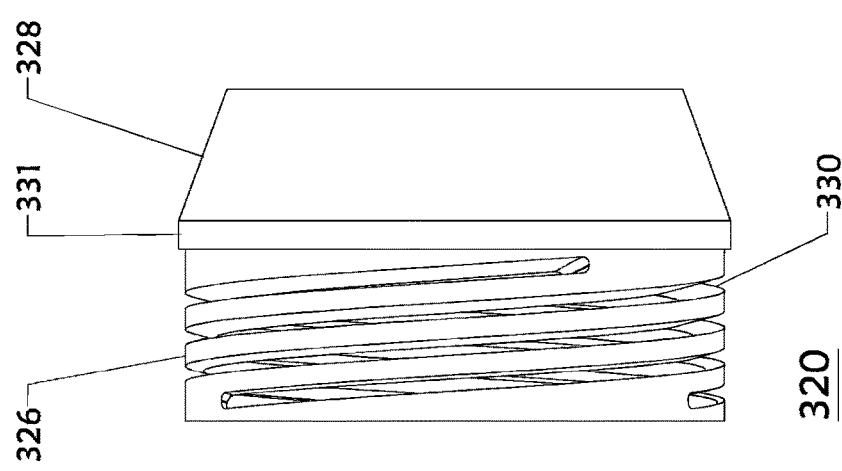

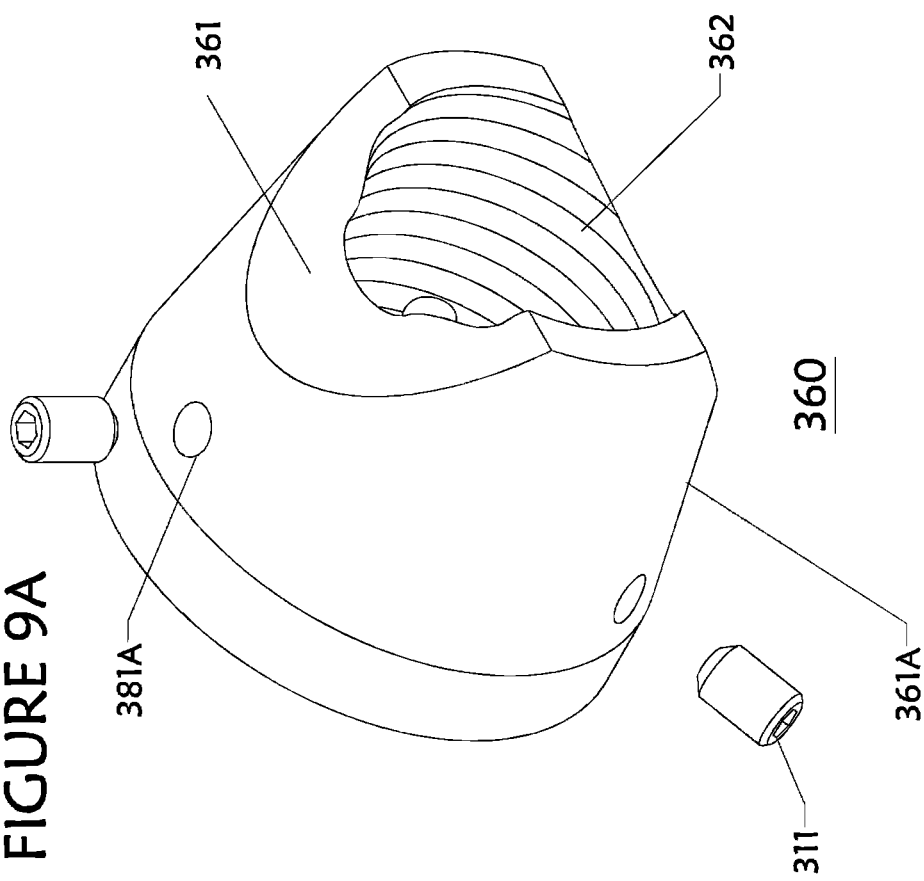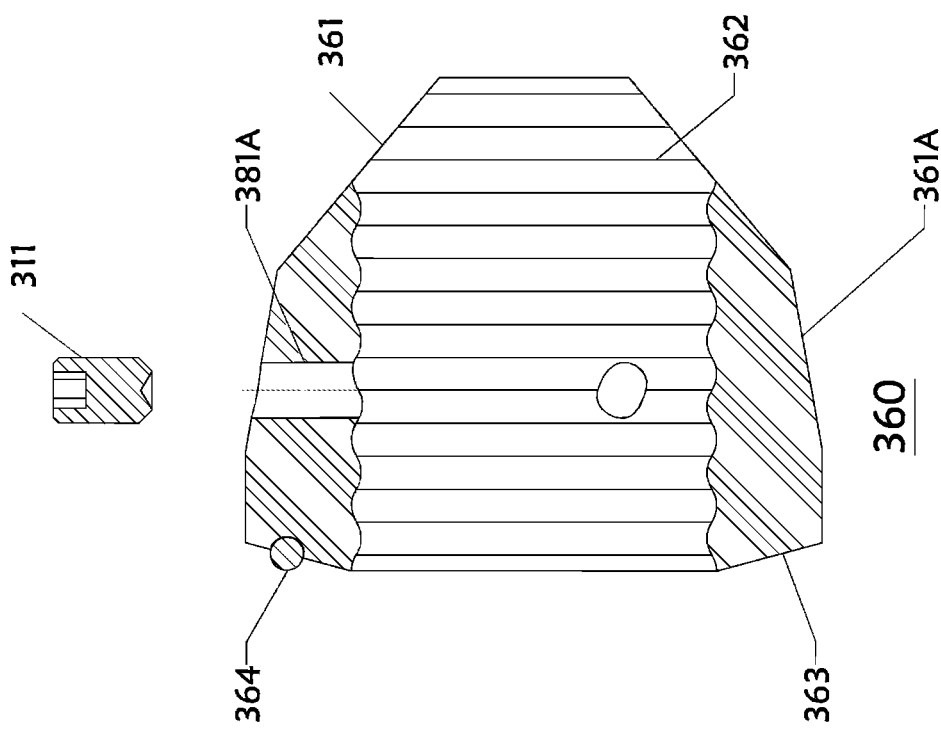

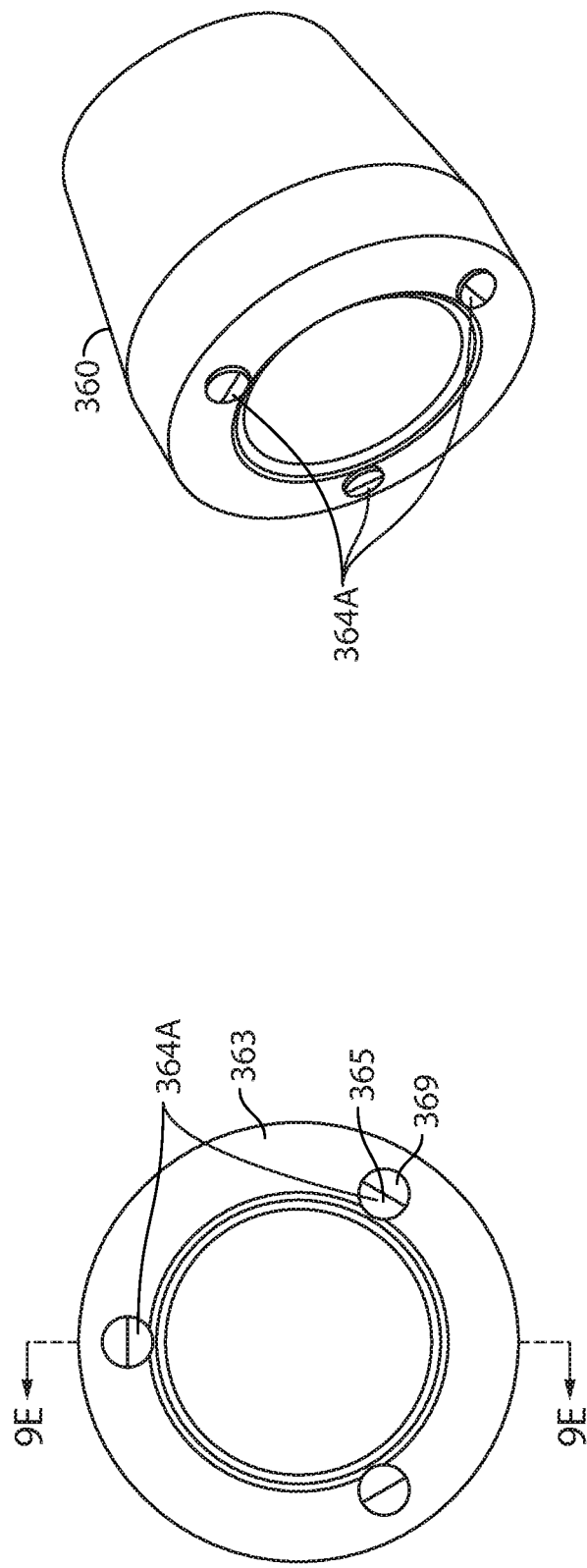

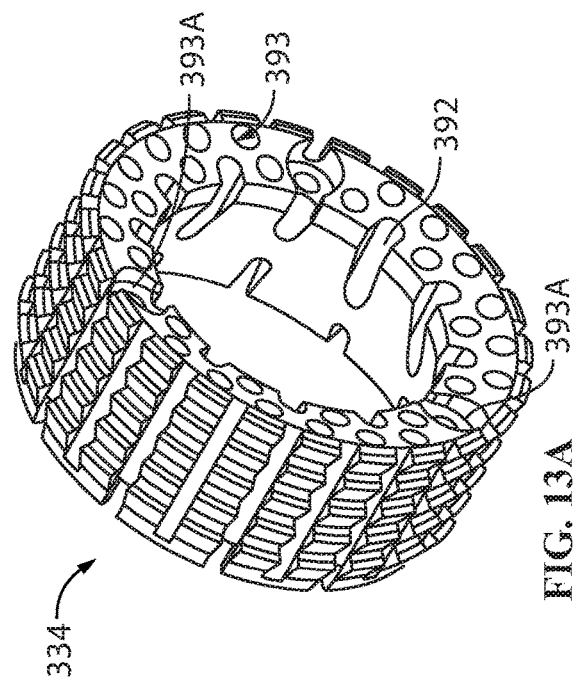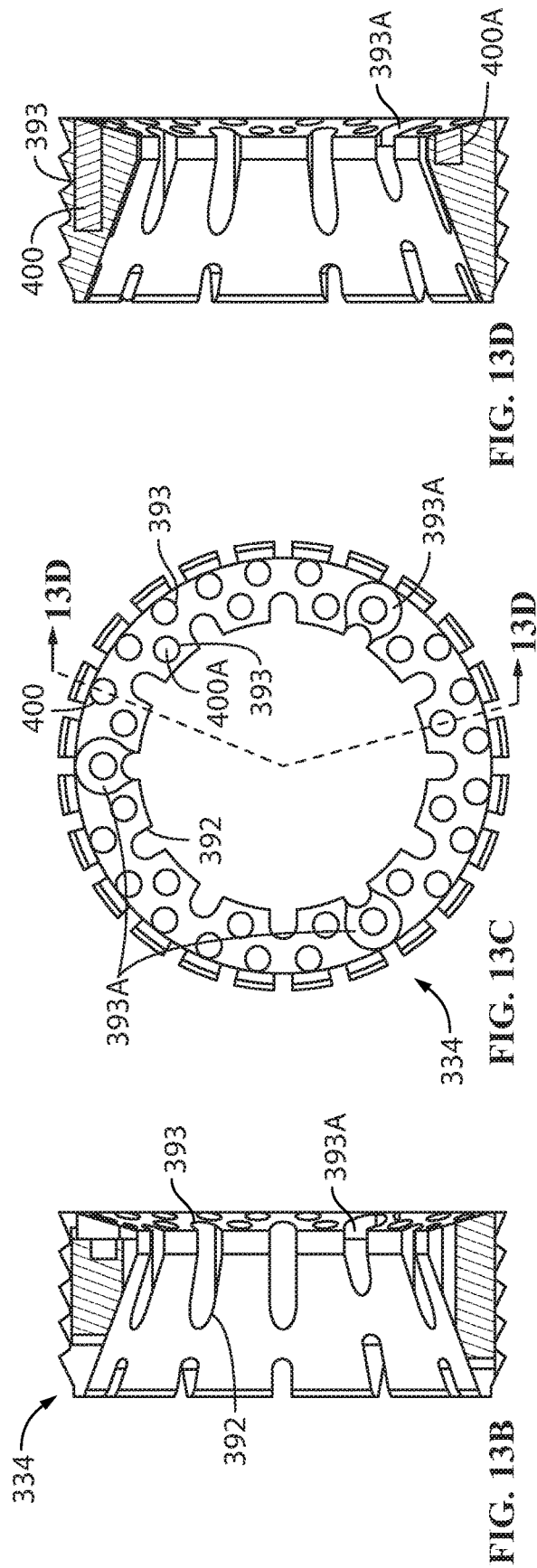
FIG. 13A
FIG. 13B
FIG. 13C
FIG. 13D

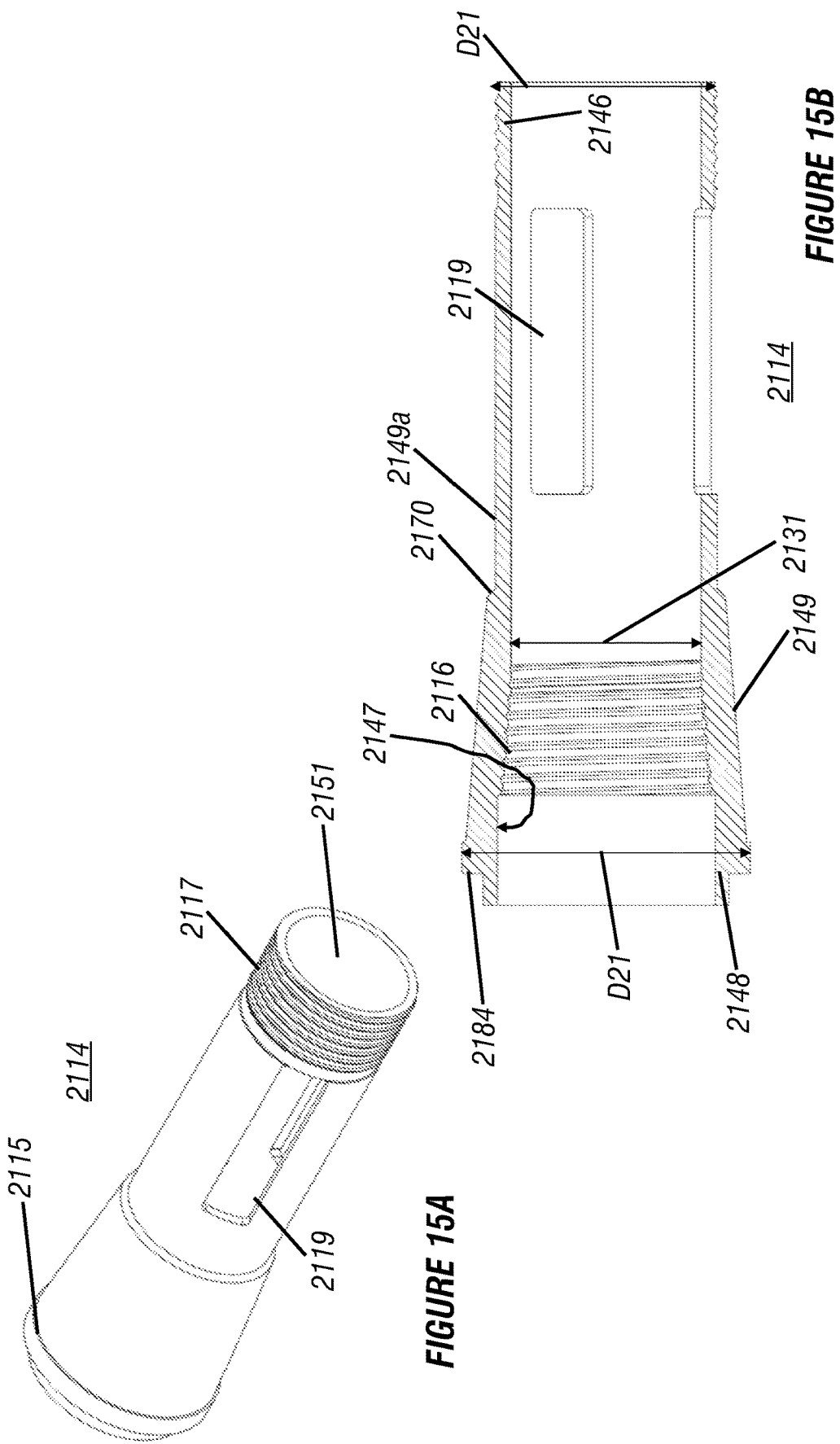

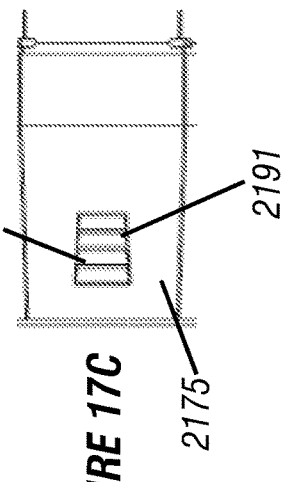
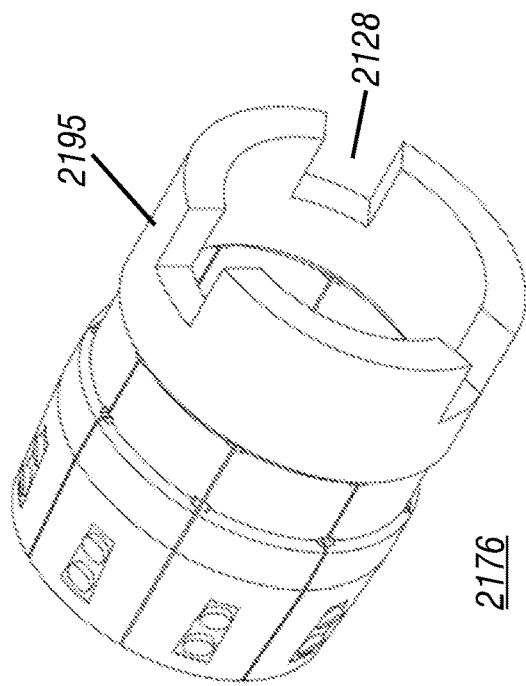
*FIGURE 17A*
*FIGURE 17C*
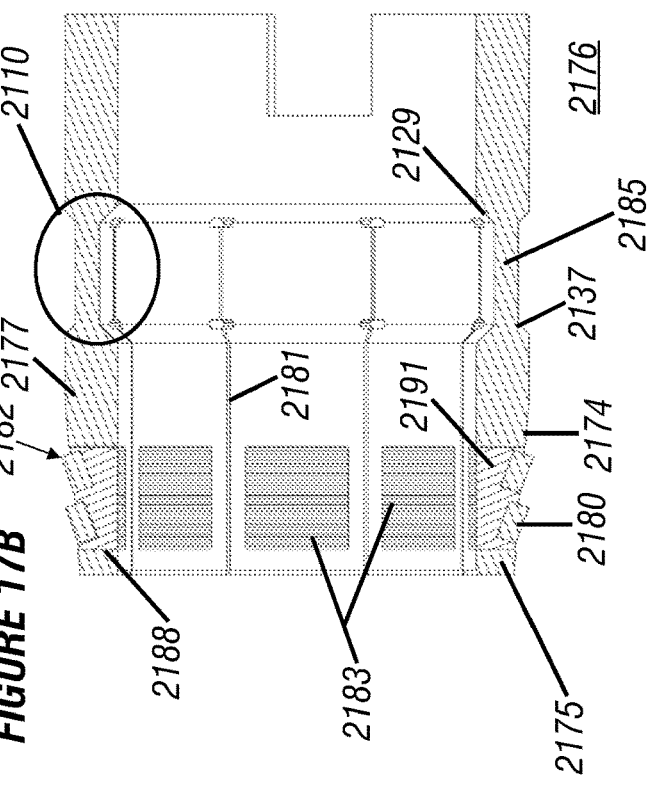
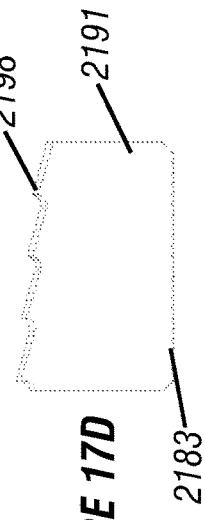
*FIGURE 17B*
*FIGURE 17D*

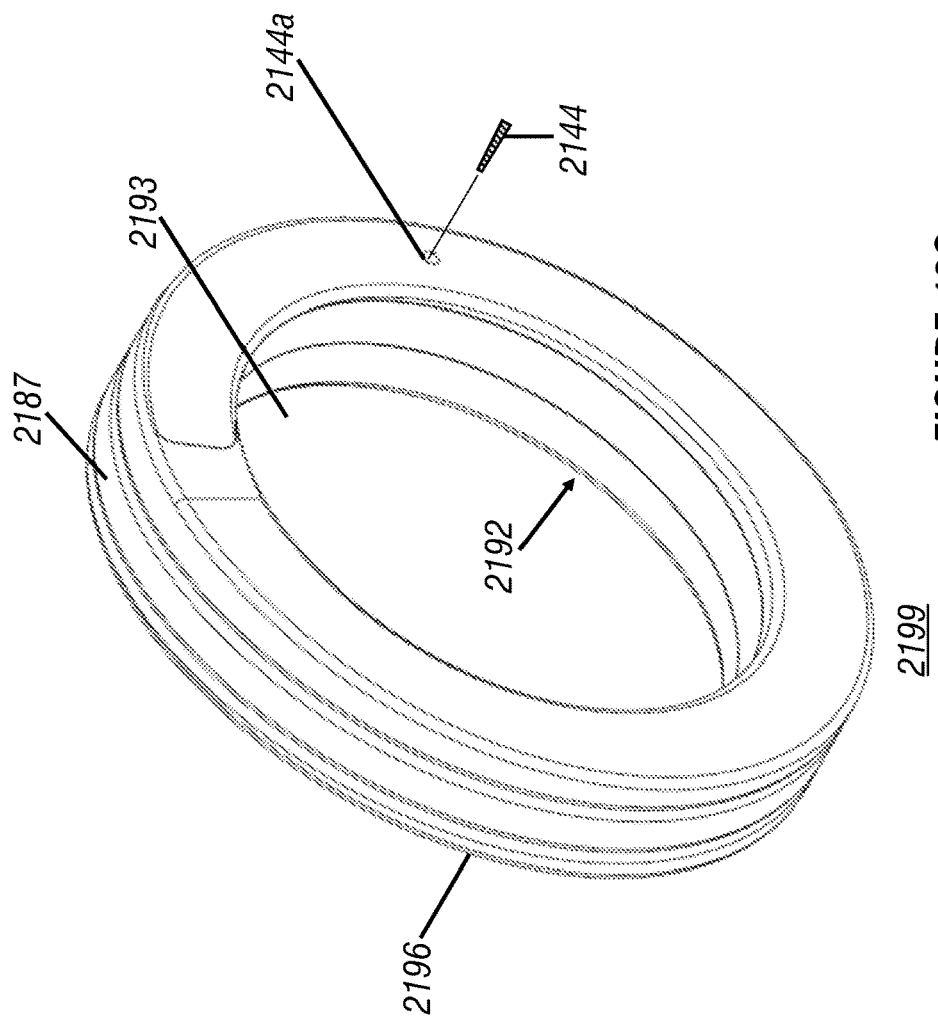
FIGURE 18C
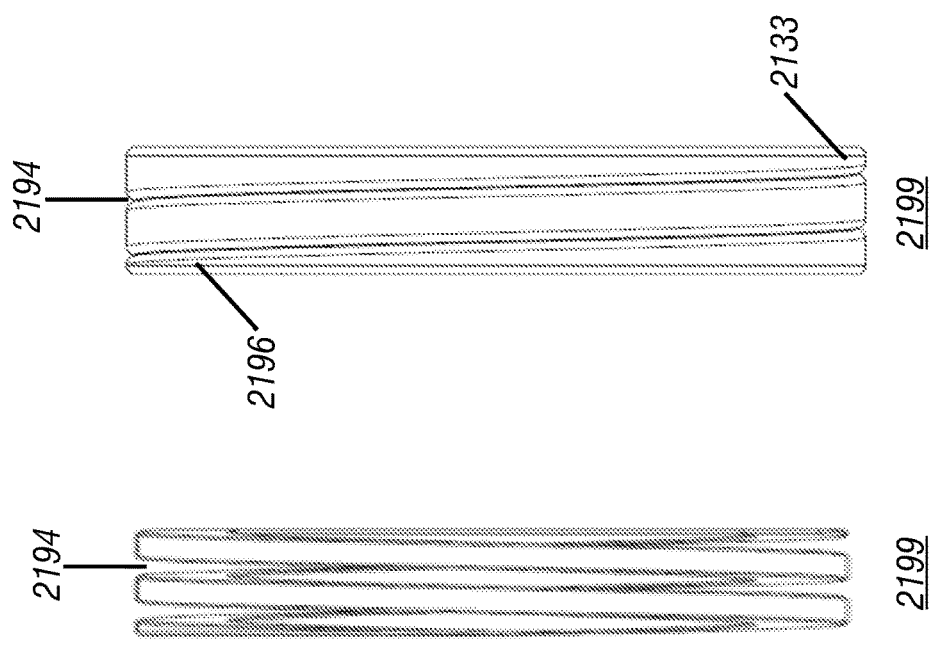
FIGURE 18B
FIGURE 18A

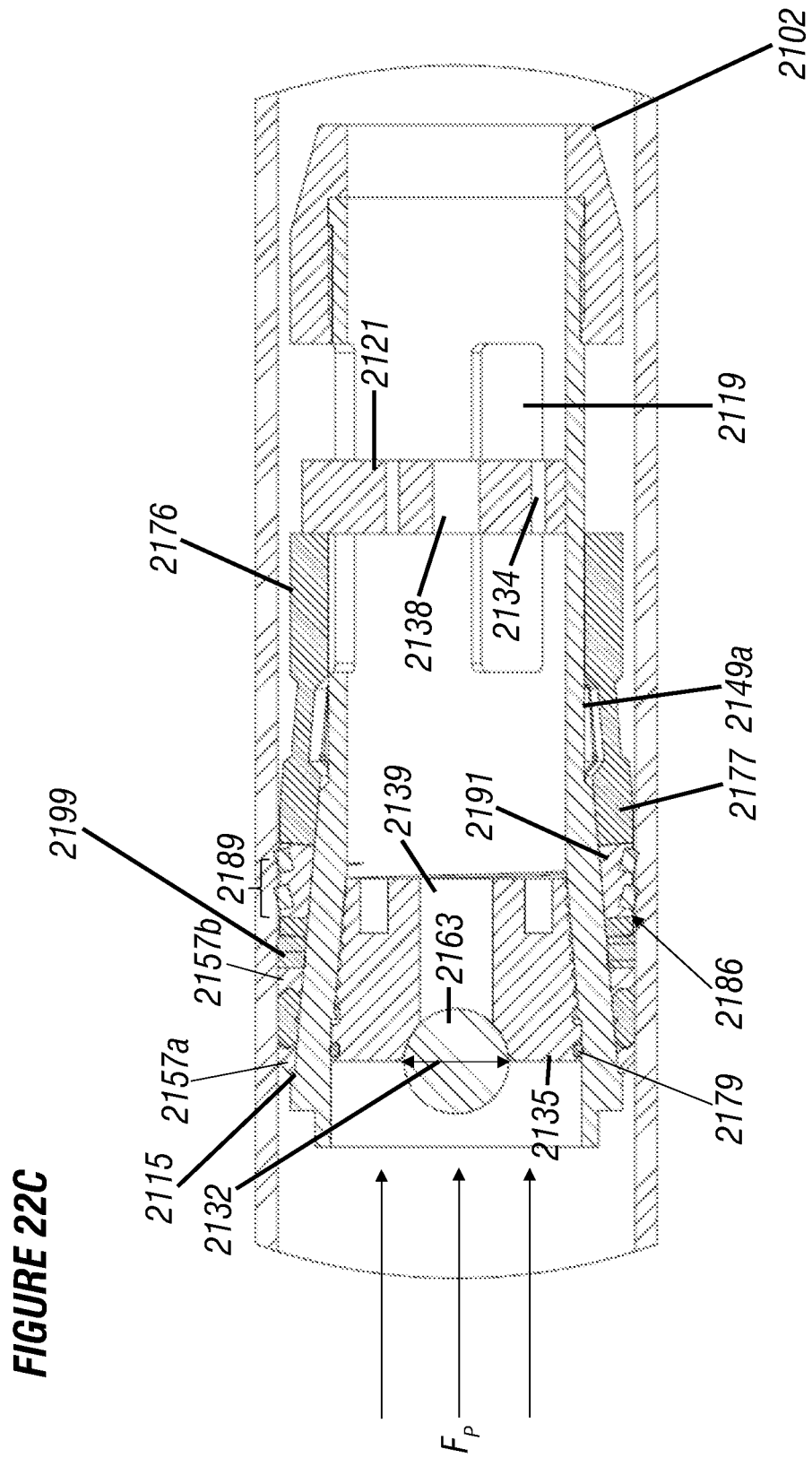

DOWNHOLE TOOL AND METHOD OF USE

CROSS-REFERENCE TO RELATED APPLICATIONS

This application is a 'bypass' continuation of PCT Application Ser. No. PCT/US17/62379, filed on Nov. 17, 2017, which claims priority to U.S. Provisional Patent Application Ser. No. 62/423,620, filed on Nov. 17, 2016. The disclosure of each application is hereby incorporated herein by reference in its entirety for all purposes.

STATEMENT REGARDING FEDERALLY SPONSORED RESEARCH OR DEVELOPMENT

Not applicable.

BACKGROUND

Field of the Disclosure

This disclosure generally relates to downhole tools and related systems and methods used in oil and gas wellbores. More specifically, the disclosure relates to a downhole system and tool that may be run into a wellbore and useable for wellbore isolation, and methods pertaining to the same. In particular embodiments, the downhole tool may be a composite plug made of drillable materials. In other embodiments, the downhole tool may have one or more metal components. Some components may be made of a dissolvable material.

Background of the Disclosure

An oil or gas well includes a wellbore extending into a subterranean formation at some depth below a surface (e.g., Earth's surface), and is usually lined with a tubular, such as casing, to add strength to the well. Many commercially viable hydrocarbon sources are found in "tight" reservoirs, which means the target hydrocarbon product may not be easily extracted. The surrounding formation (e.g., shale) to these reservoirs is typically has low permeability, and it is uneconomical to produce the hydrocarbons (i.e., gas, oil, etc.) in commercial quantities from this formation without the use of drilling accompanied with fracing operations.

Fracing is common in the industry and includes the use of a plug set in the wellbore below or beyond the respective target zone, followed by pumping or injecting high pressure frac fluid into the zone. FIG. 1 illustrates a conventional plugging system 100 that includes use of a downhole tool 102 used for plugging a section of the wellbore 106 drilled into formation 110. The tool or plug 102 may be lowered into the wellbore 106 by way of workstring 105 (e.g., e-line, wireline, coiled tubing, etc.) and/or with setting tool 112, as applicable. The tool 102 generally includes a body 103 with a compressible seal member 122 to seal the tool 102 against an inner surface 107 of a surrounding tubular, such as casing 108. The tool 102 may include the seal member 122 disposed between one or more slips 109, 111 that are used to help retain the tool 102 in place.

In operation, forces (usually axial relative to the wellbore 106) are applied to the slip(s) 109, 111 and the body 103. As the setting sequence progresses, slip 109 moves in relation to the body 103 and slip 111, the seal member 122 is actuated, and the slips 109, 111 are driven against corresponding conical surfaces 104. This movement axially compresses and/or radially expands the compressible member 122, and the slips 109, 111, which results in these components being urged outward from the tool 102 to contact the inner wall 107. In this manner, the tool 102 provides a seal expected to prevent transfer of fluids from one section 113 of the wellbore across or through the tool 102 to another section 115 (or vice versa, etc.), or to the surface. Tool 102 may also include an interior passage (not shown) that allows fluid communication between section 113 and section 115 when desired by the user. Oftentimes multiple sections are isolated by way of one or more additional plugs (e.g., 102A).

Upon proper setting, the plug may be subjected to high or extreme pressure and temperature conditions, which means the plug must be capable of withstanding these conditions without destruction of the plug or the seal formed by the seal element. High temperatures are generally defined as downhole temperatures above 200° F., and high pressures are generally defined as downhole pressures above 7,500 psi, and even in excess of 15,000 psi. Extreme wellbore conditions may also include high and low pH environments. In these conditions, conventional tools, including those with compressible seal elements, may become ineffective from degradation. For example, the sealing element may melt, solidify, or otherwise lose elasticity, resulting in a loss the ability to form a seal barrier.

Before production operations commence, the plugs must also be removed so that installation of production tubing may occur. This typically occurs by drilling through the set plug, but in some instances the plug can be removed from the wellbore essentially intact. A common problem with retrievable plugs is the accumulation of debris on the top of the plug, which may make it difficult or impossible to engage and remove the plug. Such debris accumulation may also adversely affect the relative movement of various parts within the plug. Furthermore, with current retrieving tools, jarring motions or friction against the well casing may cause accidental unlatching of the retrieving tool (resulting in the tools slipping further into the wellbore), or re-locking of the plug (due to activation of the plug anchor elements). Problems such as these often make it necessary to drill out a plug that was intended to be retrievable.

However, because plugs are required to withstand extreme downhole conditions, they are built for durability and toughness, which often makes the drill-through process difficult. Even drillable plugs are typically constructed of a metal such as cast iron that may be drilled out with a drill bit at the end of a drill string. Steel may also be used in the structural body of the plug to provide structural strength to set the tool. The more metal parts used in the tool, the longer the drilling operation takes. Because metallic components are harder to drill through, this process may require additional trips into and out of the wellbore to replace worn out drill bits.

The use of plugs in a wellbore is not without other problems, as these tools are subject to known failure modes. When the plug is run into position, the slips have a tendency to pre-set before the plug reaches its destination, resulting in damage to the casing and operational delays. Pre-set may result, for example, because of residue or debris (e.g., sand) left from a previous frac. In addition, conventional plugs are known to provide poor sealing, not only with the casing, but also between the plug's components. For example, when the sealing element is placed under compression, its surfaces do not always seal properly with surrounding components (e.g., cones, etc.).

Downhole tools are often activated with a drop ball that is flowed from the surface down to the tool, whereby the pressure of the fluid must be enough to overcome the static pressure and buoyant forces of the wellbore fluid(s) in order for the ball to reach the tool. Frac fluid is also highly pressurized in order to not only transport the fluid into and through the wellbore, but also extend into the formation in order to cause fracture. Accordingly, a downhole tool must be able to withstand these additional higher pressures.

It is naturally desirable to "flow back," i.e., from the formation to the surface, the injected fluid, or the formation fluid(s); however, this is not possible until the previously set tool or its blockage is removed. Removal of tools (or blockage) usually requires a well-intervention service for retrieval or drill-through, which is time consuming, costly, and adds a potential risk of wellbore damage.

The more metal parts used in the tool, the longer the drill-through operation takes. Because metallic components are harder to drill, such an operation may require additional trips into and out of the wellbore to replace worn out drill bits.

In the interest of cost-saving, materials that react under certain downhole conditions have been the subject of significant research in view of the potential offered to the oilfield industry. For example, such an advanced material that has an ability to degrade by mere response to a change in its surrounding is desirable because no, or limited, intervention would be necessary for removal or actuation to occur.

Such a material, essentially self-actuated by changes in its surrounding (e.g., the presence a specific fluid, a change in temperature, and/or a change in pressure, etc.) may potentially replace costly and complicated designs and may be most advantageous in situations where accessibility is limited or even considered to be impossible, which is the case in a downhole (subterranean) environment.

It is highly desirable and economically advantageous to have controls that do not rely on lengthy and costly wirelines, hydraulic control lines, or coil tubings. Furthermore, in countless situations, a subterranean piece of equipment may need to be actuated only once, after which it may no longer present any usefulness, and may even become disadvantageous when for instance the equipment must be retrieved by risky and costly interventions.

In some instances, it may be advantageous to have a device (ball, tool, component, etc.) made of a material (of composition of matter) characterized by properties where the device is mechanically strong (hard) under some conditions (such as at the surface or at ambient conditions), but degrades, dissolves, breaks, etc. under specific conditions, such as in the presence of water-containing fluids like fresh water, seawater, formation fluid, additives, brines, acids and bases, or changes in pressure and/or temperature. Thus, after a predetermined amount of time, and after the desired operation(s) is complete, the formation fluid is ultimately allowed to flow toward the surface.

It would be advantageous to configure a device (or a related activation device, such as a frac ball, or other component(s)) to utilize materials that alleviate or reduce the need for an intervention service. This would save a considerable amount of time and expense. Therefore, there is a need in the art for tools, devices, components, etc. to be of a nature that does not involve or otherwise require a drill-through process. Environmental- or bio-friendly materials are further desirous.

The ability to save operational time (and those saving operational costs) leads to considerable competition in the marketplace. Achieving any ability to save time, or ultimately cost, leads to an immediate competitive advantage.

Accordingly, there are needs in the art for novel systems and methods for isolating wellbores in a fast, viable, and economical fashion. There is a great need in the art for downhole plugging tools that form a reliable and resilient seal against a surrounding tubular. There is also a need for a downhole tool made substantially of a drillable material that is easier and faster to drill. There is a great need in the art for a downhole tool that overcomes problems encountered in a horizontal orientation. There is a need in the art to reduce the amount of time and energy needed to remove a workstring from a wellbore, including reducing hydraulic drag. There is a need in the art for non-metallic downhole tools and components.

It is highly desirous for these downhole tools to readily and easily withstand extreme wellbore conditions, and at the same time be cheaper, smaller, lighter, and useable in the presence of high pressures associated with drilling and completion operations.

SUMMARY

Embodiments of the disclosure pertain to a downhole tool suitable for use in a wellbore. The tool may include one or more of a wedge mandrel; a fingered member disposed around the wedge mandrel; a seal element disposed around the wedge mandrel; an insert positioned between the fingered member and the seal element, and in proximity with an end of the fingered member; a ball seat insert made of a reactive metal-based material; a support platform made of the reactive metal-based material; and a lower sleeve disposed around and engaged with wedge mandrel.

The wedge mandrel may be made of a composite filament wound material. The wedge mandrel may include: a distal end; a proximate end; an outer surface; and an inner flowbore extending through the wedge mandrel from the proximate end to the distal end. The wedge mandrel may have a first outer diameter at the distal end, a second outer diameter at the proximate end. The wedge mandrel may have an angled surface (or angled linear transition surface) therebetween. In aspects, the wedge mandrel may have a second outer diameter larger than a first outer diameter.

The inner flowbore may include a first seat of threads at the distal end and a second set of threads at the proximate end. The ball seat insert may be disposed in the inner flowbore and engaged with the first set of threads. The support platform may be disposed in the inner flowbore and engaged with the second set of threads. Either or both of the first set of threads or the second set of threads may be round threads (or have a rounded thread profile).

The wedge mandrel (or its inner flowbore) may have an inner flowbore diameter in the range of about 1.5 inches to about 4 inches. The ball seat insert may include a ball seat formed therein. The ball seat insert may have a ball seat bore having an inner diameter in the range of about 0.5 inches to about 1.5 inches.

In operation, and upon setting, via pressurization a ball may be positioned in the ball seat. In aspects related to the set tool, a middle of the ball may be laterally proximate to a middle of the seal element.

One or more components of the downhole tool or the ball may be made of a reactive material formed from an initial mixture composition comprising: a low viscosity cycloaliphatic epoxy resin with an anhydride curing agent; an additive comprising a clay; and a glass. The reactive material may be formed via a curing process.

The downhole tool may include other components, including one or more of a first backup ring engaged with a first side of the seal element or a second backup ring engaged with a second side of the seal element.

The fingered member may be made from a material that includes one or more of filament wound material, fiberglass cloth wound material, and molded fiberglass composite. The fingered member may include: a circular body; a plurality of fingers extending from the circular body; a longitudinal gap formed between respective fingers; and a transition zone between the circular body and the plurality of fingers. The transition zone may include an inner member surface and an outer member surface. The inner member surface may include a first inner member groove. The outer member surface may include a first outer member groove.

The wedge mandrel may include a plurality of lateral windows configured for a plurality of respective support platform dogs to movingly engage therein. The fingered member may also have a plurality of recessed regions disposed in the circular body configured for the plurality of respective support platform dogs to engage therein.

One or more fingers of the fingered member may include a gripper insert disposed therein. The gripper insert may be made of metal, such as cast iron. The gripper may insert may be surface hardened. The gripper insert may be heat treated by way of an induction process. The gripper insert may have a gripper outer surface Rockwell hardness in the range of about 40 to about 60, and a griper inner surface Rockwell hardness in the range of about 10 to about 25.

In aspects, the downhole tool may be configured as one of a frac plug and a bridge plug.

The insert may have a circular body, a first end, a second end, and a helical winding groove formed in the circular body between the first end and the second end.

Other embodiments of the disclosure pertain to a downhole tool for use in a wellbore that may include one or more of: a wedge mandrel; a fingered member disposed around the wedge mandrel; a seal element disposed around the mandrel; an insert positioned between the fingered member and the seal element; a ball seat insert made of a reactive material, the ball seat insert disposed in the wedge mandrel; a support platform made of the reactive material, the support plate disposed in the wedge mandrel; and a lower sleeve disposed around the wedge mandrel. The reactive material may be a metal-based material.

The wedge mandrel may include a distal end; a proximate end; an outer surface; and an inner flowbore extending through the wedge mandrel from the proximate end to the distal end. The wedge mandrel may include a first outer diameter at the distal end. The wedge mandrel may include a second outer diameter at the proximate end. The outer surface may include an axially linear surface. The outer surface may include an axially angled surface. The outer surface may have a detent, which may be formed between the liner surface and the angled surface. The second outer diameter may be larger than the first outer diameter.

The ball seat insert may be engaged with an inner surface of the inner flowbore. The ball seat insert may be threadingly engaged with the inner surface. The support platform may be engaged with the inner surface. The support platform may be treadingly engaged with the inner surface. The lower sleeve may be engaged with the outer surface. The lower sleeve may be threadingly engaged with the outer surface.

The insert may be positioned and engaged with the detent. The fingered member may be disposed in the assembled configuration around the axially linear surface.

The inner flowbore may include an inner flowbore diameter in the range of about 1.5 inches to about 4 inches. The ball seat insert may have a ball seat formed therein. The ball seat insert may have a ball seat bore. The ball seat bore may have an inner bore diameter in the range of about 0.5 inches to about 1.5 inches. The support platform may have a support platform bore having an inner support platform bore diameter in the range of about 0.5 inches to about 1.5 inches.

In operation, upon setting of the downhole tool, via pressurization a ball may be positioned in the ball seat whereby a middle of the ball may be laterally proximate to a middle of the seal element.

The downhole tool may include other components, such as a first backup ring engaged with a first side of the seal element, and/or a second backup ring engaged with a second side of the seal element.

The fingered member may include: a circular body; a plurality of fingers extending from the circular body; a gap or slice formed between respective fingers; and a transition zone between the circular body and the plurality of fingers. The transition zone may include an inner member surface and an outer member surface. The inner member surface may have a first inner member groove. The outer member surface may have a first outer member groove.

The wedge mandrel may have one or more lateral mandrel windows configured for a one or more respective support platform dogs to movingly engage therein. The fingered member may have one or more recessed regions disposed in the circular body configured for the respective support platform dogs to engage therein.

The fingered member, the wedge mandrel, or both, may be made of composite filament wound material. One or more of the plurality of fingers may have a gripper insert disposed therein.

The griper insert may be metal. The griper insert may be surface hardened by way of an induction process resulting in a gripper outer surface Rockwell hardness in the range of about 40 to about 60, and a griper inner surface Rockwell hardness in the range of about 10 to about 25.

The insert may have a circular body, a first end, a second end, and a helical winding groove formed in the circular body between the first end and the second end.

One or more components of the downhole tool may be made of a cured reactive material formed from an initial mixture composition comprising: a low viscosity cycloaliphatic epoxy resin with an anhydride curing agent; an additive comprising a clay; and a glass.

Yet other embodiments of the disclosure pertain to a method of operating a downhole tool that may include one or more steps of: using a workstring to run the downhole tool into the wellbore to a desired position; actuating a setting device coupled with the downhole tool in order to set the downhole tool into at least partial engagement with a surrounding tubular; disconnecting the downhole tool from the setting device coupled therewith when the tensile load is sufficient to separation therefrom; seating a ball in a ball seat of the downhole tool; and waiting an amount of time for a reactive material to react in a sufficient manner whereby a fluid may be produced through an inner flowbore of the tool, wherein an inner flowbore diameter is in the range of about 2 inches to about 3 inches.

The downhole tool may include: a wedge mandrel further having: a distal end; a proximate end; an outer surface; and the inner flowbore extending through the mandrel from the proximate end to the distal end. The outer surface may have an axially linear surface and an axially angled surface. The tool may include: a fingered member disposed around the mandrel; a seal element disposed around the mandrel; and a ball seat insert made of the reactive material, the ball seat insert disposed in the inner flowbore at the proximate end, and engaged with the inner surface of the inner flowbore; a support platform also made of the reactive material, the support platform disposed in the inner flowbore at the distal end, and engaged with the inner surface; and a lower sleeve disposed around and engaged with the outer surface of mandrel at the distal end.

The method may include having at least one component of the downhole tool or the ball made of material made from an initial mixture composition comprising: a low viscosity cycloaliphatic epoxy resin with an anhydride curing agent; an additive comprising a clay; and a glass, and wherein the workstring comprises a grooved setting sleeve configured therewith.

These and other embodiments, features and advantages will be apparent in the following detailed description and drawings.

BRIEF DESCRIPTION OF THE DRAWINGS

A full understanding of embodiments disclosed herein is obtained from the detailed description of the disclosure presented herein below, and the accompanying drawings, which are given by way of illustration only and are not intended to be limitative of the present embodiments, and wherein:

FIG. 2A shows an isometric view of a system having a downhole tool, according to embodiments of the disclosure;

FIG. 2B shows an isometric view of a system having a downhole tool, according to embodiments of the disclosure;

FIG. 3A shows an isometric view of a mandrel usable with a downhole tool according to embodiments of the disclosure;

FIG. 3B shows a longitudinal cross-sectional view of a mandrel usable with a downhole tool according to embodiments of the disclosure;

FIG. 3C shows a longitudinal cross-sectional view of an end of a mandrel usable with a downhole tool according to embodiments of the disclosure;

FIG. 3D shows a longitudinal cross-sectional view of an end of a mandrel engaged with a sleeve according to embodiments of the disclosure;

FIG. 5A shows an isometric view of one or more slips usable with a downhole tool according to embodiments of the disclosure;

FIG. 5B shows a lateral view of one or more slips usable with a downhole tool according to embodiments of the disclosure;

FIG. 5C shows a longitudinal cross-sectional view of one or more slips usable with a downhole tool according to embodiments of the disclosure;

FIG. 5D shows an isometric view of a metal slip usable with a downhole tool according to embodiments of the disclosure;

FIG. 5E shows a lateral view of a metal slip usable with a downhole tool according to embodiments of the disclosure;

FIG. 5F shows a longitudinal cross-sectional view of a metal slip usable with a downhole tool according to embodiments of the disclosure;

FIG. 5G shows an isometric view of a metal slip without buoyant material holes usable with a downhole tool according to embodiments of the disclosure;

FIG. 6D shows a side longitudinal view of a composite deformable member usable with a downhole tool according to embodiments of the disclosure;

FIG. 6E shows a longitudinal cross-sectional view of a composite deformable member usable with a downhole tool according to embodiments of the disclosure;

FIG. 6F shows an underside isometric view of a composite deformable member usable with a downhole tool according to embodiments of the disclosure;

FIG. 7EE shows a longitudinal cross-sectional view of a bearing plate with variant pin inserts according to embodiments of the disclosure;

FIG. 9A shows an isometric view of a lower sleeve usable with a downhole tool according to embodiments of the disclosure;

FIG. 9B shows a longitudinal cross-sectional view of a lower sleeve usable with a downhole tool according to embodiments of the disclosure;

FIG. 9C shows an isometric view of a lower sleeve configured with stabilizer pin inserts according to embodiments of the disclosure;

FIG. 9D shows a lateral view of the lower sleeve of FIG. 9C according to embodiments of the disclosure;

FIG. 9E shows a longitudinal cross-sectional view of the lower sleeve of FIG. 9C according to embodiments of the disclosure;

FIG. 13A shows an isometric view of a metal slip according to embodiments of the disclosure;

FIG. 13B shows a longitudinal cross-section view of the metal slip of FIG. 13A according to embodiments of the disclosure;

FIG. 13C shows a longitudinal cross-section view of the metal slip of FIG. 13A according to embodiments of the disclosure;

FIG. 13D shows a lateral view of the metal slip of FIG. 13A according to embodiments of the disclosure;

FIG. 15A shows an isometric view of a wedge mandrel according to embodiments of the disclosure;

FIG. 15B shows a longitudinal side cross-sectional view of the wedge mandrel of FIG. 15A according to embodiments of the disclosure;

FIG. 17A shows an isometric view of a fingered member according to embodiments of the disclosure;

FIG. 17B shows a longitudinal side cross-sectional view of the fingered member of FIG. 17A according to embodiments of the disclosure;

FIG. 17C shows a downward view of a gripper insert having serrated teeth according to embodiments of the disclosure;

FIG. 17D shows a side view of a gripper insert having serrated teeth on each side according to embodiments of the disclosure;

FIG. 18A shows a side expanded view of an insert according to embodiments of the disclosure;

FIG. 18B shows a side collapsed view of the insert of FIG. 18A according to embodiments of the disclosure;

FIG. 18C shows an isometric view of an insert according to embodiments of the disclosure;

FIG. 22C shows a longitudinal side cross-sectional view of the downhole tool of FIG. 22A set in a tubular and separated from a workstring according to embodiments of the disclosure;

DETAILED DESCRIPTION

Figure 1:
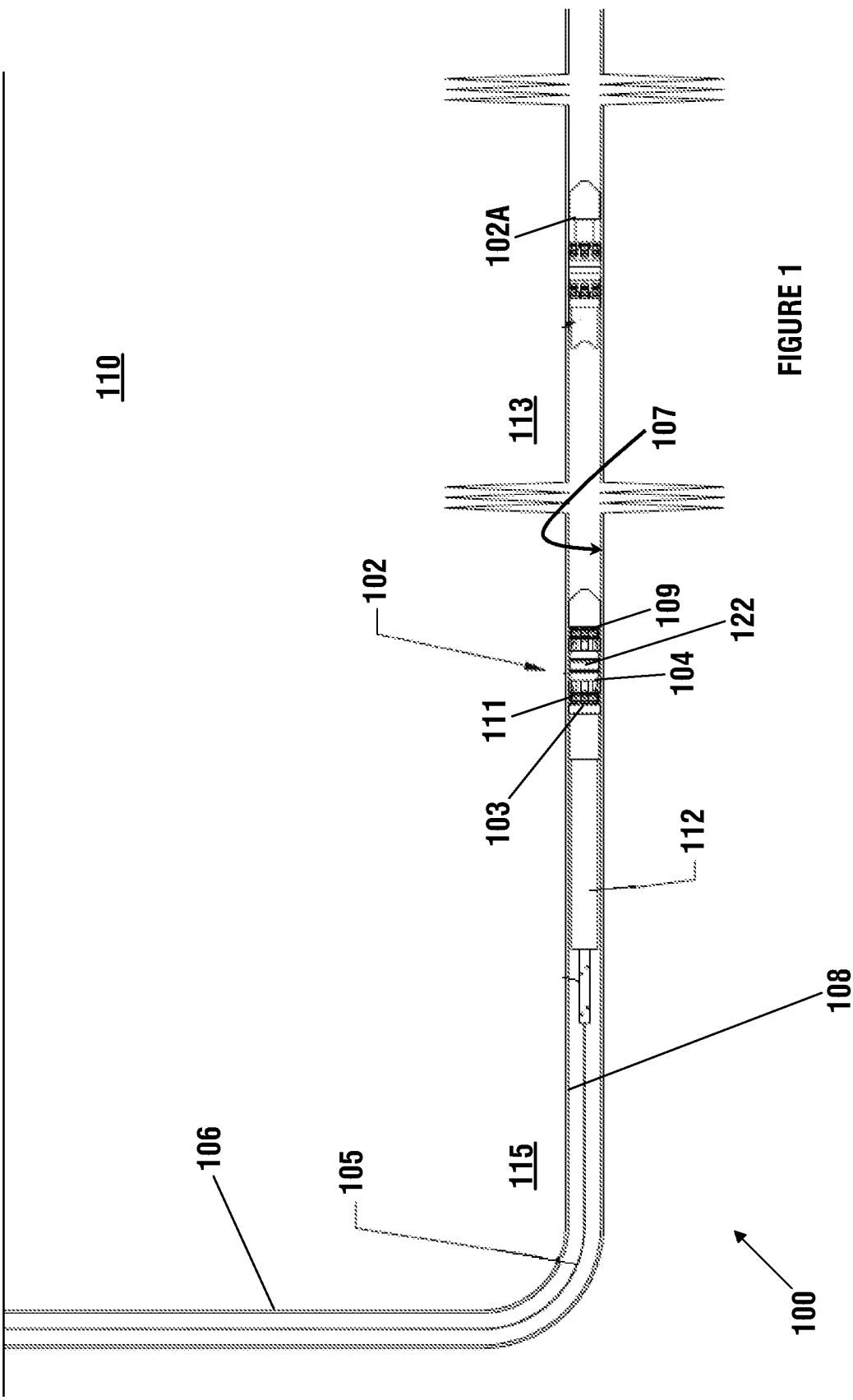
FIG. 1 is a side view of a process diagram of a conventional plugging system.

Herein disclosed are novel apparatuses, systems, and methods that pertain to and are usable for a downhole tool for wellbore operations, details of which are described herein.

Embodiments of the present disclosure are described in detail with reference to the accompanying Figures. In the following discussion and in the claims, the terms "including" and "comprising" are used in an open-ended fashion, such as to mean, for example, "including, but not limited to . . . ". While the disclosure may be described with reference to relevant apparatuses, systems, and methods, it should be understood that the disclosure is not limited to the specific embodiments shown or described. Rather, one skilled in the art will appreciate that a variety of configurations may be implemented in accordance with embodiments herein.

Although not necessary, like elements in the various figures may be denoted by like reference numerals for consistency and ease of understanding. Numerous specific details are set forth in order to provide a more thorough understanding of the disclosure; however, it will be apparent to one of ordinary skill in the art that the embodiments disclosed herein may be practiced without these specific details. In other instances, well-known features have not been described in detail to avoid unnecessarily complicating the description. Directional terms, such as "above," "below," "upper," "lower," "front," "back," etc., are used for convenience and to refer to general direction and/or orientation, and are only intended for illustrative purposes only, and not to limit the disclosure.

Connection(s), couplings, or other forms of contact between parts, components, and so forth may include conventional items, such as lubricant, additional sealing materials, such as a gasket between flanges, PTFE between threads, and the like. The make and manufacture of any particular component, subcomponent, etc., may be as would be apparent to one of skill in the art, such as molding, forming, press extrusion, machining, or additive manufacturing. Embodiments of the disclosure provide for one or more components to be new, used, and/or retrofitted.

Numerical ranges in this disclosure may be approximate, and thus may include values outside of the range unless otherwise indicated. Numerical ranges include all values from and including the expressed lower and the upper values, in increments of smaller units. As an example, if a compositional, physical or other property, such as, for example, molecular weight, viscosity, melt index, etc., is from 100 to 1,000, it is intended that all individual values, such as 100, 101, 102, etc., and sub ranges, such as 100 to 144, 155 to 170, 197 to 200, etc., are expressly enumerated. It is intended that decimals or fractions thereof be included. For ranges containing values which are less than one or containing fractional numbers greater than one (e.g., 1.1, 1.5, etc.), smaller units may be considered to be 0.0001, 0.001, 0.01, 0.1, etc. as appropriate. These are only examples of what is specifically intended, and all possible combinations of numerical values between the lowest value and the highest value enumerated, are to be considered to be expressly stated in this disclosure.

Terms

Composition of matter: as used herein may refer to one or more ingredients or constituents that make up a material (or material of construction). For example, a material may have a composition of matter. Similarly, a device may be made of a material having a composition of matter. The composition of matter may be derived from an initial composition.

Reactive Material: as used herein may refer a material with a composition of matter having properties and/or characteristics that result in the material responding to a change over time and/or under certain conditions. Reactive material may encompass degradable, dissolvable, disassociatable, and so on.

Degradable Material: as used herein may refer to a composition of matter having properties and/or characteristics that, while subject to change over time and/or under certain conditions, lead to a change in the integrity of the material. As one example, the material may initially be hard, rigid, and strong at ambient or surface conditions, but over time (such as within about 12-36 hours) and under certain conditions (such as wellbore conditions), the material softens.

Dissolvable Material: analogous to degradable material; as used herein may refer to a composition of matter having properties and/or characteristics that, while subject to change over time and/or under certain conditions, lead to a change in the integrity of the material, including to the point of degrading, or partial or complete dissolution. As one example, the material may initially be hard, rigid, and strong at ambient or surface conditions, but over time (such as within about 12-36 hours) and under certain conditions (such as wellbore conditions), the material softens. As another example, the material may initially be hard, rigid, and strong at ambient or surface conditions, but over time (such as within about 12-36 hours) and under certain conditions (such as wellbore conditions), the material dissolves at least partially, and may dissolve completely. The material may dissolve via one or more mechanisms, such as oxidation, reduction, deterioration, go into solution, or otherwise lose sufficient mass and structural integrity.

Breakable Material: as used herein may refer to a composition of matter having properties and/or characteristics that, while subject to change over time and/or under certain conditions, lead to brittleness. As one example, the material may be hard, rigid, and strong at ambient or surface conditions, but over time and under certain conditions, becomes brittle. The breakable material may experience breakage into multiple pieces, but not necessarily dissolution.

Disassociatable Material: as used herein may refer to a composition of matter having properties and/or characteristics that, while subject to change over time and/or under certain conditions, lead to a change in the integrity of the material, including to the point of changing from a solid structure to a powdered material. As one example, the material may initially be hard, rigid, and strong at ambient or surface conditions, but over time (such as within about 12-36 hours) and under certain conditions (such as wellbore conditions), the material changes (disassociates) to a powder.

For some embodiments, a material of construction may include a composition of matter designed or otherwise having the inherent characteristic to react or change integrity or other physical attribute when exposed to certain wellbore conditions, such as a change in time, temperature, water, heat, pressure, solution, combinations thereof, etc. Heat may be present due to the temperature increase attributed to the natural temperature gradient of the earth, and water may already be present in existing wellbore fluids. The change in integrity may occur in a predetermined time period, which may vary from several minutes to several weeks. In aspects, the time period may be about 12 to about 36 hours.

In some embodiments, the material may degrade to the point of 'mush' or disassociate to a powder, while in other embodiments, the material may dissolve or otherwise disintegrate and be carried away by fluid flowing in the wellbore. The temperature of the downhole fluid may affect the rate change in integrity. The material need not form a solution when it dissolves in the aqueous phase. For example, the material may dissolve, break, or otherwise disassociate into sufficiently small particles (i.e., a colloid), that may be removed by the fluid as it circulates in the well. In embodiments, the material may become degradable, but not dissolvable. In other embodiments, the material may become degradable, and subsequently dissolvable. In still other embodiments, the material may become breakable (or brittle), but not dissolvable. In yet other embodiments, the material may become breakable, and subsequently dissolvable. In still yet other embodiments, the material may disassociate.

Referring now to FIGS. 2A and 2B together, isometric views of a system 200 having a downhole tool 202 illustrative of embodiments disclosed herein, are shown. FIG. 2B depicts a wellbore 206 formed in a subterranean formation 210 with a tubular 208 disposed therein. In an embodiment, the tubular 208 may be casing (e.g., casing, hung casing, casing string, etc.) (which may be cemented). A workstring 212 (which may include a part 217 of a setting tool coupled with adapter 252) may be used to position or run the downhole tool 202 into and through the wellbore 206 to a desired location.

In accordance with embodiments of the disclosure, the tool 202 may be configured as a plugging tool, which may be set within the tubular 208 in such a manner that the tool 202 forms a fluid-tight seal against the inner surface 207 of the tubular 208. In an embodiment, the downhole tool 202 may be configured as a bridge plug, whereby flow from one section of the wellbore 213 to another (e.g., above and below the tool 202) is controlled. In other embodiments, the downhole tool 202 may be configured as a frac plug, where flow into one section 213 of the wellbore 206 may be blocked and otherwise diverted into the surrounding formation or reservoir 210.

In yet other embodiments, the downhole tool 202 may also be configured as a ball drop tool. In this aspect, a ball may be dropped into the wellbore 206 and flowed into the tool 202 and come to rest in a corresponding ball seat at the end of the mandrel 214. The seating of the ball may provide a seal within the tool 202 resulting in a plugged condition, whereby a pressure differential across the tool 202 may result. The ball seat may include a radius or curvature.

In other embodiments, the downhole tool 202 may be a ball check plug, whereby the tool 202 is configured with a ball already in place when the tool 202 runs into the wellbore. The tool 202 may then act as a check valve, and provide one-way flow capability. Fluid may be directed from the wellbore 206 to the formation with any of these configurations.

Once the tool 202 reaches the set position within the tubular, the setting mechanism or workstring 212 may be detached from the tool 202 by various methods, resulting in the tool 202 left in the surrounding tubular and one or more sections of the wellbore isolated. In an embodiment, once the tool 202 is set, tension may be applied to the adapter 252 until the threaded connection between the adapter 252 and the mandrel 214 is broken. For example, the mating threads on the adapter 252 and the mandrel 214 (256 and 216, respectively as shown in FIG. 2D) may be designed to shear, and thus may be pulled and sheared accordingly in a manner known in the art. The amount of load applied to the adapter 252 may be in the range of about, for example, 20,000 to 40,000 pounds force. In other applications, the load may be in the range of less than about 10,000 pounds force.

Accordingly, the adapter 252 may separate or detach from the mandrel 214, resulting in the workstring 212 being able to separate from the tool 202, which may be at a predetermined moment. The loads provided herein are non-limiting and are merely exemplary. The setting force may be determined by specifically designing the interacting surfaces of the tool and the respective tool surface angles. The tool 202 may also be configured with a predetermined failure point (not shown) configured to fail or break. For example, the failure point may break at a predetermined axial force greater than the force required to set the tool but less than the force required to part the body of the tool.

Operation of the downhole tool 202 may allow for fast run in of the tool 202 to isolate one or more sections of the wellbore 206, as well as quick and simple drill-through to destroy or remove the tool 202. Drill-through of the tool 202 may be facilitated by components and sub-components of tool 202 made of drillable material that is less damaging to a drill bit than those found in conventional plugs. In an embodiment, the downhole tool 202 and/or its components may be a drillable tool made from drillable composite material(s), such as glass fiber/epoxy, carbon fiber/epoxy, glass fiber/PEEK, carbon fiber/PEEK, etc. Other resins may include phenolic, polyamide, etc. All mating surfaces of the downhole tool 202 may be configured with an angle, such that corresponding components may be placed under compression instead of shear.

The downhole tool 202 may have one or more components made of non-composite material, such as a metal or metal alloys. The downhole tool 2102 may have one or more components made of a reactive material (e.g., dissolvable, degradable, etc.).

In embodiments, one or more components may be made of a metallic material, such as an aluminum-based or magnesium-based material. The metallic material may be reactive, such as dissolvable, which is to say under certain conditions the respective component(s) may begin to dissolve, and thus alleviating the need for drill thru. In embodiments, the components of the tool 202 may be made of dissolvable aluminum-, magnesium-, or aluminum-magnesium-based (or alloy, complex, etc.) material, such as that provided by Nanjing Highsur Composite Materials Technology Co. LTD.

One or more components of tool 202 may be made of non-dissolvable materials (e.g., materials suitable for and are known to withstand downhole environments [including extreme pressure, temperature, fluid properties, etc.] for an extended period of time (predetermined or otherwise) as may be desired).

Just the same, one or more components of a tool of embodiments disclosed herein may be made of reactive materials (e.g., materials suitable for and are known to dissolve, degrade, etc. in downhole environments [including extreme pressure, temperature, fluid properties, etc.] after a brief or limited period of time (predetermined or otherwise) as may be desired). In an embodiment, a component made of a reactive material may begin to react within about 3 to about 48 hours after setting of the downhole tool 202.

The downhole tool 202 (and other tool embodiments disclosed herein) and/or one or more of its components may be 3D printed as would be apparent to one of skill in the art, such as via one or more methods or processes described in U.S. Pat. Nos. 6,353,771; 5,204,055; 7,087,109; 7,141,207; and 5,147, 587. See also information available at the web-sites of Z Corporation (www.zcorp.com); Prometal (www.prometal.com); EOS GmbH (www.eos.info); and 3D Systems, Inc. (www.3dsystems.com); and Stratasys, Inc. (www.stratasys.com and www.dimensionprinting.com) (applicable to all embodiments).

Figure 2C:
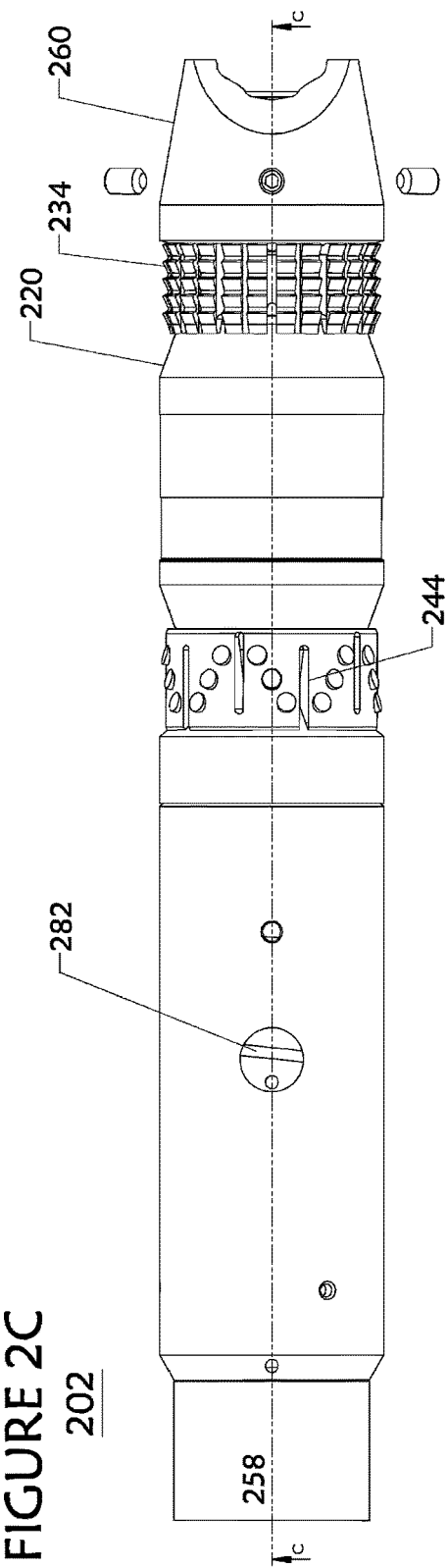
FIG. 2C shows a side longitudinal view of a downhole tool according to embodiments of the disclosure.
Figure 2D:
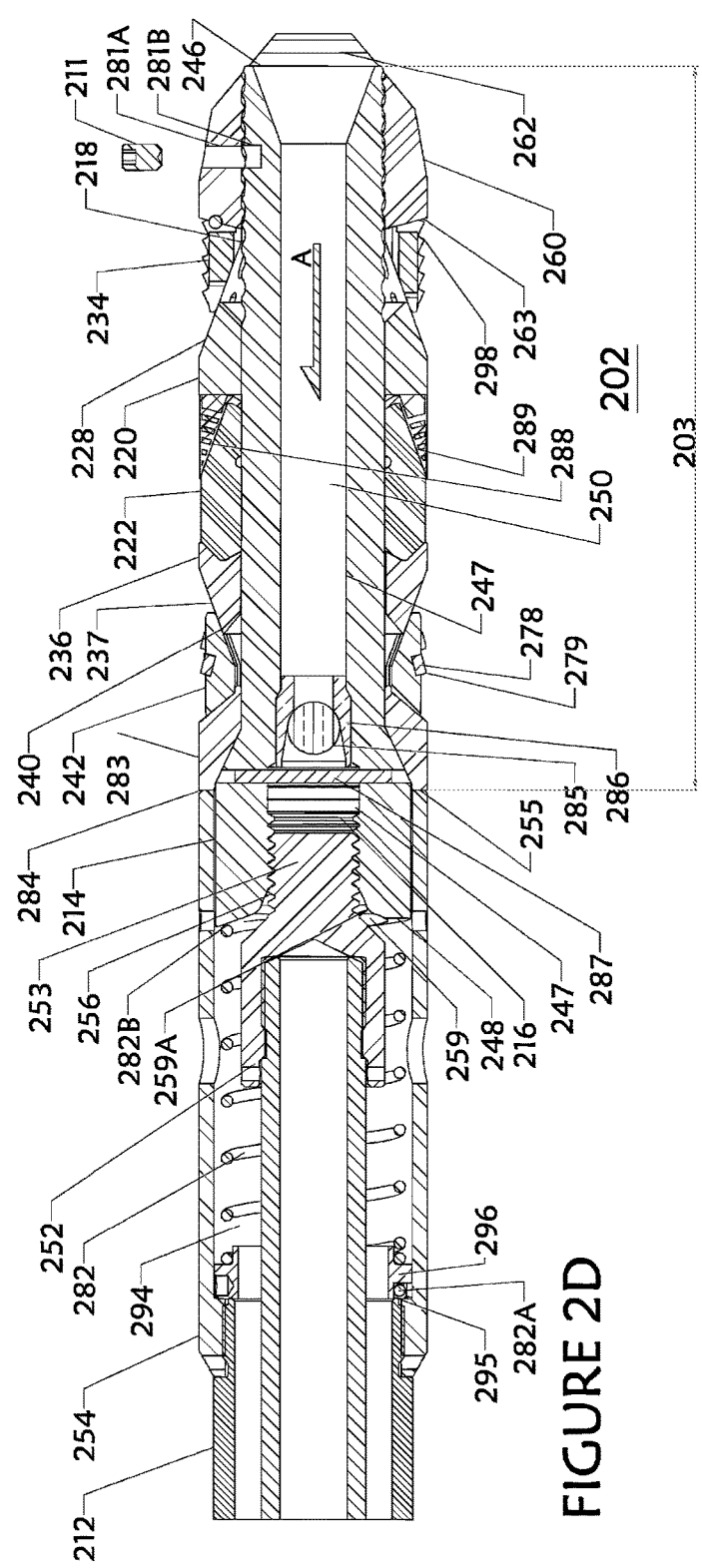
FIG. 2D shows a longitudinal cross-sectional view of a downhole tool according to embodiments of the disclosure.
Figure 2E:
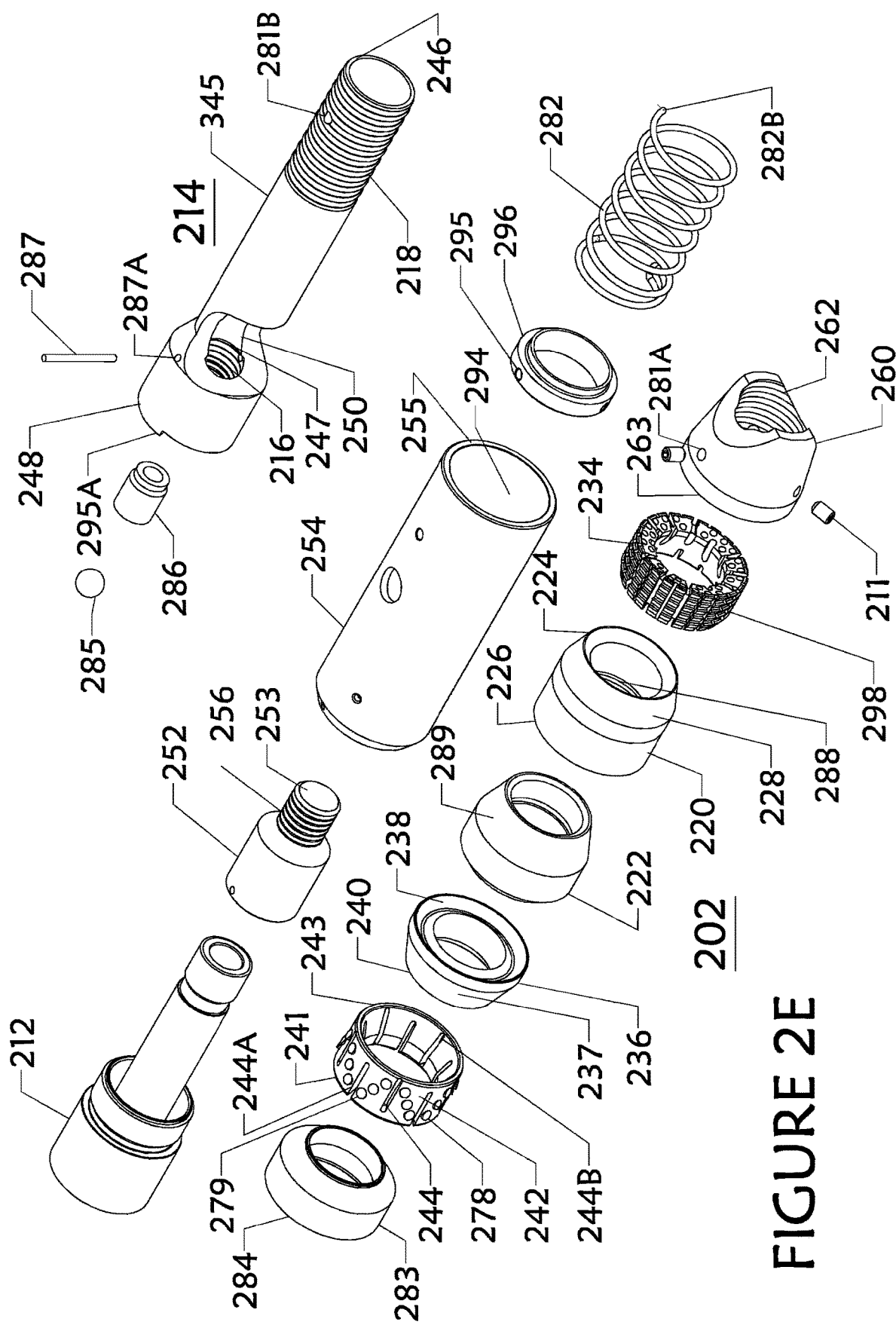
FIG. 2E shows an isometric component break-out view of a downhole tool according to embodiments of the disclosure.

Referring now to FIGS. 2C-2E together, a longitudinal view, a longitudinal cross-sectional view, and an isometric component break-out view, respectively, of downhole tool 202 useable with system (200, FIG. 2A) and illustrative of embodiments disclosed herein, are shown. The downhole tool 202 may include a mandrel 214 that extends through the tool (or tool body) 202. The mandrel 214 may be a solid body. In other aspects, the mandrel 214 may include a flowpath or bore 250 formed therein (e.g., an axial bore). The bore 250 may extend partially or for a short distance through the mandrel 214, as shown in FIG. 2E. Alternatively, the bore 250 may extend through the entire mandrel 214, with an opening at its proximate end 248 and oppositely at its distal end 246 (near downhole end of the tool 202), as illustrated by FIG. 2D.

The presence of the bore 250 or other flowpath through the mandrel 214 may indirectly be dictated by operating conditions. That is, in most instances the tool 202 may be large enough in diameter (e.g., 4¾ inches) that the bore 250 may be correspondingly large enough (e.g., 1¼ inches) so that debris and junk can pass or flow through the bore 250 without plugging concerns. However, with the use of a smaller diameter tool 202, the size of the bore 250 may need to be correspondingly smaller, which may result in the tool 202 being prone to plugging. Accordingly, the mandrel may be made solid to alleviate the potential of plugging within the tool 202.

With the presence of the bore 250, the mandrel 214 may have an inner bore surface 247, which may include one or more threaded surfaces formed thereon. As such, there may be a first set of threads 216 configured for coupling the mandrel 214 with corresponding threads 256 of a setting adapter 252.

The coupling of the threads, which may be shear threads, may facilitate detachable connection of the tool 202 and the setting adapter 252 and/or workstring (212, FIG. 2B) at the threads. It is within the scope of the disclosure that the tool 202 may also have one or more predetermined failure points (not shown) configured to fail or break separately from any threaded connection. The failure point may fail or shear at a predetermined axial force greater than the force required to set the tool 202. In an embodiment, the mandrel 214 may be configured with a failure point.

Figure 10B:
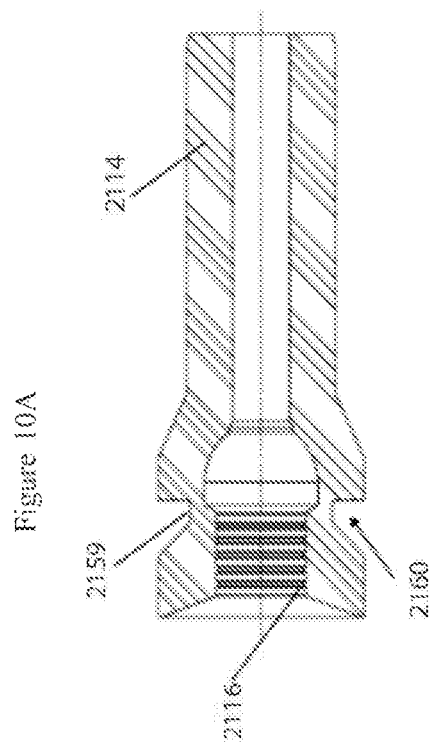
FIG. 10B shows a longitudinal side view of the mandrel of FIG. 10A according to embodiments of the disclosure.
Figure 10A:
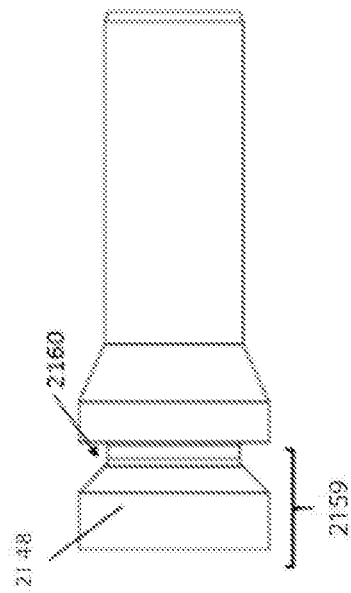
FIG. 10A shows a longitudinal cross-sectional view of a mandrel configured with a relief point according to embodiments of the disclosure.

Referring briefly to FIGS. 10A and 10B, a longitudinal cross-sectional view and a longitudinal side view, respectively, of a mandrel configured with a relief point, are shown. In FIGS. 10A and 10B together, an embodiment of a mandrel 2114 configured with a relief point (or area, region, etc.) 2160. The relief point 2160 may be formed by machining out or otherwise forming a groove 2159 in mandrel end 2148. The groove 2159 may be formed circumferentially in the mandrel 2114. The mandrel 2114 may be useable with any downhole tool embodiment disclosed herein, such as tool 202, 302, etc.

This type of configuration may allow, for example, where, in some applications, it may be desirable, to rip off or shear mandrel head 2159 instead of shearing threads 2116. In this respect, failing composite (or glass fibers) in tension may be potentially more accurate then shearing threads.

Referring again to FIGS. 2C-2E together, the adapter 252 may include a stud 253 configured with the threads 256 thereon. In an embodiment, the stud 253 has external (male) threads 256 and the mandrel 214 has internal (female) threads; however, type or configuration of threads is not meant to be limited, and could be, for example, a vice versa female-male connection, respectively.

The downhole tool 202 may be run into wellbore (206, FIG. 2A) to a desired depth or position by way of the workstring (212, FIG. 2A) that may be configured with the setting device or mechanism. The workstring 212 and setting sleeve 254 may be part of the plugging tool system 200 utilized to run the downhole tool 202 into the wellbore, and activate the tool 202 to move from an unset to set position. The set position may include seal element 222 and/or slips 234, 242 engaged with the tubular (208, FIG. 2B). In an embodiment, the setting sleeve 254 (that may be configured as part of the setting mechanism or workstring) may be utilized to force or urge compression of the seal element 222, as well as swelling of the seal element 222 into sealing engagement with the surrounding tubular.

Figure 11B:
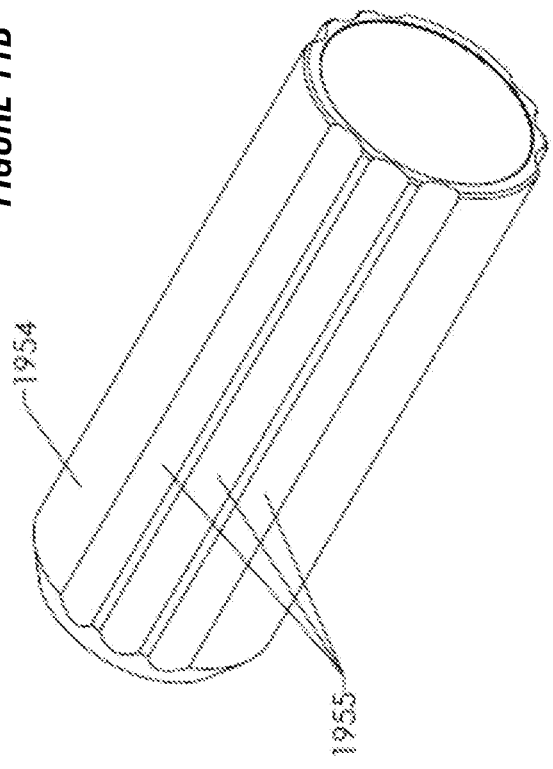
FIG. 11B shows an isometric view of the channeled sleeve of FIG. 11A according to embodiments of the disclosure.
Figure 11A:
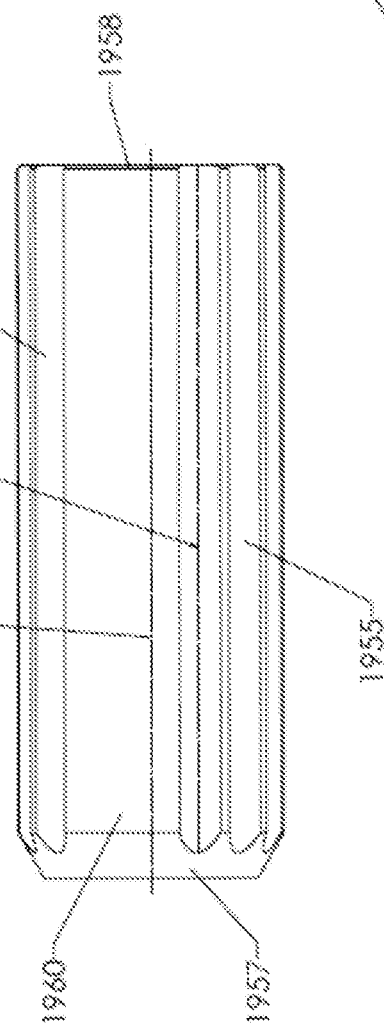
FIG. 11A shows a side view of a channeled sleeve according to embodiments of the disclosure.
Figure 11C:
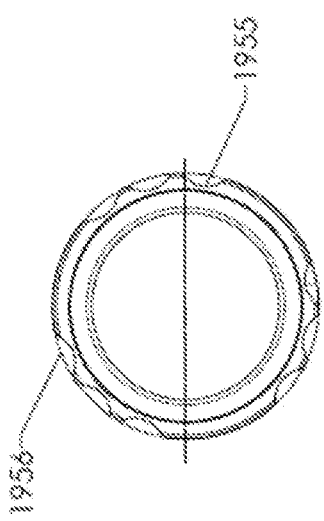
FIG. 11C shows a lateral view of the channeled sleeve of FIG. 11A according to embodiments of the disclosure.

Referring briefly to FIGS. 11A, 11B, and 11C, a presetting downhole view, a downhole view, a longitudinal side body view, an isometric view, and a lateral cross-sectional view, respectively, of a setting sleeve having a reduced hydraulic diameter illustrative of embodiments disclosed herein, are shown. FIGS. 11A-11C illustrate a sleeve 1954 configured with one or more grooves or channels 1955 configured to allow wellbore fluid to readily pass therein, therethrough, thereby, etc., consequently resulting in reduction of the hydraulic resistance (e.g., drag) against the workstring 1905 as it is removed from the wellbore 1908. Or put another way, that hydraulic pressure above the setting sleeve 1954 can be 'relieved' or bypassed below the sleeve 1954. Channels 1955 may also provide pressure relief during perforation because at least some of the pressure (or shock) wave can be alleviated. Prior to setting and removal, the sleeve 1954 may be in operable engagement with the downhole tool 1902. In an embodiment, the downhole tool 1902 may be a frac plug.

Because of the large pressures incurred, in using a sleeve 1954 with reduced hydraulic cross-section, it is important to maintain integrity. That is, any sleeve of embodiments disclosed herein must still be robust and inherent in strength to withstand shock pressure, setting forces, etc., and avoid component failure or collapse.

FIGS. 11A-11C together show setting sleeve 1954 may have a first end 1957 and a second end 1958. One or more channels 1955 may extend or otherwise be disposed a length L along the outer surface 1960 of the sleeve 1954. The channel(s) may be parallel or substantially parallel to sleeve axis 1961. One or more channels 1955 may be part of a channel group 1962. There may be multiple channel groups 1962 in the sleeve 1955. As shown in the Figures here, there may be three (3) channel groups 1962. The groups 1962 of channels 1955 may be arranged in an equilateral pattern around the circumference of the sleeve 1954. Indicator ring 1956 illustrates how the outer diameter (or hydraulic diameter) is effectively reduced by the presence of channel(s) 1955. Or put another way, that the sleeve 1954 may have an effective outer surface area greater than an actual outer surface area (e.g., because the actual outermost surface area of the sleeve in the circumferential sense is "void" of area).

Although FIGS. 11A-11C depict one example, embodiments herein pertaining to the sleeve 1954 are not meant to be limited thereby. One of skill in the art would appreciate there may be other configurations of channel(s) suitable to reduce the hydraulic diameter of the sleeve 1954 (and/or provide fluid bypass capability), but yet provide the sleeve 1954 with adequate integrity suitable for setting, downhole conditions, and so forth.

There may be a channel(s) arranged in a non-axial or non-linear manner, for example, as spiral-wound, helical etc. It is worth noting that although embodiments of the sleeve channel may extend from one end of the sleeve 1957 to approximately the other end of the sleeve 1958, this need not be the case. Thus, the length of the channel L may be less than the length LS of the sleeve 1955. In addition, the channel need not be continuous, such that there may be discontinuous channels.

Other variants of sleeve 1954 having a certain channel groove pattern or cross-sectional shape are possible, including one or more channels having a "v-notch", as well as an 'offset' V-notch, an opposite offset V-notch, a "square" notch, a rounded notch, and combinations thereof (not shown). Moreover, although the groups of channels may be disposed or arranged equidistantly apart, the groups may just as well have an unequal or random placement or distribution. Although the channel pattern or cross-sectional shape may be consistent and continuous, the scope of the disclosure is not limited to such a pattern. Thus, the pattern or cross-sectional shape may vary or have random discontinuities.

Yet other embodiments may include one or more channels disposed within the sleeve instead of on the outer surface. For example, the sleeve 1954 may include a channel formed within the body (or wall thickness) of the sleeve, thus forming an inner passageway for fluid to flow therethrough.

Returning again to FIGS. 2C-2E together, the setting device(s) and components of the downhole tool 202 may be coupled with, and axially and/or longitudinally movable along mandrel 214. When the setting sequence begins, the mandrel 214 may be pulled into tension while the setting sleeve 254 remains stationary. The lower sleeve 260 may be pulled as well because of its attachment to the mandrel 214 by virtue of the coupling of threads 218 and threads 262. As shown in the embodiment of FIGS. 2C and 2D, the lower sleeve 260 and the mandrel 214 may have matched or aligned holes 281A and 281B, respectively, whereby one or more anchor pins 211 or the like may be disposed or securely positioned therein. In embodiments, brass set screws may be used. Pins (or screws, etc.) 211 may prevent shearing or spin-off during drilling or run-in.

As the lower sleeve 260 is pulled in the direction of Arrow A, the components disposed about mandrel 214 between the lower sleeve 260 and the setting sleeve 254 may begin to compress against one another. This force and resultant movement causes compression and expansion of seal element 222. The lower sleeve 260 may also have an angled sleeve end 263 in engagement with the slip 234, and as the lower sleeve 260 is pulled further in the direction of Arrow A, the end 263 compresses against the slip 234. As a result, slip(s) 234 may move along a tapered or angled surface 228 of a composite member 220, and eventually radially outward into engagement with the surrounding tubular (208, FIG. 2B).

Serrated outer surfaces or teeth 298 of the slip(s) 234 may be configured such that the surfaces 298 prevent the slip 234 (or tool) from moving (e.g., axially or longitudinally) within the surrounding tubular, whereas otherwise the tool 202 may inadvertently release or move from its position. Although slip 234 is illustrated with teeth 298, it is within the scope of the disclosure that slip 234 may be configured with other gripping features, such as buttons or inserts.

Initially, the seal element 222 may swell into contact with the tubular, followed by further tension in the tool 202 that may result in the seal element 222 and composite member 220 being compressed together, such that surface 289 acts on the interior surface 288. The ability to "flower", unwind, and/or expand may allow the composite member 220 to extend completely into engagement with the inner surface of the surrounding tubular.

The composite member 220 may provide other synergistic benefits beyond that of creating enhanced sealing. Without the ability to 'flower', the hydraulic cross-section is essentially the back of the tool. However, with a 'flower' effect the hydraulic cross-section becomes dynamic, and is increased. This allows for faster run-in and reduced fluid requirements compared to conventional operations. This is even of greater significance in horizontal applications. In various testing, tools configured with a composite member 220 required about 40 less minutes of run-in compared to conventional tools. When downhole operations run about $30,000-$40,000 per hour, a savings of 40 minutes is of significance.

Additional tension or load may be applied to the tool 202 that results in movement of cone 236, which may be disposed around the mandrel 214 in a manner with at least one surface 237 angled (or sloped, tapered, etc.) inwardly of second slip 242. The second slip 242 may reside adjacent or proximate to collar or cone 236. As such, the seal element 222 forces the cone 236 against the slip 242, moving the slip 242 radially outwardly into contact or gripping engagement with the tubular. Accordingly, the one or more slips 234, 242 may be urged radially outward and into engagement with the tubular (208, FIG. 2B). In an embodiment, cone 236 may be slidingly engaged and disposed around the mandrel 214. As shown, the first slip 234 may be at or near distal end 246, and the second slip 242 may be disposed around the mandrel 214 at or near the proximate end 248. It is within the scope of the disclosure that the position of the slips 234 and 242 may be interchanged. Moreover, slip 234 may be interchanged with a slip comparable to slip 242, and vice versa.

Because the sleeve 254 is held rigidly in place, the sleeve 254 may engage against a bearing plate 283 that may result in the transfer load through the rest of the tool 202. The setting sleeve 254 may have a sleeve end 255 that abuts against the bearing plate end 284. As tension increases through the tool 202, an end of the cone 236, such as second end 240, compresses against slip 242, which may be held in place by the bearing plate 283. As a result of cone 236 having freedom of movement and its conical surface 237, the cone 236 may move to the underside beneath the slip 242, forcing the slip 242 outward and into engagement with the surrounding tubular (208, FIG. 2B).

The second slip 242 may include one or more, gripping elements, such as buttons or inserts 278, which may be configured to provide additional grip with the tubular. The inserts 278 may have an edge or corner 279 suitable to provide additional bite into the tubular surface. In an embodiment, the inserts 278 may be mild steel, such as 1018 heat treated steel. The use of mild steel may result in reduced or eliminated casing damage from slip engagement and reduced drill string and equipment damage from abrasion.

In an embodiment, slip 242 may be a one-piece slip, whereby the slip 242 has at least partial connectivity across its entire circumference. Meaning, while the slip 242 itself may have one or more grooves (or notches, undulations, etc.) 244 configured therein, the slip 242 itself has no initial circumferential separation point. In an embodiment, the grooves 244 may be equidistantly spaced or disposed in the second slip 242. In other embodiments, the grooves 244 may have an alternatingly arranged configuration. That is, one groove 244A may be proximate to slip end 241, the next groove 244B may be proximate to an opposite slip end 243, and so forth.

The tool 202 may be configured with ball plug check valve assembly that includes a ball seat 286. The assembly may be removable or integrally formed therein. In an embodiment, the bore 250 of the mandrel 214 may be configured with the ball seat 286 formed or removably disposed therein. In some embodiments, the ball seat 286 may be integrally formed within the bore 250 of the mandrel 214. In other embodiments, the ball seat 286 may be separately or optionally installed within the mandrel 214, as may be desired.

The ball seat 286 may be configured in a manner so that a ball 285 seats or rests therein, whereby the flowpath through the mandrel 214 may be closed off (e.g., flow through the bore 250 is restricted or controlled by the presence of the ball 285). For example, fluid flow from one direction may urge and hold the ball 285 against the seat 286, whereas fluid flow from the opposite direction may urge the ball 285 off or away from the seat 286. As such, the ball 285 and the check valve assembly may be used to prevent or otherwise control fluid flow through the tool 202. The ball 285 may be conventionally made of a composite material, phenolic resin, etc., whereby the ball 285 may be capable of holding maximum pressures experienced during downhole operations (e.g., fracing). By utilization of retainer pin 287, the ball 285 and ball seat 286 may be configured as a retained ball plug. As such, the ball 285 may be adapted to serve as a check valve by sealing pressure from one direction, but allowing fluids to pass in the opposite direction.

The tool 202 may be configured as a drop ball plug, such that a drop ball may be flowed to a drop ball seat 259. The drop ball may be much larger diameter than the ball of the ball check. In an embodiment, end 248 may be configured with a drop ball seat surface 259 such that the drop ball may come to rest and seat at in the seat proximate end 248. As applicable, the drop ball (not shown here) may be lowered into the wellbore (206, FIG. 2A) and flowed toward the drop ball seat 259 formed within the tool 202. The ball seat may be formed with a radius 259A (i.e., circumferential rounded edge or surface).

In other aspects, the tool 202 may be configured as a bridge plug, which once set in the wellbore, may prevent or allow flow in either direction (e.g., upwardly/downwardly, etc.) through tool 202. Accordingly, it should be apparent to one of skill in the art that the tool 202 of the present disclosure may be configurable as a frac plug, a drop ball plug, bridge plug, etc. simply by utilizing one of a plurality of adapters or other optional components. In any configuration, once the tool 202 is properly set, fluid pressure may be increased in the wellbore, such that further downhole operations, such as fracture in a target zone, may commence.

The tool 202 may include an anti-rotation assembly that includes an anti-rotation device or mechanism 282, which may be a spring, a mechanically spring-energized composite tubular member, and so forth. The device 282 may be configured and usable for the prevention of undesired or inadvertent movement or unwinding of the tool 202 components. As shown, the device 282 may reside in cavity 294 of the sleeve (or housing) 254. During assembly the device 282 may be held in place with the use of a lock ring 296. In other aspects, pins may be used to hold the device 282 in place.

FIG. 2D shows the lock ring 296 may be disposed around a part 217 of a setting tool coupled with the workstring 212. The lock ring 296 may be securely held in place with screws inserted through the sleeve 254. The lock ring 296 may include a guide hole or groove 295, whereby an end 282A of the device 282 may slidingly engage therewith. Protrusions or dogs 295A may be configured such that during assembly, the mandrel 214 and respective tool components may ratchet and rotate in one direction against the device 282; however, the engagement of the protrusions 295A with device end 282B may prevent back-up or loosening in the opposite direction.

The anti-rotation mechanism may provide additional safety for the tool and operators in the sense it may help prevent inoperability of tool in situations where the tool is inadvertently used in the wrong application. For example, if the tool is used in the wrong temperature application, components of the tool may be prone to melt, whereby the device 282 and lock ring 296 may aid in keeping the rest of the tool together. As such, the device 282 may prevent tool components from loosening and/or unscrewing, as well as prevent tool 202 unscrewing or falling off the workstring 212.

Drill-through of the tool 202 may be facilitated by the fact that the mandrel 214, the slips 234, 242, the cone(s) 236, the composite member 220, etc. may be made of drillable material that is less damaging to a drill bit than those found in conventional plugs. The drill bit will continue to move through the tool 202 until the downhole slip 234 and/or 242 are drilled sufficiently that such slip loses its engagement with the well bore. When that occurs, the remainder of the tools, which generally would include lower sleeve 260 and any portion of mandrel 214 within the lower sleeve 260 falls into the well. If additional tool(s) 202 exist in the well bore beneath the tool 202 that is being drilled through, then the falling away portion will rest atop the tool 202 located further in the well bore and will be drilled through in connection with the drill through operations related to the tool 202 located further in the well bore. Accordingly, the tool 202 may be sufficiently removed, which may result in opening the tubular 208.

Referring now to FIGS. 3A, 3B, 3C and 3D together, an isometric view and a longitudinal cross-sectional view of a mandrel usable with a downhole tool, a longitudinal cross-sectional view of an end of a mandrel, and a longitudinal cross-sectional view of an end of a mandrel engaged with a sleeve, in accordance with embodiments disclosed herein, are shown. Components of the downhole tool may be arranged and disposed about the mandrel 314, as described and understood to one of skill in the art, and may be comparable to other embodiments disclosed herein (e.g., see downhole tool 202 with mandrel 214).

The mandrel 314, which may be made from filament wound drillable material, may have a distal end 346 and a proximate end 348. The filament wound material may be made of various angles as desired to increase strength of the mandrel 314 in axial and radial directions. The presence of the mandrel 314 may provide the tool with the ability to hold pressure and linear forces during setting or plugging operations.

The mandrel 314 may be sufficient in length, such that the mandrel may extend through a length of tool (or tool body) (202, FIG. 2B). The mandrel 314 may be a solid body. In other aspects, the mandrel 314 may include a flowpath or bore 350 formed therethrough (e.g., an axial bore). There may be a flowpath or bore 350, for example an axial bore, that extends through the entire mandrel 314, with openings at both the proximate end 348 and oppositely at its distal end 346. Accordingly, the mandrel 314 may have an inner bore surface 347, which may include one or more threaded surfaces formed thereon.

The ends 346, 348 of the mandrel 314 may include internal or external (or both) threaded portions. As shown in FIG. 3C, the mandrel 314 may have internal threads 316 within the bore 350 configured to receive a mechanical or wireline setting tool, adapter, etc. (not shown here). For example, there may be a first set of threads 316 configured for coupling the mandrel 314 with corresponding threads of another component (e.g., adapter 252, FIG. 2B). In an embodiment, the first set of threads 316 are shear threads. In an embodiment, application of a load to the mandrel 314 may be sufficient enough to shear the first set of threads 316. Although not necessary, the use of shear threads may eliminate the need for a separate shear ring or pin, and may provide for shearing the mandrel 314 from the workstring.

The proximate end 348 may include an outer taper 348A. The outer taper 348A may help prevent the tool from getting stuck or binding. For example, during setting the use of a smaller tool may result in the tool binding on the setting sleeve, whereby the use of the outer taper 348 will allow the tool to slide off easier from the setting sleeve. In an embodiment, the outer taper 348A may be formed at an angle φ of about 5 degrees with respect to the axis 358. The length of the taper 348A may be about 0.5 inches to about 0.75 inches There may be a neck or transition portion 349, such that the mandrel may have variation with its outer diameter. In an embodiment, the mandrel 314 may have a first outer diameter D1 that is greater than a second outer diameter D2. Conventional mandrel components are configured with shoulders (i.e., a surface angle of about 90 degrees) that result in components prone to direct shearing and failure. In contrast, embodiments of the disclosure may include the transition portion 349 configured with an angled transition surface 349A. A transition surface angle b may be about 25 degrees with respect to the tool (or tool component axis) 358.

The transition portion 349 may withstand radial forces upon compression of the tool components, thus sharing the load. That is, upon compression the bearing plate 383 and mandrel 314, the forces are not oriented in just a shear direction. The ability to share load(s) among components means the components do not have to be as large, resulting in an overall smaller tool size.

In addition to the first set of threads 316, the mandrel 314 may have a second set of threads 318. In one embodiment, the second set of threads 318 may be rounded threads disposed along an external mandrel surface 345 at the distal end 346. The use of rounded threads may increase the shear strength of the threaded connection.

FIG. 3D illustrates an embodiment of component connectivity at the distal end 346 of the mandrel 314. As shown, the mandrel 314 may be coupled with a sleeve 360 having corresponding threads 362 configured to mate with the second set of threads 318. In this manner, setting of the tool may result in distribution of load forces along the second set of threads 318 at an angle a away from axis 358. There may be one or more balls 364 disposed between the sleeve 360 and slip 334. The balls 364 may help promote even breakage of the slip 334.

Accordingly, the use of round threads may allow a non-axial interaction between surfaces, such that there may be vector forces in other than the shear/axial direction. The round thread profile may create radial load (instead of shear) across the thread root. As such, the rounded thread profile may also allow distribution of forces along more thread surface(s). As composite material is typically best suited for compression, this allows smaller components and added thread strength. This beneficially provides upwards of 5-times strength in the thread profile as compared to conventional composite tool connections.

With particular reference to FIG. 3C, the mandrel 314 may have a ball seat 386 disposed therein. In some embodiments, the ball seat 386 may be a separate component, while in other embodiments the ball seat 386 may be formed integral with the mandrel 314. There also may be a drop ball seat surface 359 formed within the bore 350 at the proximate end 348. The ball seat 359 may have a radius 359A that provides a rounded edge or surface for the drop ball to mate with. In an embodiment, the radius 359A of seat 359 may be smaller than the ball that seats in the seat. Upon seating, pressure may "urge" or otherwise wedge the drop ball into the radius, whereby the drop ball will not unseat without an extra amount of pressure. The amount of pressure required to urge and wedge the drop ball against the radius surface, as well as the amount of pressure required to unwedge the drop ball, may be predetermined. Thus, the size of the drop ball, ball seat, and radius may be designed, as applicable.

The use of a small curvature or radius 359A may be advantageous as compared to a conventional sharp point or edge of a ball seat surface. For example, radius 359A may provide the tool with the ability to accommodate drop balls with variation in diameter, as compared to a specific diameter. In addition, the surface 359 and radius 359A may be better suited to distribution of load around more surface area of the ball seat as compared to just at the contact edge/point of other ball seats.

The drop ball (or "frac ball") may be any type of ball apparent to one of skill in the art and suitable for use with embodiments disclosed herein. Although nomenclature of 'drop' or 'frac' ball is used, any such ball may be a ball held in place or otherwise positioned within a downhole tool.

The drop ball may be a "smart" ball (not shown here) configured to monitor or measure downhole conditions, and otherwise convey information back to the surface or an operator, such as the ball(s) provided by Aquanetus Technology, Inc. or OpenField Technology.

In other aspects, drop ball may be made from a composite material. In an embodiment, the composite material may be wound filament. Other materials are possible, such as glass or carbon fibers, phenolic material, plastics, fiberglass composite (sheets), plastic, etc.

The drop ball may be made from a dissolvable material, such as that as disclosed in co-pending U.S. patent application Ser. No. 15/784,020, and incorporated herein by reference as it pertains to dissolvable materials. The ball may be configured or otherwise designed to dissolve under certain conditions or various parameters, including those related to temperature, pressure, and composition.

Figure 4A:
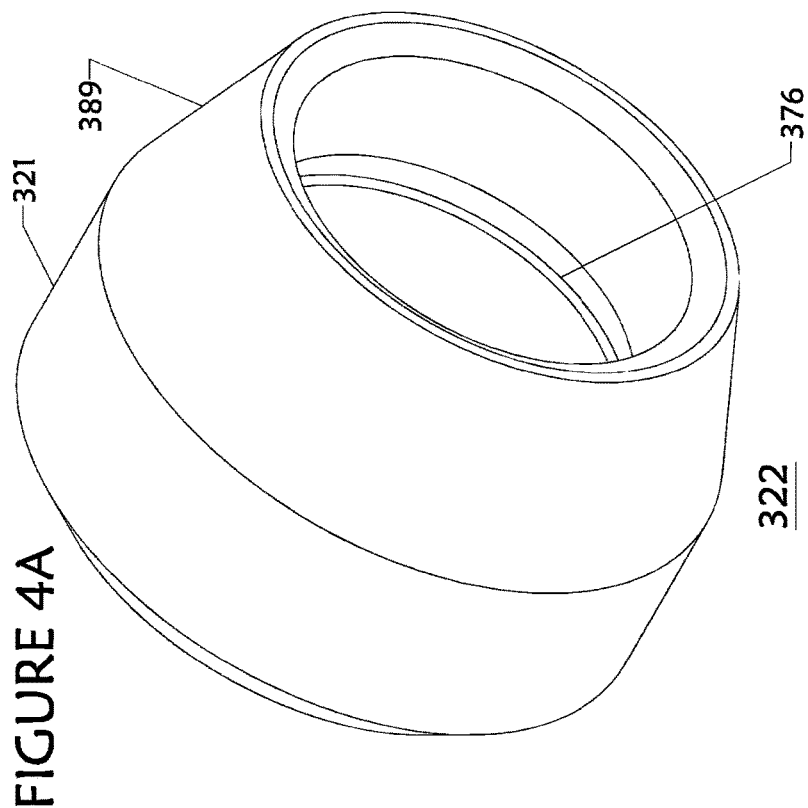
FIG. 4A shows a longitudinal cross-sectional view of a seal element usable with a downhole tool according to embodiments of the disclosure.
Figure 4B:
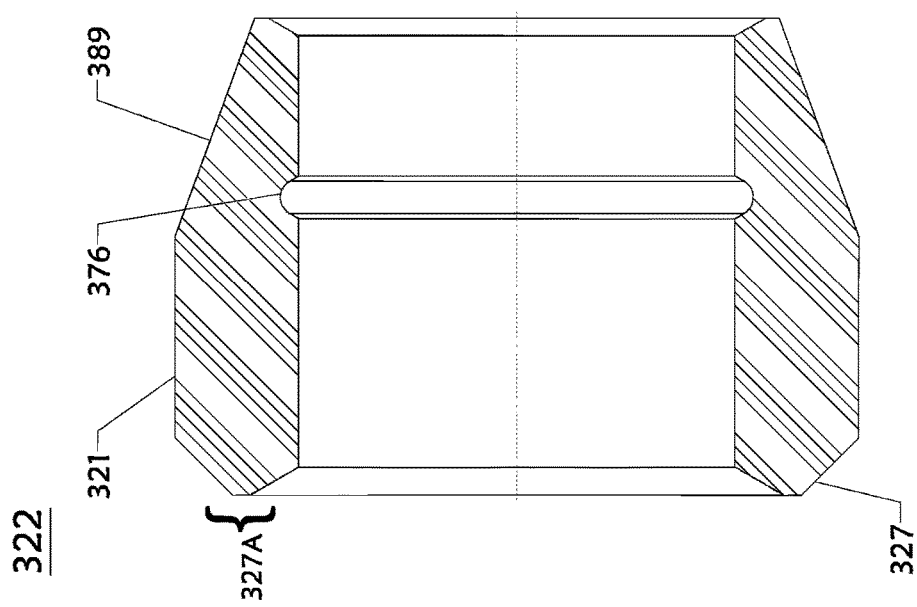
FIG. 4B shows an isometric view of a seal element usable with a downhole tool according to embodiments of the disclosure.

Referring now to FIGS. 4A and 4B together, a longitudinal cross-sectional view and an isometric view of a seal element (and its subcomponents), respectively, usable with a downhole tool in accordance with embodiments disclosed herein are shown. The seal element 322 may be made of an elastomeric and/or poly material, such as rubber, nitrile rubber, Viton or polyurethane, and may be configured for positioning or otherwise disposed around the mandrel (e.g., 214, FIG. 2C). In an embodiment, the seal element 322 may be made from 75 to 80 Duro A elastomer material. The seal element 322 may be disposed between a first slip and a second slip (see FIG. 2C, seal element 222 and slips 234, 236).

The seal element 322 may be configured to buckle (deform, compress, etc.), such as in an axial manner, during the setting sequence of the downhole tool (202, FIG. 2C). However, although the seal element 322 may buckle, the seal element 322 may also be adapted to expand or swell, such as in a radial manner, into sealing engagement with the surrounding tubular (208, FIG. 2B) upon compression of the tool components. In a preferred embodiment, the seal element 322 provides a fluid-tight seal of the seal surface 321 against the tubular.

The seal element 322 may have one or more angled surfaces configured for contact with other component surfaces proximate thereto. For example, the seal element may have angled surfaces 327 and 389. The seal element 322 may be configured with an inner circumferential groove 376. The presence of the groove 376 assists the seal element 322 to initially buckle upon start of the setting sequence. The groove 376 may have a size (e.g., width, depth, etc.) of about 0.25 inches.

Slips.

Referring now to FIGS. 5A, 5B, 5C, 5D, 5E, 5F, and 5G together, an isometric view, a lateral view, and a longitudinal cross-sectional view of one or more slips, and an isometric view of a metal slip, a lateral view of a metal slip, a longitudinal cross-sectional view of a metal slip, and an isometric view of a metal slip without buoyant material holes, respectively, (and related subcomponents) usable with a downhole tool in accordance with embodiments disclosed herein are shown. The slips 334, 342 described may be made from metal, such as cast iron, or from composite material, such as filament wound composite. During operation, the winding of the composite material may work in conjunction with inserts under compression in order to increase the radial load of the tool.

Either or both of slips 334, 342 may be made of non-composite material, such as a metal or metal alloys. Either or both of slips 334, 342 may be made of a reactive material (e.g., dissolvable, degradable, etc.). In embodiments, the material may be a metallic material, such as an aluminum-based or magnesium-based material. The metallic material may be reactive, such as dissolvable, which is to say under certain conditions the respective component(s) may begin to dissolve, and thus alleviating the need for drill thru. In embodiments, any slip of the tool embodiments disclosed herein may be made of dissolvable aluminum-, magnesium-, or aluminum-magnesium-based (or alloy, complex, etc.) material, such as that provided by Nanjing Highsur Composite Materials Technology Co. LTD.

Slips 334, 342 may be used in either upper or lower slip position, or both, without limitation. As apparent, there may be a first slip 334, which may be disposed around the mandrel (214, FIG. 2C), and there may also be a second slip 342, which may also be disposed around the mandrel. Either of slips 334, 342 may include a means for gripping the inner wall of the tubular, casing, and/or well bore, such as a plurality of gripping elements, including serrations or teeth 398, inserts 378, etc. As shown in FIGS. 5D-5F, the first slip 334 may include rows and/or columns 399 of serrations 398. The gripping elements may be arranged or configured whereby the slips 334, 342 engage the tubular (not shown) in such a manner that movement (e.g., longitudinally axially) of the slips or the tool once set is prevented.

In embodiments, the slip 334 may be a poly-moldable material. In other embodiments, the slip 334 may be hardened, surface hardened, heat-treated, carburized, etc., as would be apparent to one of ordinary skill in the art. However, in some instances, slips 334 may be too hard and end up as too difficult or take too long to drill through.

Typically, hardness on the teeth 398 may be about 40-60 Rockwell. As understood by one of ordinary skill in the art, the Rockwell scale is a hardness scale based on the indentation hardness of a material. Typical values of very hard steel have a Rockwell number (HRC) of about 55-66. In some aspects, even with only outer surface heat treatment the inner slip core material may become too hard, which may result in the slip 334 being impossible or impracticable to drill-thru.

Thus, the slip 334 may be configured to include one or more holes 393 formed therein. The holes 393 may be longitudinal in orientation through the slip 334. The presence of one or more holes 393 may result in the outer surface(s) 307 of the metal slips as the main and/or majority slip material exposed to heat treatment, whereas the core or inner body (or surface) 309 of the slip 334 is protected. In other words, the holes 393 may provide a barrier to transfer of heat by reducing the thermal conductivity (i.e., k-value) of the slip 334 from the outer surface(s) 307 to the inner core or surfaces 309. The presence of the holes 393 is believed to affect the thermal conductivity profile of the slip 334, such that that heat transfer is reduced from outer to inner because otherwise when heat/quench occurs the entire slip 334 heats up and hardens.

Thus, during heat treatment, the teeth 398 on the slip 334 may heat up and harden resulting in heat-treated outer area/teeth, but not the rest of the slip. In this manner, with treatments such as flame (surface) hardening, the contact point of the flame is minimized (limited) to the proximate vicinity of the teeth 398.

With the presence of one or more holes 393, the hardness profile from the teeth to the inner diameter/core (e.g., laterally) may decrease dramatically, such that the inner slip material or surface 309 has a HRC of about ~15 (or about normal hardness for regular steel/cast iron). In this aspect, the teeth 398 stay hard and provide maximum bite, but the rest of the slip 334 is easily drillable.

One or more of the void spaces/holes 393 may be filled with useful "buoyant" (or low density) material 400 to help debris and the like be lifted to the surface after drill-thru. The material 400 disposed in the holes 393 may be, for example, polyurethane, light weight beads, or glass bubbles/beads such as the K-series glass bubbles made by and available from 3M. Other low-density materials may be used.

The advantageous use of material 400 helps promote lift on debris after the slip 334 is drilled through. The material 400 may be epoxied or injected into the holes 393 as would be apparent to one of skill in the art.

The metal slip 334 may be treated with an induction hardening process. In such a process, the slip 334 may be moved through a coil that has a current run through it. As a result of physical properties of the metal and magnetic properties, a current density (created by induction from the e-field in the coil) may be controlled in a specific location of the teeth 398. This may lend to speed, accuracy, and repeatability in modification of the hardness profile of the slip 334. Thus, for example, the teeth 398 may have a RC in excess of 60, and the rest of the slip 334 (essentially virgin, unchanged metal) may have a RC less than about 15.

The slots 392 in the slip 334 may promote breakage. An evenly spaced configuration of slots 392 promotes even breakage of the slip 334. The metal slip 334 may have a body having a one-piece configuration defined by at least partial connectivity of slip material around the entirety of the body, as shown in FIG. 5D via connectivity reference line 374. The slip 334 may have at least one lateral groove 371. The lateral groove may be defined by a depth 373. The depth 373 may extend from the outer surface 307 to the inner surface 309.

First slip 334 may be disposed around or coupled to the mandrel (214, FIG. 2B) as would be known to one of skill in the art, such as a band or with shear screws (not shown) configured to maintain the position of the slip 334 until sufficient pressure (e.g., shear) is applied. The band may be made of steel wire, plastic material or composite material having the requisite characteristics in sufficient strength to hold the slip 334 in place while running the downhole tool into the wellbore, and prior to initiating setting. The band may be drillable.

When sufficient load is applied, the slip 334 compresses against the resilient portion or surface of the composite member (e.g., 220, FIG. 2C), and subsequently expand radially outwardly to engage the surrounding tubular (see, for example, slip 234 and composite member 220 in FIG. 2C). FIG. 5G illustrates slip 334 may be a hardened cast iron slip without the presence of any grooves or holes 393 formed therein.

The slip 342 may be a one-piece slip, whereby the slip 342 has at least partial connectivity across its entire circumference. Meaning, while the slip 342 itself may have one or more grooves 344 configured therein, the slip 342 has no separation point in the pre-set configuration. In an embodiment, the grooves 344 may be equidistantly spaced or cut in the second slip 342. In other embodiments, the grooves 344 may have an alternatingly arranged configuration. That is, one groove 344A may be proximate to slip end 341 and adjacent groove 344B may be proximate to an opposite slip end 343. As shown in groove 344A may extend all the way through the slip end 341, such that slip end 341 is devoid of material at point 372. The slip 342 may have an outer slip surface 390 and an inner slip surface 391.

Where the slip 342 is devoid of material at its ends, that portion or proximate area of the slip may have the tendency to flare first during the setting process. The arrangement or position of the grooves 344 of the slip 342 may be designed as desired. In an embodiment, the slip 342 may be designed with grooves 344 resulting in equal distribution of radial load along the slip 342. Alternatively, one or more grooves, such as groove 344B may extend proximate or substantially close to the slip end 343, but leaving a small amount material 335 therein. The presence of the small amount of material gives slight rigidity to hold off the tendency to flare. As such, part of the slip 342 may expand or flare first before other parts of the slip 342. There may be one or more grooves 344 that form a lateral opening 394a through the entirety of the slip body. That is, groove 344 may extend a depth 394 from the outer slip surface 390 to the inner slip surface 391. Depth 394 may define a lateral distance or length of how far material is removed from the slip body with reference to slip surface 390 (or also slip surface 391). FIG. 5A illustrates the at least one of the grooves 344 may be further defined by the presence of a first portion of slip material 335a on or at first end 341, and a second portion of slip material 335b on or at second end 343.

The slip 342 may have one or more inner surfaces with varying angles. For example, there may be a first angled slip surface 329 and a second angled slip surface 333. In an embodiment, the first angled slip surface 329 may have a 20-degree angle, and the second angled slip surface 333 may have a 40-degree angle; however, the degree of any angle of the slip surfaces is not limited to any particular angle. Use of angled surfaces allows the slip 342 significant engagement force, while utilizing the smallest slip 342 possible.

The use of a rigid single- or one-piece slip configuration may reduce the chance of presetting that is associated with conventional slip rings, as conventional slips are known for pivoting and/or expanding during run in. As the chance for pre-set is reduced, faster run-in times are possible.

The slip 342 may be used to lock the tool in place during the setting process by holding potential energy of compressed components in place. The slip 342 may also prevent the tool from moving as a result of fluid pressure against the tool. The second slip (342, FIG. 5A) may include inserts 378 disposed thereon. In an embodiment, the inserts 378 may be epoxied or press fit into corresponding insert bores or grooves 375 formed in the slip 342.

Referring now to FIGS. 6A, 6B, 6C, 6D, 6E, and 6F together, an isometric view, a longitudinal cross-sectional view, a close-up longitudinal cross-sectional view, a side longitudinal view, a longitudinal cross-sectional view, and an underside isometric view, respectively, of a composite deformable member 320 (and its subcomponents) usable with a downhole tool in accordance with embodiments disclosed herein, are shown. The composite member 320 may be configured in such a manner that upon a compressive force, at least a portion of the composite member may begin to deform (or expand, deflect, twist, unspring, break, unwind, etc.) in a radial direction away from the tool axis (e.g., 258, FIG. 2C). Although exemplified as "composite", it is within the scope of the disclosure that member 320 may be made from metal, including alloys and so forth. Moreover, as disclosed there may be numerous alternative downhole tool embodiments that do not require nor need the composite member 320.

During pump down (or run in), the composite member 320 may 'flower' or be energized as a result of a pumped fluid, resulting in greater run-in efficiency (less time, less fluid required). During the setting sequence, the seal element 322 and the composite member 320 may compress together. As a result of an angled exterior surface 389 of the seal element 322 coming into contact with the interior surface 388 of the composite member 320, a deformable (or first or upper) portion 326 of the composite member 320 may be urged radially outward and into engagement the surrounding tubular (not shown) at or near a location where the seal element 322 at least partially sealingly engages the surrounding tubular. There may also be a resilient (or second or lower) portion 328. In an embodiment, the resilient portion 328 may be configured with greater or increased resilience to deformation as compared to the deformable portion 326.

The composite member 320 may be a composite component having at least a first material 331 and a second material 332, but composite member 320 may also be made of a single material. The first material 331 and the second material 332 need not be chemically combined. In an embodiment, the first material 331 may be physically or chemically bonded, cured, molded, etc. with the second material 332. Moreover, the second material 332 may likewise be physically or chemically bonded with the deformable portion 326. In other embodiments, the first material 331 may be a composite material, and the second material 332 may be a second composite material.

The composite member 320 may have cuts or grooves 330 formed therein. The use of grooves 330 and/or spiral (or helical) cut pattern(s) may reduce structural capability of the deformable portion 326, such that the composite member 320 may "flower" out. The groove 330 or groove pattern is not meant to be limited to any particular orientation, such that any groove 330 may have variable pitch and vary radially.

With groove(s) 330 formed in the deformable portion 326, the second material 332, may be molded or bonded to the deformable portion 326, such that the grooves 330 are filled in and enclosed with the second material 332. In embodiments, the second material 332 may be an elastomeric material. In other embodiments, the second material 332 may be 60-95 Duro A polyurethane or silicone. Other materials may include, for example, TFE or PTFE sleeve option-heat shrink. The second material 332 of the composite member 320 may have an inner material surface 368.

Different downhole conditions may dictate choice of the first and/or second material. For example, in low temp operations (e.g., less than about 250 F), the second material comprising polyurethane may be sufficient, whereas for high temp operations (e.g., greater than about 250 F) polyurethane may not be sufficient and a different material like silicone may be used.

The use of the second material 332 in conjunction with the grooves 330 may provide support for the groove pattern and reduce preset issues. With the added benefit of second material 332 being bonded or molded with the deformable portion 326, the compression of the composite member 320 against the seal element 322 may result in a robust, reinforced, and resilient barrier and seal between the components and with the inner surface of the tubular member (e.g., 208 in FIG. 2B). As a result of increased strength, the seal, and hence the tool of the disclosure, may withstand higher downhole pressures. Higher downhole pressures may provide a user with better frac results.

Groove(s) 330 allow the composite member 320 to expand against the tubular, which may result in a formidable barrier between the tool and the tubular. In an embodiment, the groove 330 may be a spiral (or helical, wound, etc.) cut formed in the deformable portion 326. In an embodiment, there may be a plurality of grooves or cuts 330. In another embodiment, there may be two symmetrically formed grooves 330, as shown by way of example in FIG. 6E. In yet another embodiment, there may be three grooves 330.

Figure 6A:
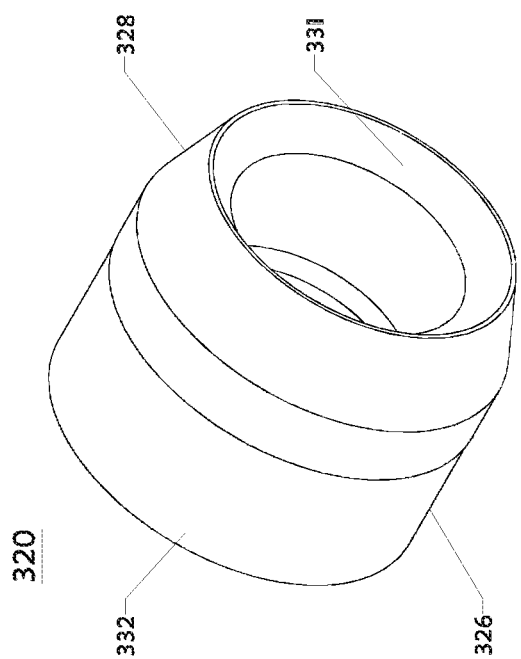
FIG. 6A shows an isometric view of a composite deformable member usable with a downhole tool according to embodiments of the disclosure.
Figure 6B:
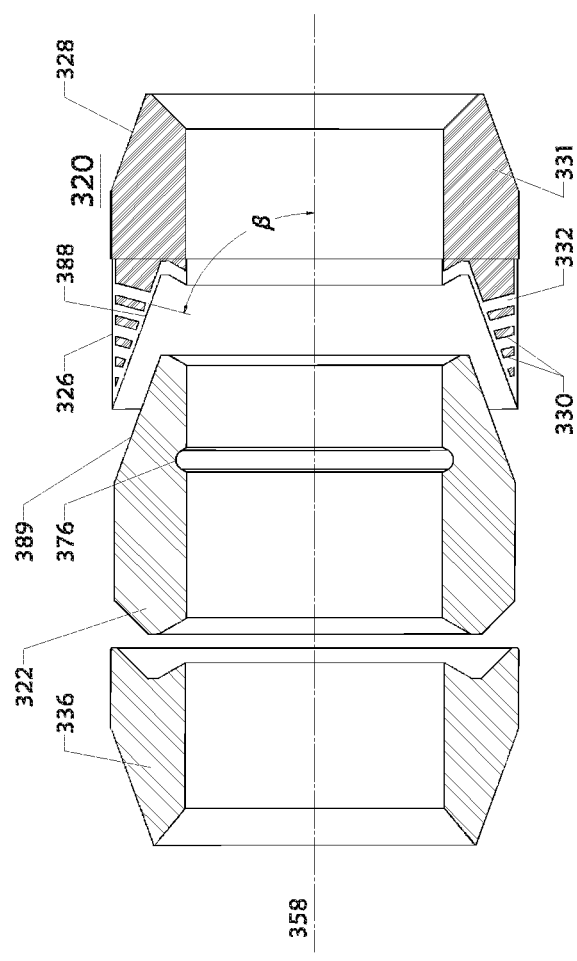
FIG. 6B shows a longitudinal cross-sectional view of a composite deformable member usable with a downhole tool according to embodiments of the disclosure.
Figure 6C:
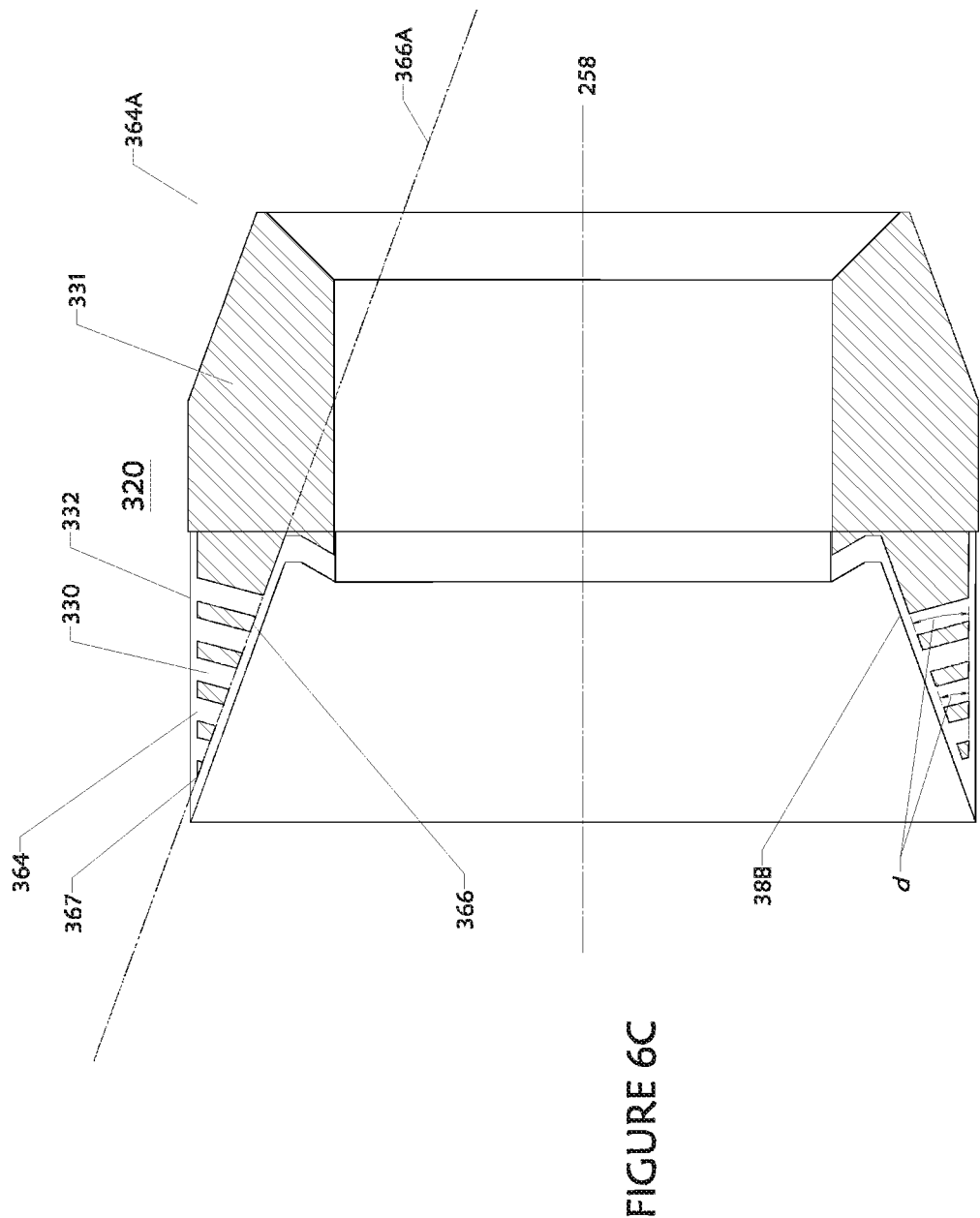
FIG. 6C shows a close-up longitudinal cross-sectional view of a composite deformable member usable with a downhole tool according to embodiments of the disclosure.

As illustrated by FIG. 6C, the depth d of any cut or groove 330 may extend entirely from an exterior side surface 364 to an upper side interior surface 366. The depth d of any groove 330 may vary as the groove 330 progresses along the deformable portion 326. In an embodiment, an outer planar surface 364A may have an intersection at points tangent the exterior side 364 surface, and similarly, an inner planar surface 366A may have an intersection at points tangent the upper side interior surface 366. The planes 364A and 366A of the surfaces 364 and 366, respectively, may be parallel or they may have an intersection point 367. Although the composite member 320 is depicted as having a linear surface illustrated by plane 366A, the composite member 320 is not meant to be limited, as the inner surface may be non-linear or non-planar (i.e., have a curvature or rounded profile).

In an embodiment, the groove(s) 330 or groove pattern may be a spiral pattern having constant pitch ($p_1$ about the same as $p_2$), constant radius ($r_3$ about the same as $r_4$) on the outer surface 364 of the deformable member 326. In an embodiment, the spiral pattern may include constant pitch ($p_1$ about the same as $p_2$), variable radius ($r_1$ unequal to $r_2$) on the inner surface 366 of the deformable member 326.

In an embodiment, the groove(s) 330 or groove pattern may be a spiral pattern having variable pitch ($p_1$ unequal to $p_2$), constant radius ($r_3$ about the same as $r_4$) on the outer surface 364 of the deformable member 326. In an embodiment, the spiral pattern may include variable pitch ($p_1$ unequal to $p_2$), variable radius ($r_1$ unequal to $r_2$) on the inner surface 366 of the deformable member 320.

As an example, the pitch (e.g., $p_1$, $p_2$, etc.) may be in the range of about 0.5 turns/inch to about 1.5 turns/inch. As another example, the radius at any given point on the outer surface may be in the range of about 1.5 inches to about 8 inches. The radius at any given point on the inner surface may be in the range of about less than 1 inch to about 7 inches. Although given as examples, the dimensions are not meant to be limiting, as other pitch and radial sizes are within the scope of the disclosure.

In an exemplary embodiment reflected in FIG. 6B, the composite member 320 may have a groove pattern cut on a back angle β. A pattern cut or formed with a back angle may allow the composite member 320 to be unrestricted while expanding outward. In an embodiment, the back angle β may be about 75 degrees (with respect to axis 258). In other embodiments, the angle β may be in the range of about 60 to about 120 degrees The presence of groove(s) 330 may allow the composite member 320 to have an unwinding, expansion, or "flower" motion upon compression, such as by way of compression of a surface (e.g., surface 389) against the interior surface of the deformable portion 326. For example, when the seal element 322 moves, surface 389 is forced against the interior surface 388. Generally, the failure mode in a high pressure seal is the gap between components; however, the ability to unwind and/or expand allows the composite member 320 to extend completely into engagement with the inner surface of the surrounding tubular.

Figure 7A:
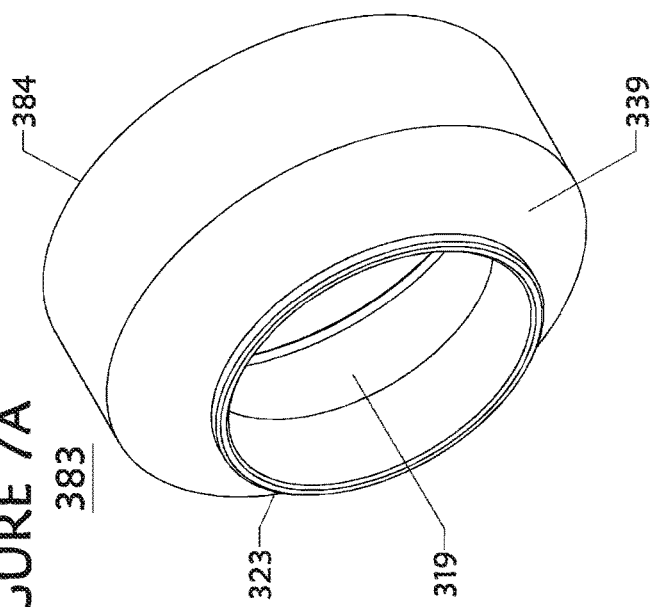
FIG. 7A shows an isometric view of a bearing plate usable with a downhole tool according to embodiments of the disclosure.
Figure 7B:
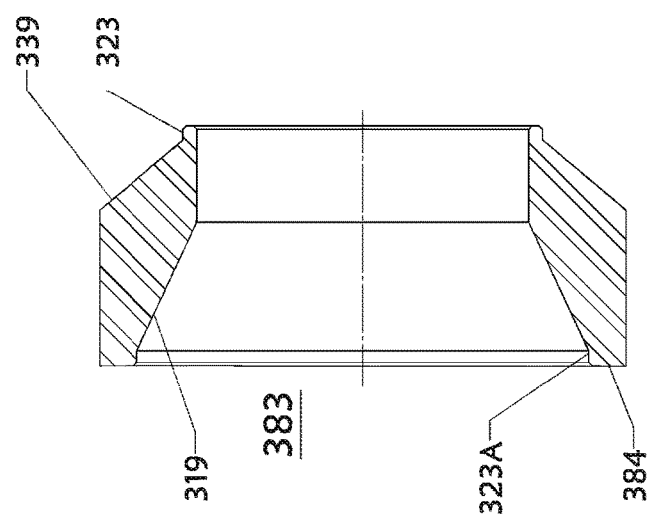
FIG. 7B shows a longitudinal cross-sectional view of a bearing plate usable with a downhole tool according to embodiments of the disclosure.

Referring now to FIGS. 7A and 7B together, an isometric view and a longitudinal cross-sectional view, respectively of a bearing plate 383 (and its subcomponents) usable with a downhole tool in accordance with embodiments disclosed herein are shown. The bearing plate 383 may be made from filament wound material having wide angles. As such, the bearing plate 383 may endure increased axial load, while also having increased compression strength.

Because the sleeve (254, FIG. 2C) may held rigidly in place, the bearing plate 383 may likewise be maintained in place. The setting sleeve may have a sleeve end 255 that abuts against bearing plate end 284, 384. Briefly, FIG. 2C illustrates how compression of the sleeve end 255 with the plate end 284 may occur at the beginning of the setting sequence. As tension increases through the tool, an other end 239 of the bearing plate 283 may be compressed by slip 242, forcing the slip 242 outward and into engagement with the surrounding tubular (208, FIG. 2B).

Inner plate surface 319 may be configured for angled engagement with the mandrel. In an embodiment, plate surface 319 may engage the transition portion 349 of the mandrel 314. Lip 323 may be used to keep the bearing plate 383 concentric with the tool 202 and the slip 242. Small lip 323A may also assist with centralization and alignment of the bearing plate 383.

Figure 7C:
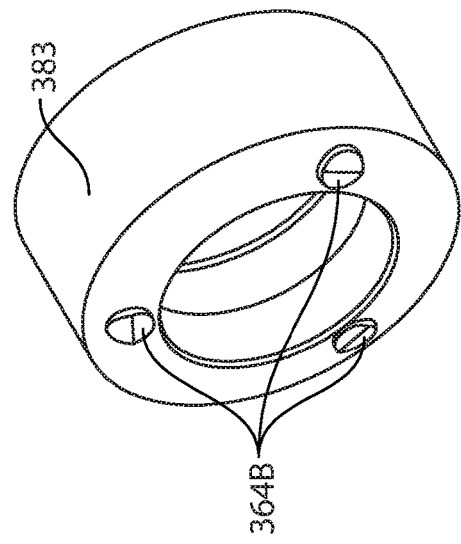
FIG. 7C shows an isometric view of a bearing plate configured with pin inserts according to embodiments of the disclosure.
Figure 7E:
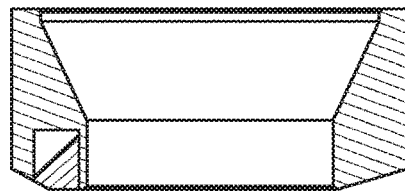
FIG. 7E shows a longitudinal cross-sectional view of the bearing plate of FIG. 7D according to embodiments of the disclosure.
Figure 7E:
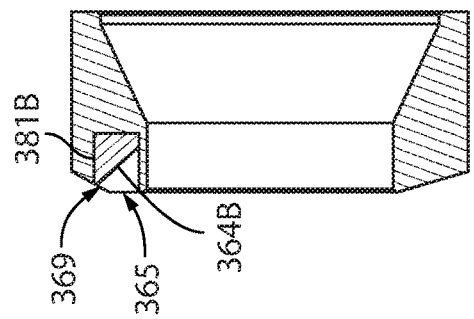
Figure 7D:
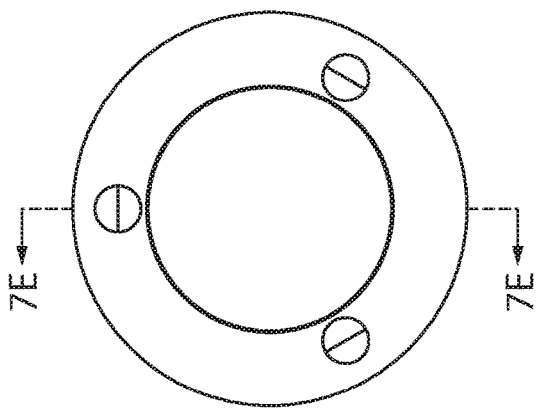
FIG. 7D shows a front lateral view of a bearing plate configured with pin inserts according to embodiments of the disclosure.

Referring briefly to FIGS. 7C-7EE together, various views a bearing plate 383 (and its subcomponents) configured with stabilizer pin inserts, usable with a downhole tool in accordance with embodiments disclosed herein, are shown. When applicable, such as when the downhole tool is configured with the bearing plate 383 engaged with a metal slip (e.g., 334, FIG. 5D), the bearing plate 383 may be configured with one or more stabilizer pins (or pin inserts) 364B.

In accordance with embodiments disclosed herein, the metal slip may be configured to mate or otherwise engage with pins 364B, which may aid breaking the slip 334 uniformly as a result of distribution of forces against the slip 334.

It is believed a durable insert pin 364B may perform better than an integral configuration of the bearing plate 383 because of the huge massive forces that may be encountered (i.e., 30,000 lbs).

The pins 364B may be made of a durable metal, composite, etc., with the advantage of composite meaning the pins 364B may be easily drillable. This configuration may allow improved breakage without impacting strength of the slip (i.e., ability to hold set pressure). In the instances where strength is not of consequence, a composite slip (i.e., a slip more readily able to break evening) could be used—use of metal slip is used for greater pressure conditions/setting requirements.

Figure 8A:
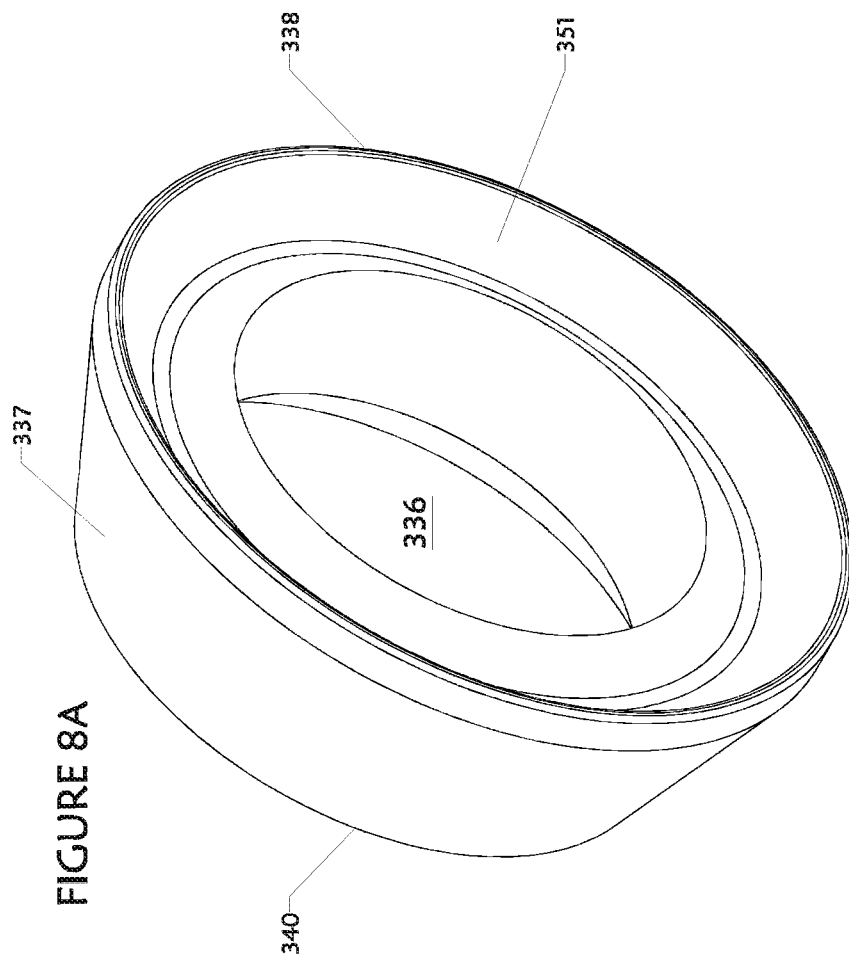
FIG. 8A shows an underside isometric view of a cone usable with a downhole tool according to embodiments of the disclosure.
Figure 8B:
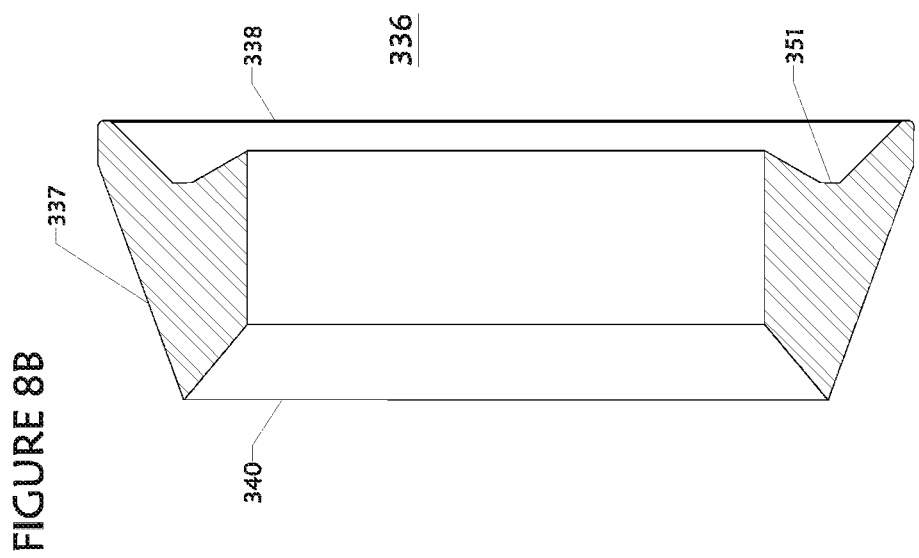
FIG. 8B shows a longitudinal cross-sectional view of a cone usable with a downhole tool according to embodiments of the disclosure.

Referring now to FIGS. 8A and 8B together, an underside isometric view and a longitudinal cross-sectional view, respectively, of one or more cones 336 (and its subcomponents) usable with a downhole tool in accordance with embodiments disclosed herein, are shown. In an embodiment, cone 336 may be slidingly engaged and disposed around the mandrel (e.g., cone 236 and mandrel 214 in FIG. 2C). Cone 336 may be disposed around the mandrel in a manner with at least one surface 337 angled (or sloped, tapered, etc.) inwardly with respect to other proximate components, such as the second slip (242, FIG. 2C). As such, the cone 336 with surface 337 may be configured to cooperate with the slip to force the slip radially outwardly into contact or gripping engagement with a tubular, as would be apparent and understood by one of skill in the art.

During setting, and as tension increases through the tool, an end of the cone 336, such as second end 340, may compress against the slip (see FIG. 2C). As a result of conical surface 337, the cone 336 may move to the underside beneath the slip, forcing the slip outward and into engagement with the surrounding tubular (see FIG. 2A). A first end 338 of the cone 336 may be configured with a cone profile 351. The cone profile 351 may be configured to mate with the seal element (222, FIG. 2C). In an embodiment, the cone profile 351 may be configured to mate with a corresponding profile 327A of the seal element (see FIG. 4A). The cone profile 351 may help restrict the seal element from rolling over or under the cone 336.

Referring now to FIGS. 9A and 9B, an isometric view, and a longitudinal cross-sectional view, respectively, of a lower sleeve 360 (and its subcomponents) usable with a downhole tool in accordance with embodiments disclosed herein, are shown. During setting, the lower sleeve 360 will be pulled as a result of its attachment to the mandrel 214. As shown in FIGS. 9A and 9B together, the lower sleeve 360 may have one or more holes 381A that align with mandrel holes (281B, FIG. 2C). One or more anchor pins 311 may be disposed or securely positioned therein. In an embodiment, brass set screws may be used. Pins (or screws, etc.) 311 may prevent shearing or spin off during drilling.

As the lower sleeve 360 is pulled, the components disposed about mandrel between the may further compress against one another. The lower sleeve 360 may have one or more tapered surfaces 361, 361A which may reduce chances of hang up on other tools. The lower sleeve 360 may also have an angled sleeve end 363 in engagement with, for example, the first slip (234, FIG. 2C). As the lower sleeve 360 is pulled further, the end 363 presses against the slip. The lower sleeve 360 may be configured with an inner thread profile 362. In an embodiment, the profile 362 may include rounded threads. In another embodiment, the profile 362 may be configured for engagement and/or mating with the mandrel (214, FIG. 2C). Ball(s) 364 may be used. The ball(s) 364 may be for orientation or spacing with, for example, the slip 334. The ball(s) 364 and may also help maintain break symmetry of the slip 334. The ball(s) 364 may be, for example, brass or ceramic.

Referring briefly to FIGS. 9C-9E together, an isometric, lateral, and longitudinal cross-sectional view, respectively, of the lower sleeve 360 configured with stabilizer pin inserts, and usable with a downhole tool in accordance with embodiments disclosed herein, are shown. In addition to the ball(s) 364, the lower sleeve 360 may be configured with one or more stabilizer pins (or pin inserts) 364A.

A possible difficulty with a one-piece metal slip is that instead of breaking evenly or symmetrically, it may be prone to breaking in a single spot or an uneven manner, and then fanning out (e.g., like a fan belt). If this it occurs, it may problematic because the metal slip (e.g., 334, FIG. 5D) may not engage the casing (or surrounding surface) in an adequate, even manner, and the downhole tool may not be secured in place. Some conventional metal slips are "segmented" so the slip expands in mostly equal amounts circumferentially; however, it is commonly understood and known that these type of slips are very prone to pre-setting or inadvertent setting.

In contrast, the one-piece slip configuration is very durable, takes a lot of shock, and will not readily pre-set, but may require a configuration that urges uniform and even breakage. In accordance with embodiments disclosed herein, the metal slip 334 may be configured to mate or otherwise engage with pins 364A, which may aid breaking the slip 334 uniformly as a result of distribution of forces against the slip 334.

It is plausible a durable insert pin 364A may perform better than an integral pin/sleeve configuration of the lower sleeve 360 because of the huge massive forces that are encountered (i.e., 30,000 lbs). The pins 364A may be made of a durable metal, composite, etc., with the advantage of composite meaning the pins 364A are easily drillable.

This configuration is advantageous over changing breakage points on the metal slip because doing so would impact the strength of the slip, which is undesired. Accordingly, this configuration may allow improved breakage without impacting strength of the slip (i.e., ability to hold set pressure). In the instances where strength is not of consequence, a composite slip (i.e., a slip more readily able to break evening) could be used—use of metal slip is typically used for greater pressure conditions/setting requirements.

The pins 364A may be formed or manufactured by standard processes, and then cut (or machined, etc.) to an adequate or desired shape, size, and so forth. The pins 364A may be shaped and sized to a tolerance fit with slots 381B. In other aspects, the pins 364A may be shaped and sized to an undersized or oversized fit with slots 381B. The pins 364A may be held in situ with an adhesive or glue.

In embodiments one or more of the pins 364, 364A may have a rounded or spherical portion configured for engagement with the metal slip (see FIG. 3D). In other embodiments, one or more of the pins 364, 364A may have a planar portion 365 configured for engagement with the metal slip 334. In yet other embodiments, one or more of the pins 364, 364A may be configured with a taper(s) 369.

The presence of the taper(s) 369 may be useful to help minimize displacement in the event the metal slip 334 inadvertently attempts to 'hop up' over one of the pins 364A in the instance the metal slip 334 did not break properly or otherwise.

One or more of the pins 364A may be configured with a 'cut out' portion that results in a pointed region on the inward side of the pin(s) 364A (see 7EE). This may aid in 'crushing' of the pin 364A during setting so that the pin 364A moves out of the way.

Figure 12B:
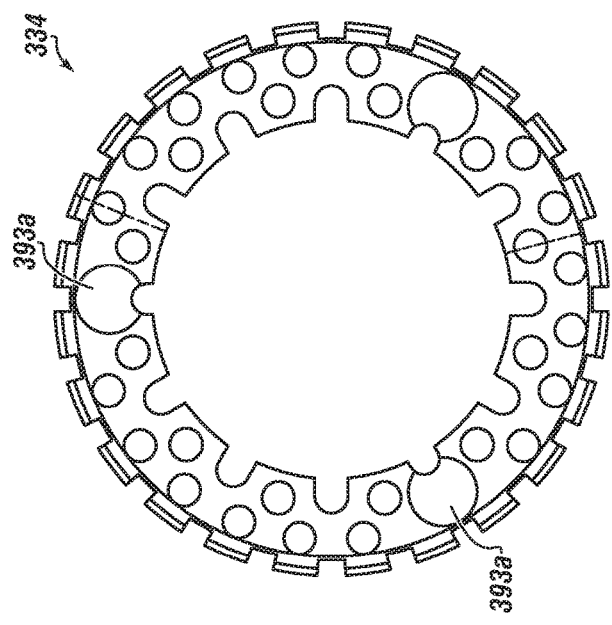
FIG. 12B shows a lateral side view of a metal slip according to embodiments of the disclosure.
Figure 12C:
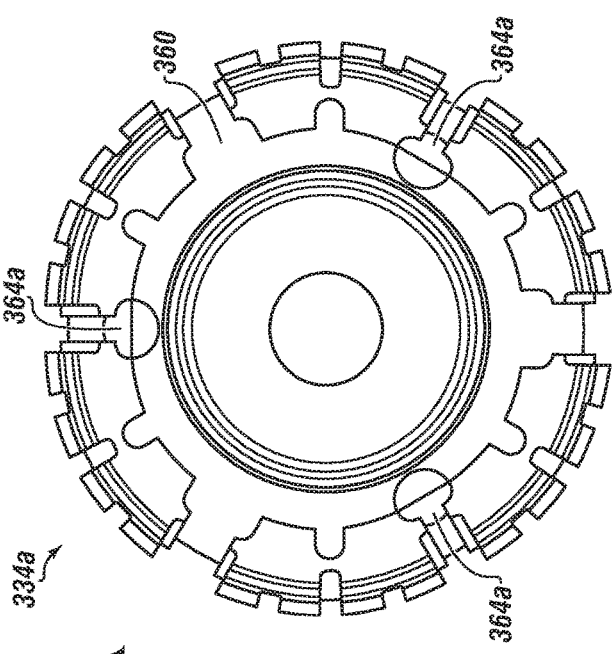
FIG. 12C shows a lateral view of a metal slip engaged with a sleeve according to embodiments of the disclosure.
Figure 12A:
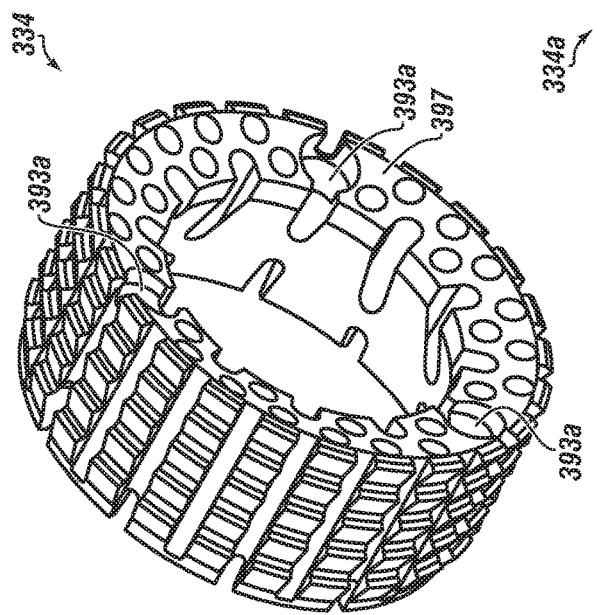
FIG. 12A shows an isometric view of a metal slip according to embodiments of the disclosure.

Referring briefly to FIGS. 12A-12B, an isometric and lateral side view of a metal slip according to embodiments of the disclosure, are shown. FIGS. 12A and 12B together show one or more of the (mating) holes 393A in the metal slip 334 may be configured in a round, symmetrical fashion or shape. The holes 393A may be notches, grooves, etc. or any other receptacle-type shape and configuration.

A downhole tool of embodiments disclosed herein may include the metal slip 334 disposed, for example, about the mandrel. The metal slip 334 may include (prior to setting) a one-piece circular slip body configuration. The metal slip 334 may include a face 397 configured with a set or plurality of mating holes 393A. FIGS. 12A and 12B illustrate there may be three mating holes 393A. Although not limited to any one particular arrangement, the holes 393A may be disposed in a generally or substantially symmetrical manner (e.g., equidistant spacing around the circumferential shape of the face 397). In addition, although illustrated as generally the same size, one or more holes may vary in size (e.g., dimensions of width, depth, etc.). FIG. 12G illustrates an embodiment where the metal slip 334 may include a set of mating holes having four mating holes. As shown, one or more of the mating holes 393A of the set of mating holes may be circular or rounded in shape.

Referring now to FIG. 12C, a lateral view of a metal slip engaged with a sleeve according to embodiments of the disclosure, is shown. As illustrated, an engaging body or surface of a downhole tool, such as a sleeve 360 may be configured with a corresponding number of stabilizer pins 364A. Thus, for example, the sleeve 360 may have a set of stabilizer pins to correspond to the set of mating holes of the slip 334. In other aspects, the set of mating holes 393A comprises three mating holes, and similarly the set of stabilizer pins comprises three stabilizer pins 364A, as shown in the Figure. The set of mating holes may be configured in the range of about 90 to about 120 degrees circumferentially (e.g., see FIG. 12G, arcuate segment 393B being about 90 degrees). In a similar fashion, the set of stabilizer pins 364A may be arranged or positioned in the range of about 90 to about 120 degrees circumferentially around the sleeve 360.

Thus, in accordance with embodiments of the disclosure the metal slip 334 may be configured for substantially even breakage of the metal slip body during setting. Prior to setting the metal slip 334 may have a one-piece circular slip body. That is, at least some part or aspects of the slip 334 has a solid connection around the entirety of the slip.

In an embodiment, the face (397, FIG. 12A) may be configured with at least three mating holes 393A. In embodiments, the sleeve 360 may be configured or otherwise fitted with a set of stabilizer pins equal in number and corresponding to the number of mating holes 393A. Thus, each pin 364A may be configured to engage a corresponding mating hole 393A. Although not meant to be limited, there may be about three to five mating holes and corresponding pins.

The downhole tool may be configured for at least three portions of the metal slip 334 to be in gripping engagement with a surrounding tubular after setting. The set of stabilizer pins may be disposed in a symmetrical manner with respect to each other. The set of mating holes may be disposed in a symmetrical manner with respect to each other.

In accordance with embodiments disclosed herein, the metal slip 334 may be configured to mate or otherwise engage with pins 364A, which may aid breaking the slip 334 uniformly as a result of distribution of forces against the slip 334. The sleeve 360 may include a set of stabilizer pins configured to engage the set of mating holes.

Figure 12F:
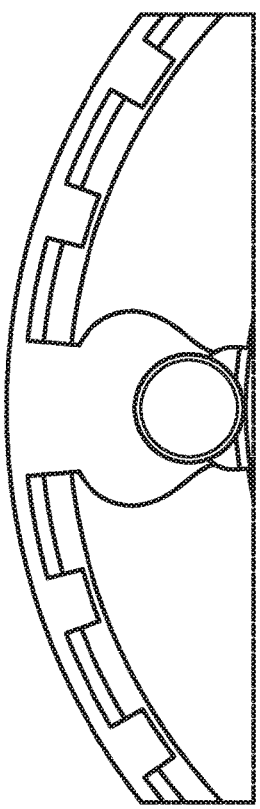
FIG. 12F shows a close up lateral view of a stabilizer pin in a varied engagement positions with an asymmetrical mating hole according to embodiments of the disclosure.
Figure 12D:
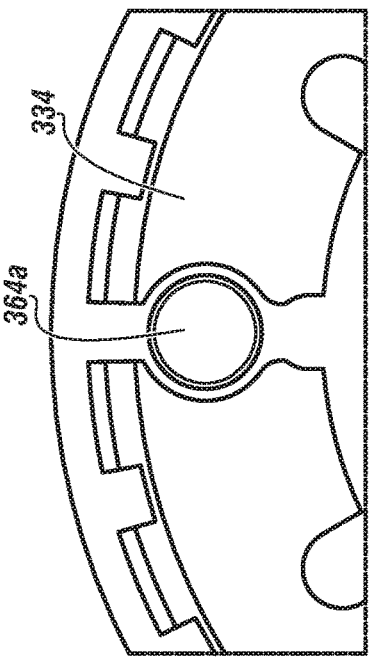
FIG. 12D shows a close up lateral view of a stabilizer pin in a varied engagement position with an asymmetrical mating hole according to embodiments of the disclosure.
Figure 12E:
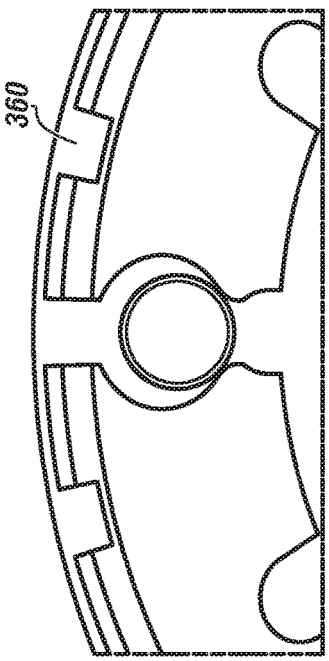
FIG. 12E shows a close up lateral view of a stabilizer pin in a varied engagement position with an asymmetrical mating hole according to embodiments of the disclosure.
Figure 12G:
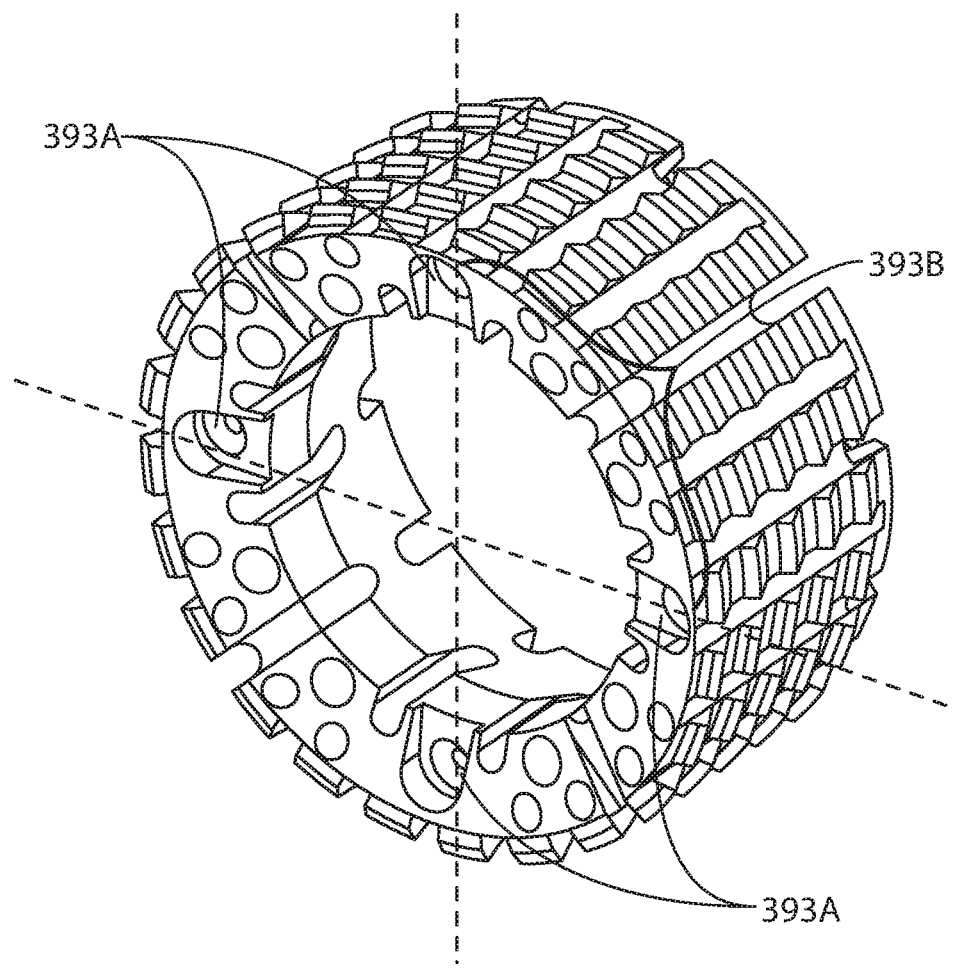
FIG. 12G shows an isometric view of a metal slip configured with four mating holes according to embodiments of the disclosure.

FIGS. 12D-12F illustrate a lateral 'slice' view through the metal slip 334 as the pin 364a induces fracture of the slip body.

Referring briefly to FIGS. 13A-13D, one or more of the (mating) holes 393A in the metal slip 334 may be configured in a round, symmetrical fashion or shape. Just the same, one or more of the holes 393A may additionally or alternatively be configured in an asymmetrical fashion or shape. In an embodiment, one or more of the holes may be configured in a 'tear drop' fashion or shape.

Each of these aspects may contribute to the ability of the metal slip 334 to break a generally equal amount of distribution around the slip body circumference. That is, the metal slip 334 breaks in a manner where portions of the slip engage the surrounding tubular and the distribution of load is about equal or even around the slip 334. Thus, the metal slip 334 may be configured in a manner so that upon breakage load may be applied from the tool against the surrounding tubular in an approximate even or equal manner circumferentially (or radially).

The metal slip 334 may be configured in an optimal one-piece configuration that prevents or otherwise prohibits pre-setting, but ultimately breaks in an equal or even manner comparable to the intent of a conventional "slip segment" metal slip.

Figure 14A:
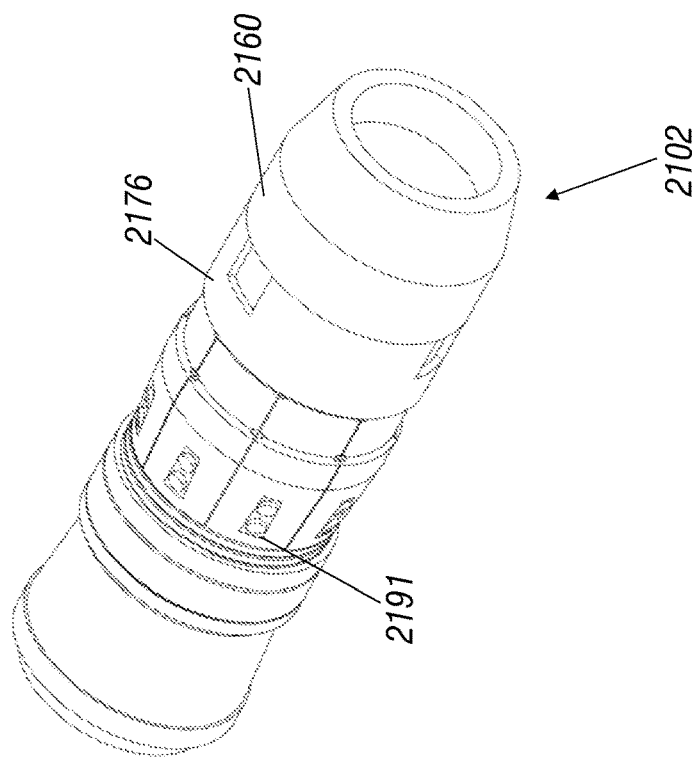
FIG. 14A shows an isometric view of a downhole tool with a wedge mandrel according to embodiments of the disclosure.
Figure 14B:
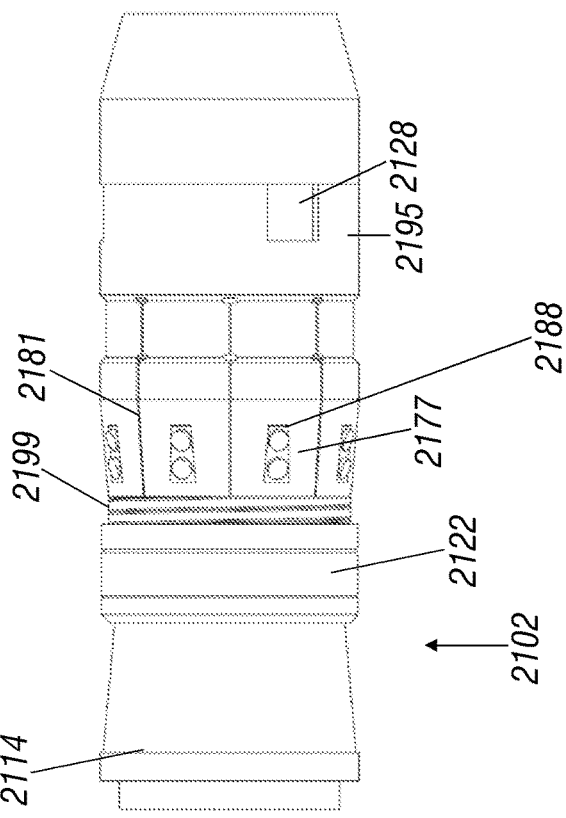
FIG. 14B shows a longitudinal side view of the downhole tool of FIG. 14A according to embodiments of the disclosure.
Figure 14C:
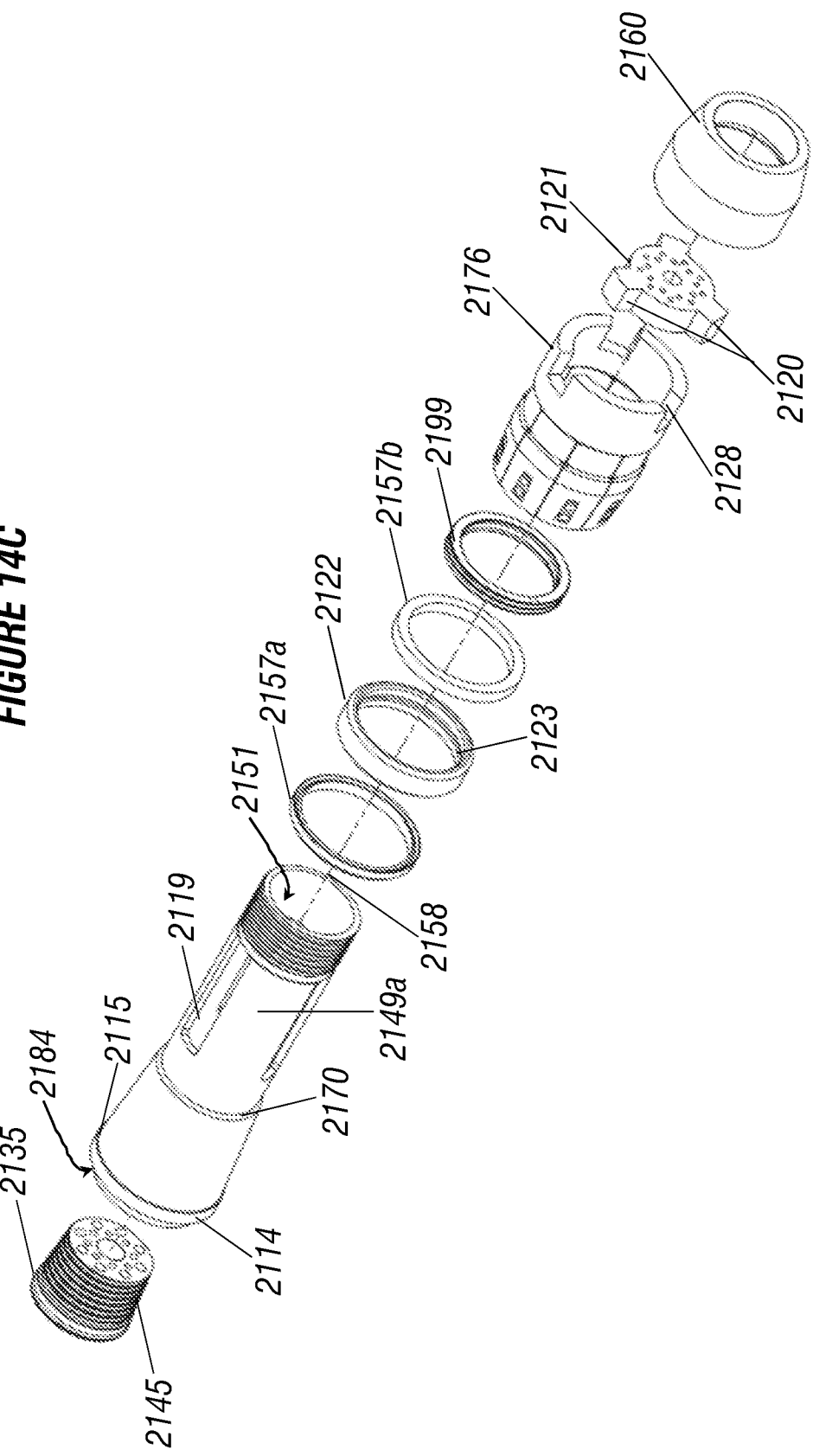
FIG. 14C shows a component breakout view of the downhole tool of FIG. 14A according to embodiments of the disclosure.

Referring now to FIGS. 14A, 14B, and 14C together, an isometric view, a longitudinal side view, and a component breakout view, respectively, of a downhole tool with a wedge mandrel, in accordance with embodiments disclosed herein, are shown.

Downhole tool 2102 may be run, set, and operated as described herein and in other embodiments (such as in System 200, and so forth), and as otherwise understood to one of skill in the art. Components of the downhole tool 2102 may be arranged and disposed about a wedge mandrel 2114, as described herein and comparable to other embodiments, and as otherwise understood to one of skill in the art. Thus, downhole tool 2102 may be comparable or identical in aspects, function, operation, components, etc. as that of other tool embodiments disclosed herein.

All mating surfaces of the downhole tool 2102 may be configured with an angle, such that corresponding components may be placed under compression instead of shear. The wedge mandrel 2114 may extend through the tool (or tool body) 2102, and include a flowpath (or bore, flowbore, inner bore, etc.) 2151 formed therein (e.g., an axial bore).

The wedge mandrel 2114 may be made of a material as described herein and in accordance with embodiments of the disclosure, such as a composite filament wound material made by the Applicant. The wedge mandrel 2114 may be made other materials, such as a metallic material, for example, an aluminum-based, magnesium-based, or aluminum-magnesium-based material. The metallic material may be reactive, such as dissolvable, which is to say under certain conditions that wedge mandrel 2114 may begin to dissolve, and thus alleviating the need for drill thru.

In embodiments, the wedge mandrel 2114 may be made of dissolvable aluminum-, magnesium-, or aluminum-magnesium-based (or alloy, complex, etc.) material, such as that provided by Nanjing Highsur Composite Materials Technology Co. LTD.

Just the same, the wedge mandrel may be made of reactive composite material formed (cured) from an initial mixture composition of embodiments herein.

Other components may be made of non-composite material, such as a metal or metal alloys. In embodiments, the material may be a metallic material, such as an aluminum-based or magnesium-based material. The metallic material may be reactive, such as dissolvable, which is to say under certain conditions the respective component(s) may begin to dissolve, and thus alleviating the need for drill thru.

Downhole tool 2102 may include a lower sleeve 2160 disposed around the wedge mandrel 2114. The lower sleeve 2160 may be threadingly engaged with the mandrel 2114. As a support platform 2121 is pulled in tension, various components disposed about mandrel 2114 between the support platform 2121 and a setting sleeve (2154, FIG. 22A) may begin to compress against one another. This force and resultant movement may ultimately cause compression and expansion of a seal element 2122

Additional tension or load may be applied to the tool 2102 that results in movement of the wedge mandrel 2114 against a fingered member 2176. Accordingly, via interaction with angled surfaces of each other, one or more ends 2715 of the fingered member 2176 may be urged radially outward and into engagement with a tubular (2108). The fingered member 2176 may be movingly (such as slidingly) engaged and disposed around the wedge mandrel 2114.

The setting sleeve (2154) may engage against a shoulder 2184 of the wedge mandrel 2114, which may accommodate to or provide ability for the transfer of load through the rest of the tool 2102. The setting sleeve may be a grooved setting sleeve in accordance with embodiments herein.

Although many configurations are possible, the fingered member 2176 may generally have a circular body (or ring shaped) portion 2195 configured for positioning on or disposal around the wedge mandrel 2114. Extending from the circular body portion may be two or more fingers (dogs, protruding members, etc.) 2177. In the assembled tool configuration, the fingers 2177 may be referred to as facing "uphole" or toward the top (proximate end) of the tool 2102.

The fingered member 2176 may include a plurality of fingers 2177. In embodiments, there may be a range of about 6 to about 12 fingers 2177. The fingers 2177 may be configured symmetrically and equidistantly to each other. As the fingers 2177 are urged outwardly they may provide a synergistic effect of centralizing the downhole tool 2102, which may be of greater benefit in situations where the surrounding tubular has a horizontal orientation.

Fingers 2177 may be formed with a gap or separation point 2181 therebetween. The size of the fingers 2177 in terms of width, length, and thickness, and the number of fingers 2177 may be optimized in a manner that results in the greatest ability to seal an annulus (2190, compare FIGS. 22A and 22C).

During setting, the fingered member 2176 (including fingers 2177) may be urged along a proximate surface 2149 (or vice versa, the proximate surface 2149 may be urged against an underside of the fingered member 2176). The proximate surface 2149 may be an angled surface or taper of wedge mandrel 2114. Other components may be positioned proximate to the underside (or end 2175) of fingered member 2175, such as an insert 2199. As the fingered member 2176 and the surface 2149 are urged together, the fingers 2177 may be resultantly urged radially outward toward the inner surface of the tubular (2108, FIG. 22A). One or more ends 2175 of corresponding fingers 2177 may eventually come into contact with the tubular (see contact point 2186). Ends 2175 (of fingers) may be configured (such as by machining) with an end taper 2174.

The use of an end taper 2174 may be multipurpose. For example, if the tool 2102 needs to be removed (or moved uphole) prior to setting, the ends 2175 of the fingers 2177 may be less prone to catching on surfaces as the tool 2102 moves uphole. In addition, the ends 2175 of the fingers 2175 may have more surface area contact with the tubular.

The surface 2149 may be smooth and conical in nature, which may result in smooth, linear engagement with the fingered member 2176. The angled surface 2149 may transition to a more or less axial surface 2149a (i.e., a surface that is about parallel to a longitudinal axis 2158).

In aspects, the outer surface of the wedge mandrel 2114 may be configured with a detent (or notch) 2170, approximately at the transition point from angled surface 2149 to axial surface 2149a. In the assembled position, the ends 2175 of the fingers 2177 may reside or be positioned within or proximate to the detent 2170. The arrangement of the ends 2175 within the detent 2170 may prevent inadvertent operation of the fingered member 2176. In this respect, a certain amount of setting force is required to "bump" the ends of the fingers 2177 out of and free of the detent 2170 so that the fingered member 2176 and the surface 2149 can be urged together, and the fingers 2177 extended outwardly. As shown in FIGS. 14A and 14B, the insert 2199 may be directly proximate to the detent 2170, and thus between the detent 2170 and the finger ends 2177. In this respect, a certain amount of setting force may be required to "bump" the insert 2199 out of and free of the detent 2170 so that it may be urged along the surface 2149.

The fingered member 2176 may be referred to as having a "transition zone" 2110, essentially being the part of the member where the fingers 2177 begin to extend away from the body 2195. In this respect, the fingers 2177 are connected to or integral with the body 2195. In operation as the fingers 2177 are urged radially outward, a flexing (or partial break or fracture) may occur within the transition zone 2110. The transition zone 2110 may include an outer surface 2137 and inner surface 2129. The outer surface 2137 and inner surface 2129 may be separated by a portion or amount of material 2185. The fingered member 2176 may be configured so that flexing, break or fracture may occur or otherwise be promoted within the material 2185. Flexing or fracture may be induced within the material as a result of one or more grooves. For example, the inner surface 2137 may have a first finger groove 2111. The outer surface 2137 may in addition or alternatively have a finger groove, such as a second finger groove 2113.

The presence of the material 2185 may provide a natural "hinge" effect whereby the fingers 2177 become moveable from the body (ring) 2195, such as when the fingered member 2176 is urged against surface 2149. After setting one or more fingers 2177 may remain at least partially connected with body 2195 in the transition zone 2110. The presence of the material 2185 may promote uniform flexing of the fingers 2177. The length of the fingers 2177 and/or amount of material 2185 are operational variables that may be modified to suit a particular need for a respective annulus size.

Upon setting, there may be a seal 2125 formed in tool annulus 2190. A side 2115 of the shoulder 2184 may act as a stop against components therebelow, including a backup ring 2157a. Thus, the compression between the seal element 2122 and the backup rings 2157a,b may contribute to the formed seal. The formed seal 2125 may withstand pressurization of greater than 10,000 psi. In an embodiment, the seal 2125 withstands pressurization in the range of about 5,000 psi to about 15,000 psi.

The Figures illustrate the downhole tool 2102 may include other components, such as the seal element 2122. The seal element 2122 may be made of an elastomeric and/or poly material, such as rubber, nitrile rubber, Viton or polyurethane, and may be configured for positioning or otherwise disposed around the wedge mandrel 2114. The seal element 2122 may have an inner circumferential groove 2123. The presence of the groove 2123 may assist the seal element 2122 to initially buckle upon start of the setting sequence. The groove 2123 may have a size (e.g., width, depth, etc.) of about 0.25 inches.

On either side of the seal element may be a backup ring. As shown there may be a first backup ring 2157a and a second backup ring 2157b. In the assembled configuration, the insert 2199 may be positioned between the ends 2175 of the fingers 2177 and the second backup ring 2157b.

The fingers 2177 may have a respective gripper insert 2191 fitted or otherwise disposed therein. Although not limited to any particular number, type or size, there may be a respective gripper insert 2191 disposed in the finger(s) 2177. The gripper insert 2191 may be positioned within a window (or hole, opening, etc.) 2188 formed in any respective finger 2177. Although not necessary, the window 2188 may extend the entire depth of the thickness of the finger 2177. In this respect, the gripper insert 2191 may be positioned therein, wherein its underside may be proximate to the wedge mandrel outer surface. Although illustrated as such, every finger 2177 need not have a window 2188 and/or gripper insert 2191. Moreover, the fingers 2177 need not have any windows 2188 and/or inserts 2191 at all. Although not shown here, buttons 2180 may be disposed directly into the fingers 2177.

The fingered member 2176 may have one or more recessed regions (or hole, opening, etc.) 2128 to accommodate respective dogs 2120 of the support platform 2121. Similarly, the wedge mandrel 2114 may have one or more mandrel windows 2119 also to accommodate respective dogs 2120 of the support platform 2121.

Components of the downhole tool 2102 may be arranged and disposed about the wedge mandrel 2114, as described herein and in other embodiments, and as otherwise understood to one of skill in the art. Thus, downhole tool 2102 may be comparable or identical in aspects, function, operation, components, etc. as that of other tool embodiments provided for herein, and redundant discussion is limited for sake of brevity, while structural (and functional) differences are discussed in with detail, albeit in a non-limiting manner.

The tool 2102 may be deployed and set with a conventional setting tool (not shown) such as a Model 10, 20 or E-4 Setting Tool available from Baker Oil Tools, Inc., Houston, Tex. Once the tool 2102 reaches the set position within the tubular, the setting mechanism or workstring may be detached from the tool 2102 by various methods, resulting in the tool 2102 left in the surrounding tubular and one or more sections of the wellbore isolated.

Referring now to FIGS. 15A and 15B together, an isometric view and a longitudinal side cross-sectional view of a wedge mandrel usable with a downhole tool, in accordance with embodiments disclosed herein, are shown. Components of the downhole tool may be arranged and disposed about the wedge mandrel 2114, as described and understood to one of skill in the art, and may be comparable to other embodiments disclosed herein (e.g., see downhole tool 202 with mandrel 214).

The wedge mandrel 2114, which may be made from filament wound drillable material, may have a distal end 2146 and a proximate end 2148. The filament wound material may be made of various angles as desired to increase strength of the wedge mandrel 2114 in axial and radial directions.

The wedge mandrel 2114 may include a flowpath (or bore, flowbore, etc.) 2151 formed therethrough (e.g., an axial bore). The 2151, for example an axial bore, may extend through the entire wedge mandrel 2114, with openings at both the proximate end 2148 and oppositely at its distal end 2146. Accordingly, the wedge mandrel 2114 may have an inner bore surface 2147, which may include one or more threaded surfaces 2116 formed thereon.

The ends 2146, 2148 of the wedge mandrel 2114 may include internal or external (or both) threaded portions. As shown, the wedge mandrel 2114 may have internal threads 2116 within the bore 2151 configured to receive a ball seat insert (not shown here). In an embodiment, the first set of threads 2116 may be rounded threads.

The outer surface of the wedge mandrel 2114 may include a neck or transition portion surface 2149, such that the mandrel may have variation with its outer diameter. In an embodiment, the wedge mandrel 2114 may have a first outer diameter D21 that is greater than a second outer diameter D22. The transition surface may have an angle with respect to the tool (or tool component axis). The angled surface 2149 may end or otherwise transition to an axial external surface 2149a. There may be a bump or detent 2170 formed therebetween.

In addition to the first set of threads 2116, the wedge mandrel 2114 may have a second set of threads 2117. In one embodiment, the second set of threads 2117 may be rounded threads disposed along an external mandrel surface at the distal end 346. The use of rounded threads may increase the strength of the threaded connection.

For example, when mated with a lower sleeve (2160) having corresponding rounded threads, this may result in distribution of load forces along the threaded connection therebetween at an angle away from the long axis. Accordingly, the use of round threads may allow a non-axial interaction between surfaces, such that there may be vector forces in other than the shear/axial direction. The round thread profile may create radial load (instead of shear) across the thread root. As such, the rounded thread profile may also allow distribution of forces along more thread surface(s). As composite material is typically best suited for compression, this allows smaller components and added thread strength. This beneficially provides upwards of 5-times strength in the thread profile as compared to conventional composite tool connections.

Although described and shown as rounded, the threads 2116 and 2117 could be other thread profiles, including those suitable for use in filament wound composite material.

The wedge mandrel 2114 may have a shoulder 2184 on the proximate end 2148. One side of the shoulder 2184 may be compressible against an end (2155) of a setting sleeve (2154) during setting. Another side 2115 of the shoulder 2184 may act as a stop against components therebelow, including a backup ring 2157a.

On occasion it may be necessary or otherwise desired to produce a fluid from the formation while leaving a set plug in place. The ID of a conventional bore size (1 inch or less) is normally adequate to allow drop balls to pass therethrough, but may be inadequate for production. In order to produce desired fluid flow, it often becomes necessary to drill out a set tool—this requires a stop in operations, rig time, drill time, and related operator and equipment costs.

On the other hand, the presence of the oversized ID 2131 of bore 2151, and thus a larger cross-sectional area as compared to bore 250, provides effective and efficient production capability through the tool 2102 without the need to resort to drilling of the tool. The ID 2131 may be in the range of about greater than 1 inch to less than 4 inches. In an embodiment, the ID 2131 may be between about 2 inches to about 3 inches.

The wedge mandrel 2114 may include one or more mandrel windows (or slots, etc.) 2119 formed therein. Although not meant to be limited to any particular size or shape, FIGS. 15A-15B show there may be about three windows 2119, which may be generally rectangular in nature.

Although not shown here, it may be the case that the end 2148 of the wedge mandrel may be configured with a respective wedge mandrel ball seat. One of skill would appreciate a larger ball (as compared to ball 2163) may be needed. In embodiments, such a ball may have a diameter of about 2 inches to about 4 inches.

Figure 16B:
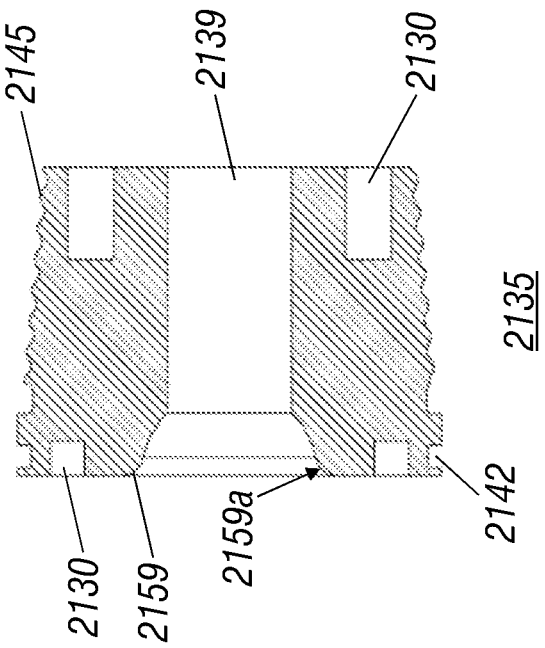
FIG. 16B shows a longitudinal side cross-sectional view of the ball seat insert of FIG. 16A according to embodiments of the disclosure.
Figure 16A:
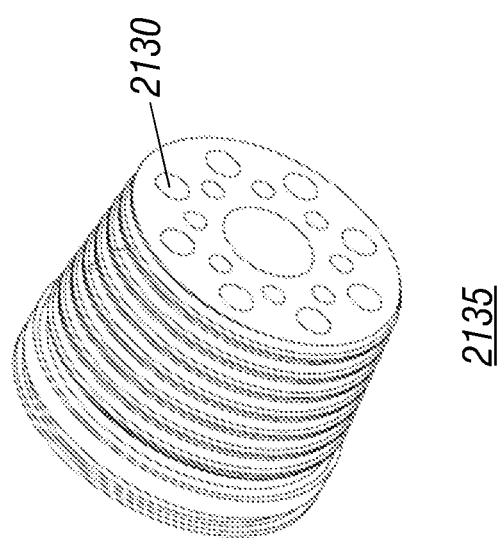
FIG. 16A shows an isometric view of a ball seat insert according to embodiments of the disclosure.

Referring now to FIGS. 16A and 16B together, an isometric view and a longitudinal side cross-sectional view of a ball seat insert usable with a downhole tool, in accordance with embodiments disclosed herein, are shown. The ball seat insert 2135 may be a generally frustoconcial shaped component configured for engagement into the wedge mandrel (2114).

For a downhole tool where there is no concern over bore size, a ball seat may be formed into the mandrel. However, where large bore size (i.e., to accommodate production) is desired, this would require a large diameter ball seat, along with reduced wall thickness of the mandrel. This may be structurally limiting, and so use of the ball seat insert 2135 may be useful to overcome these shortcomings (see FIG. 22C where the ball seat insert provides axial support against radial forces incurred during setting of the downhole tool 2102, and radial support for pressure/collapse).

In embodiments, the ball seat insert 2135 may be made of dissolvable aluminum-, magnesium-, or aluminum-magnesium-based (or alloy, complex, etc.) material, such as that provided by Nanjing Highsur Composite Materials Technology Co. LTD. Just the same, the insert 2135 may be made of reactive composite material formed from an initial mixture composition of embodiments herein. As another example, the ball seat may be made of a metal material like that produced by Bubbletight, LLC of Needville, Tex., as would be apparent to one of skill in the art, including fresh-water reactive composite metal, ambient-temperature fresh-water reactive composite metal, ambient-temperature fresh-water reactive elastomeric polymer, and high-strength brine-degradable reactive metal.

Other components may be made of materials as described herein, including reactive composite, cured, and metal materials.

Generally speaking, the material of ball seat insert 2135 may be configured to react. The time to react from start to finish (i.e., to the point where the ball seat insert no longer has a durable threaded connection with the wedge mandrel—see FIG. 22D) may be in the range of about 3 hours to about 48 hours.

The ball seat insert 2135 may be configured to include one or more holes 2130 formed therein. Although not meant to be limited to any particular number, shape, orientation, or size, the holes 2130 may be longitudinal in orientation through the insert 2135. The presence of one or more holes 2130 may result in the surface(s) of the insert 2135 having greater exposure to the fluid that promotes reactivity of the material. One or more holes 2130 may extend entirely through the ball seat insert. However, other holes 2130 may only extend to a certain depth, such as shown in FIG. 16B. The holes 2130 may be optimized to promote the most surface contact, yet at the same time not detract from the durability and pressure integrity of the insert 2135.

The ball seat insert 2135 may have a set of insert threads 2145. The insert threads 2145 may be configured to mate with corresponding threads (i.e., 2116) of the wedge mandrel (2114). Although not meant to be limited, the threads 2145 may be rounded threads.

The ball seat insert 2135 may have an insert hollow or bore 2139, which may be suitable for the adapter shaft (2153) to pass therethrough. The wider end of the insert 2135 may have an insert groove 2142, which may be generally circumferential in nature. The insert groove 2142 may be suitable for fitting an O-ring therein.

The insert 2135 may be configured with a ball seat surface 2159 such that a drop ball may come to rest and seat at in the seat. As applicable, the drop ball (not shown here) may be lowered into the wellbore and flowed toward the drop ball seat 2159. Alternatively, the ball may be held within the tool during run-in, thus alleviating the need for flowdown. The ball seat 2159 may be formed with a radius 2159a (i.e., circumferential rounded edge or surface).

Referring now to FIGS. 17A and 17B together, an isometric side and a longitudinal side cross-sectional view of a fingered member usable with a downhole tool, in accordance with embodiments disclosed herein, are shown. Although many configurations are possible, the fingered member 2176 may generally have a circular body (or ring shaped) portion 2195 configured for positioning on or disposal around the wedge mandrel (2114). Extending from the circular body portion may be two or more fingers (dogs, protruding members, etc.) 2177. Although not meant to be limiting, the fingered member 2176 may be made from a filament wound composite material in accordance with embodiments herein, and as would be apparent to one of skill in the art. The fingered member 2176 may be made from a reactive material, such as that made from an initial mixture composition described herein. The reactive material may be a cured material.

The fingered member 2176 may include a plurality of fingers 2177. In embodiments, there may be a range of about 6 to about 12 fingers 2177. The fingers 2177 may be configured symmetrically and equidistantly to each other. Fingers 2177 may be formed with a gap or separation point 2181 therebetween. The size of the fingers 2177 in terms of width, length, and thickness, and the number of fingers 2177 may be optimized in a manner that results in the greatest ability to seal an annulus (2190, compare FIGS. 22A and 22C). Ends 2175 (of fingers) may be configured (such as by machining) with an end taper 2174.

The fingered member 2176 may be referred to as having a "transition zone" 2110, essentially being the part of the member where the fingers 2177 begin to extend away from the body 2195. In this respect, the fingers 2177 are connected to or integral with the body 2195. In operation as the fingers 2177 are urged radially outward, a flexing (or partial break or fracture) may occur within the transition zone 2110. The transition zone 2110 may include an outer surface 2137 and inner surface 2129. The outer surface 2137 and inner surface 2129 may be separated by a portion or amount of material 2185. The fingered member 2176 may be configured so that the flexing, break or fracture occurs within the material 2185. Flexing or fracture may be induced within the material as a result of one or more grooves.

The fingers 2177 may have a respective gripper insert or carriage 2191 fitted or otherwise disposed therein. Although not limited to any particular number, type or size, there may be a respective gripper insert 2191 disposed in the finger(s) 2177.

In embodiments, the gripper insert 2191 may be a polymoldable material. In other embodiments, the gripper insert 2191 may be a durable metal, such as cast iron. In aspects, the insert 2191 may be hardened, surface hardened, heat-treated, carburized, etc., as would be apparent to one of ordinary skill in the art. FIG. 17C illustrates the gripper insert 2191 disposed in the finger end 2175 as being configured with serrated teeth 2198.

The gripper insert 2191 may be treated with an induction hardening process. In such a process, block or ring of metal may be moved through a coil that has a current run through it. As a result of physical properties of the metal and magnetic properties, a current density (created by induction from the e-field in the coil) may be controlled in a specific location. The insert 2191 may be machined from this treated metal. Such a process may lend to speed, accuracy, and repeatability in modification of the hardness profile of the gripper insert 2191. As such, for example, the teeth 2198 may have a RC in excess of 60, and the rest of the insert 2191 (essentially virgin, unchanged metal) may have a RC less than about 15. In embodiments the gripper insert 2191 may be made of a reactive material in accordance with embodiments herein.

During heat treatment of the insert itself, the teeth 2198 may heat up and harden resulting in heat-treated outer area/teeth, but not the rest of the insert. In this manner, with treatments such as flame (surface) hardening, the contact point of the flame is minimized (limited) to the proximate vicinity of the teeth 2198. Serrated outer surfaces or teeth 2198 of the may be configured such that the surfaces 2198 prevent the fingered member (or tool) from moving (e.g., axially or longitudinally) when the tool is set within the surrounding tubular. The use of the insert 2191 being made of metal provides bite characteristics normally associated with a metal slip, while at the same time the material of the fingered member 2176 may be easily drillable composite material. Moreover, the bite area may be enlarged versus that of buttons.

Still, as shown in FIGS. 17A and 17B, the gripper insert 2191 may be configured within one more buttons 2180 disposed therein. The buttons 2180 may be of any durable material suitable to provide sufficient bite into a surrounding tubular, such as ceramic or steel. Any button 2180 may have a flat surface or concave surface. In an embodiment, the concave surface may include a depression formed therein. One or more of the buttons 2180 may have a sharpened (e.g., machined) edge or corner 2182, which allows the button 2180 greater biting ability.

The gripper insert 2191 may be positioned within a window (or hole, opening, etc.) 2188 formed in any respective finger 2177. Although not necessary, the window 2188 may extend the entire depth of the thickness of the finger 2177. In this respect, the gripper insert 2191 may be positioned therein, wherein its underside may be proximate to the wedge mandrel outer surface. The insert 2191 may have a tight tolerance fit with the window 2188. To aid securing the insert 2188 therein, an adhesive or the like may be used.

Briefly, an underside of the insert 2191 may be configured with an abrasive surface 2183, such as that shown in side view in FIG. 17D (see also 17B). With respect to FIGS. 17A and 17B, the abrasive surface 2183 may be useful for preventing the fingered member 2176 from inadvertent movement along mandrel surface 2149. In embodiments, the abrasive surface 2183 may be mini-serrations. One of skill would appreciate that although illustrated as such, every finger 2177 need not have a window 2188 and/or gripper insert 2191.

The fingered member 2176 may have one or more recessed regions (or hole, opening, etc.) 2128 to accommodate respective dogs (2120) of a support platform (2121) Similarly, the wedge mandrel 2114 may have one or more mandrel windows 2114 also to accommodate respective dogs 2120 of the support platform.

Referring now to FIGS. 18A, 18B, and 18C together, a side expanded view, a side collapsed view, and an isometric view, respectively, of an insert, in accordance with embodiments disclosed herein, are shown. The insert 2199 may have a circular body 2187, having a first end 2196 and a second end 2133.

A groove or winding 2194 may be formed between the first end 2196 and the second end 2133. As the insert 2199 may be ring-shaped, there may be a hollow 2193 in the body 2187. Accordingly, the insert 2199 may be configured for positioning onto and/or around the wedge mandrel (2114). The use of the groove 2194 may be beneficial as while it is desirous for insert 2199 to have some degree of rigidity, it is also desirous for the insert 2199 to expand (unwind, flower, etc.) beyond the original OD of the tool, including along the angled surface of the wedge mandrel In this respect, the insert 2199 may be made of a high elongation material (e.g., physical properties of ~100% elongation). Insert 2199 material may be glass or carbon fiber or nanocarbon/nanosilica reinforced. The insert 2199 may durable enough to withstand compressive forces, but still expand or otherwise unwind upon being urged outwardly by the wedge mandrel. The insert 2199 may be made of PEEK (polyether ether ketone).

The groove 2194 may be continuous through the body 2197. However, the groove 2194 may be discontinuous, whereby a plurality of grooves are formed with (or otherwise defined by) a material portion present between respective grooves. The groove(s) 2197 may be helically formed in nature resulting in a 'spring-like' insert. An edge 2192 of the first end 2196 may be positionable within a notch or detent (2170) of the wedge mandrel Although not shown, a filler may be disposed within the groove(s) 2194. Use of the filler may help provide stabilization to the tool (and its components) during run-in. In embodiments, the filler may be made of silicone.

To maintain the collapsed position of the insert 2197, a securing member 2144 may be used. Accordingly, the insert 2197 may be configured with an insert bore 2144*a*. In an embodiment, the securing member 2144 may be a nylon screw.

Figure 19B:
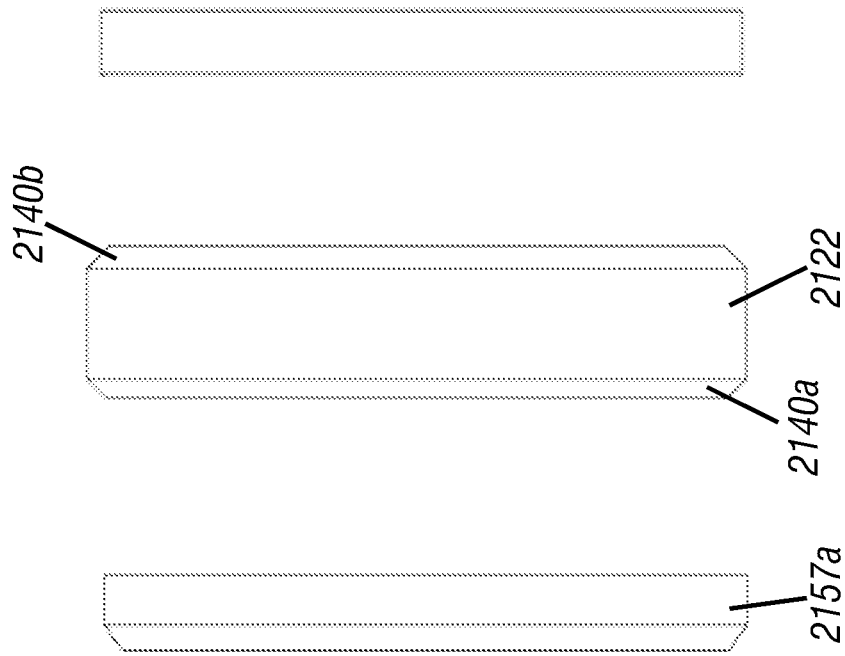
FIG. 19B shows an exploded side view of a seal element between a first and second backup ring according to embodiments of the disclosure.
Figure 19A:
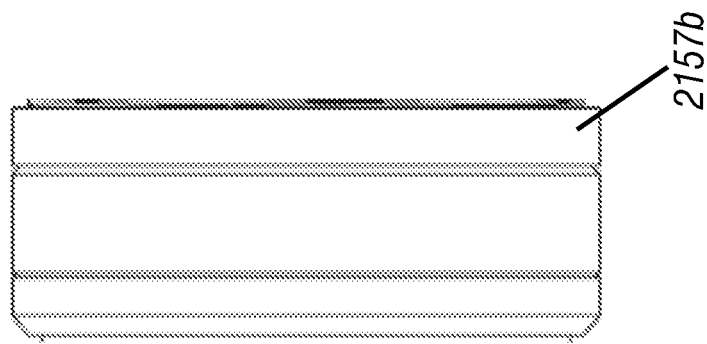
FIG. 19A shows an engaged side view of a seal element between a first and second backup ring according to embodiments of the disclosure.

Referring now to FIGS. 19A and 19B together, an engaged side view and an exploded side view, respectively, of a seal element between a first and second backup ring, in accordance with embodiments disclosed herein, are shown.

The seal element 2122 may be made of an elastomeric and/or poly material, such as rubber, nitrile rubber, Viton or polyurethane, and may be configured for positioning or otherwise disposed around the mandrel (e.g., 214, FIG. 2C). In an embodiment, the seal element 322 may be made from 75 to 80 Duro A elastomer material. The seal element 322 may be disposed between a first backup ring 2157*a* and a second backup ring 2157*b*. In a similar manner, the backup rings 2157*a,b* may be made of an elastomeric and/or poly material, such as rubber, nitrile rubber, Viton or polyurethane. In an embodiment, the backup rings 2157*a,b* may be made from 75 to 80 Duro A elastomer material. In an embodiment, the backup rings 2157*a,b* may be made from PEEK, Teflon, or nylon type material.

The seal element 2122 may be configured to buckle (deform, compress, etc.), such as in an axial manner, during the setting sequence of the downhole tool (202, FIG. 2C). However, although the seal element 2122 may buckle, the seal element 2122 may also be adapted to expand or swell, such as in a radial manner, into sealing engagement with the surrounding upon compression of the tool components. In aspects, the seal element 2122 may be suitable to provide a fluid-tight seal of the seal surface against the tubular. The seal element 322 may be configured with an inner circumferential groove (2123, FIG. 14C).

The seal element 2122 may have one or more angled surfaces configured for contact with other component surfaces proximate thereto. For example, the seal element may have angled surfaces 2140*a* and 2140*b*. Respective underside grooves (not viewable here) of the first backup ring 2157*a* and the second backup ring 2157*b* may be configured for mating with the angled surfaces 2140*a* and 2140*b*.

Figure 20B:
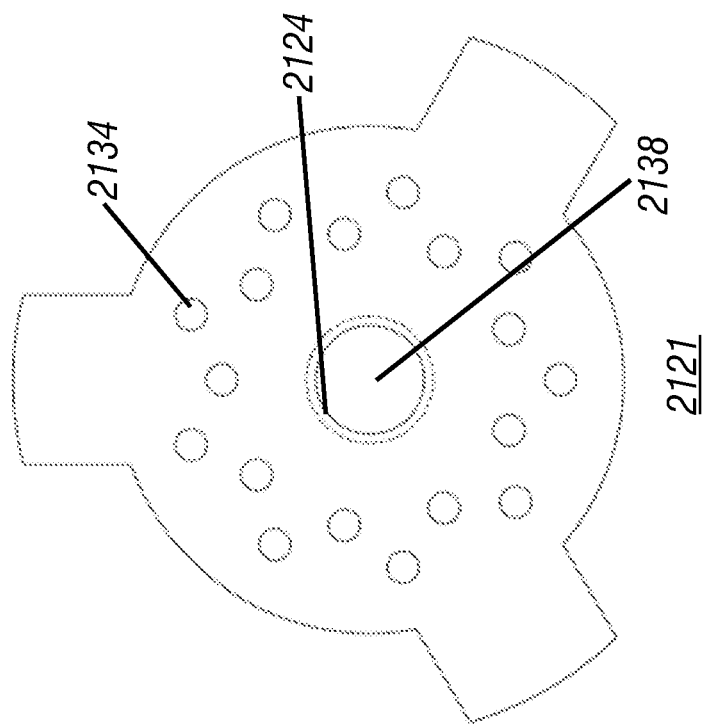
FIG. 20B shows a lateral side view of the support platform of FIG. 20A according to embodiments of the disclosure.
Figure 20A:
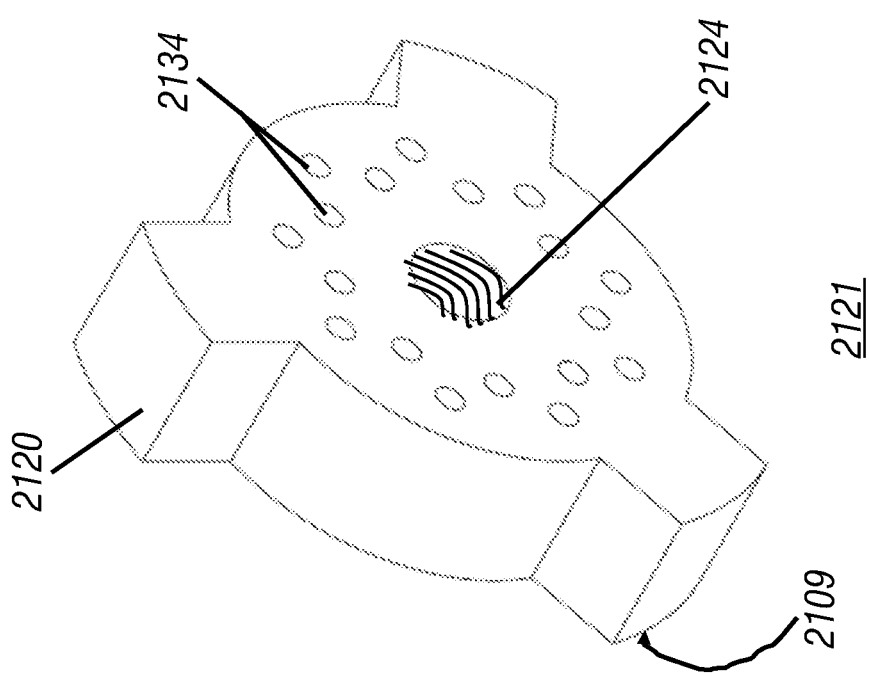
FIG. 20A shows an isometric view of a support platform according to embodiments of the disclosure.

Referring now to FIGS. 20A and 20B together, an isometric view and a lateral side view of a support platform usable with a downhole tool, in accordance with embodiments disclosed herein, are shown. The support plate 2121 may be a generally round shaped component configured for engagement into the wedge mandrel (2114).

During setting, the support plate 2121 will be pulled as a result of its attachment to the setting tool (via elongated shaft 2153). As the support plate 2121 is pulled, the components disposed about the wedge mandrel between the may further compress against one another.

In embodiments, the support plate 2121 may be made of dissolvable aluminum-, magnesium-, or aluminum-magnesium-based (or alloy, complex, etc.) material, such as that provided by Nanjing Highsur Composite Materials Technology Co. LTD. Just the same, the support plate 2121 may be made of reactive composite material formed from an initial mixture composition of embodiments herein. As another example, the ball seat may be made of a metal material like that produced by Bubbletight, LLC of Needville, Tex., as would be apparent to one of skill in the art, including fresh-water reactive composite metal, ambient-temperature fresh-water reactive composite metal, ambient-temperature fresh-water reactive elastomeric polymer, and high-strength brine-degradable reactive metal.

Generally speaking, the material of support plate 2121 may be configured to react. The time to react from start to finish (i.e., to the point where the support plate no longer has a durable engagement with the wedge mandrel—compare 22C with 22D) may be in the range of about 3 hours to about 48 hours.

The support plate 2121 may be configured to include one or more holes 2134 formed therein. Although not meant to be limited to any particular number, shape, orientation, or size, the holes 2134 may be longitudinal in orientation through the plate 2121. The presence of one or more holes 2134 may result in the surface(s) of the support plate 2121 having greater exposure to the fluid that promotes reactivity of the material. One or more holes 2134 may extend entirely through the ball seat insert. However, other holes 2134 may only extend to a certain depth. The holes 2134 may be optimized to promote the most surface contact, yet at the same time not detract from the durability of the support plate 2121.

The support plate 2121 may have a plate hollow or bore 2138, which may be suitable for the adapter shaft (2153) to fit and engage therein. Accordingly, the support plate 2121 may have a set of plate threads 2124. The plate threads 2124 may be configured to mate with corresponding threads (i.e., 2156) of the elongated setting tool adapter shaft 2153. Although not meant to be limited, the threads 2124 may be shear threads.

The body of the support plate may include one or more protruding member or dogs 2120. As shown there may be about three dogs 2120. An uphole side 2109 of the dogs may be engaged with an end of a fingered member (see FIG. 22B, end 2174*a* engaged with uphole side 2109).

Figure 21B:
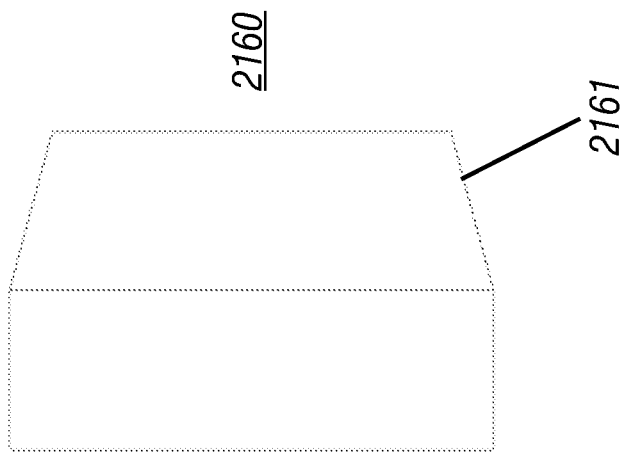
FIG. 21B shows a longitudinal side view of the lower sleeve of FIG. 21A according to embodiments of the disclosure.
Figure 21A:
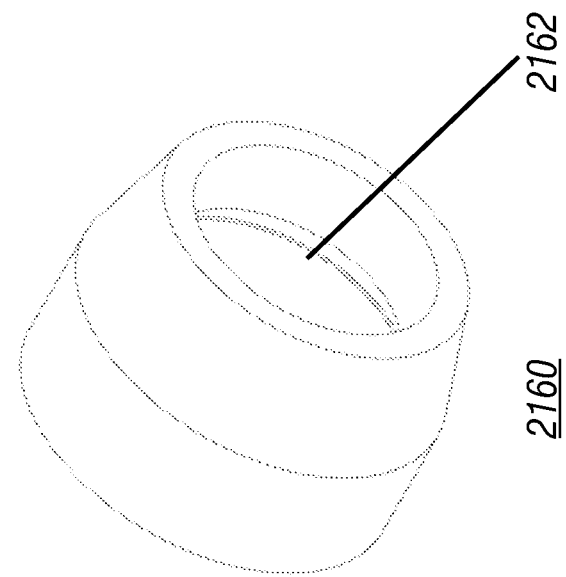
FIG. 21A shows an isometric view of a lower sleeve according to embodiments of the disclosure.

Referring now to FIGS. 21A and 21B together, an isometric view and a longitudinal side view of a lower sleeve usable with a downhole tool, in accordance with embodiments disclosed herein, are shown. The lower sleeve 2160 may be a generally round shaped component configured for engagement into the wedge mandrel (2114). The lower sleeve 2160 may be made of filament wound composite material. In other embodiments, the lower sleeve 2160 may be made of a reactive material, such as that described herein.

The lower sleeve 2160 may be in threaded engagement with the mandrel 214 by virtue of the coupling of mandrel threads (2117) and sleeve threads 2162. The lower sleeve 2160 may have one or more tapered surfaces 361, 361A which may reduce chances of hang up on other tools. The lower sleeve 360 may also have an angled sleeve end 363 in engagement with, for example, the first slip (234, FIG. 2C).

Although not shown here, one or more anchor pins may be disposed or securely positioned laterally through the lower sleeve 2160 and into engagement with the wedge mandrel. In an embodiment, brass set screws may be used. Pins (or screws, etc.) may prevent shearing or spin off during drilling.

Figure 22A:
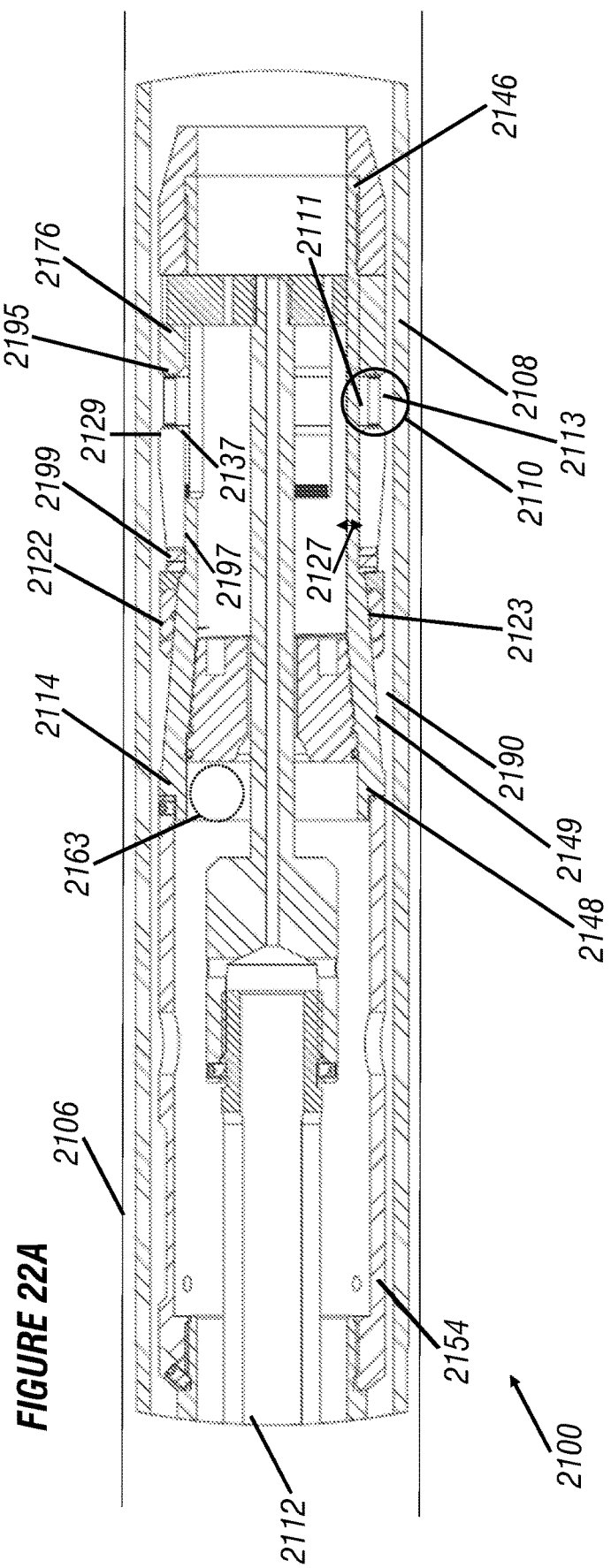
FIG. 22A shows a longitudinal cross-sectional view of a system having downhole tool run to a location within a tubular according to embodiments of the disclosure.
Figure 22B:
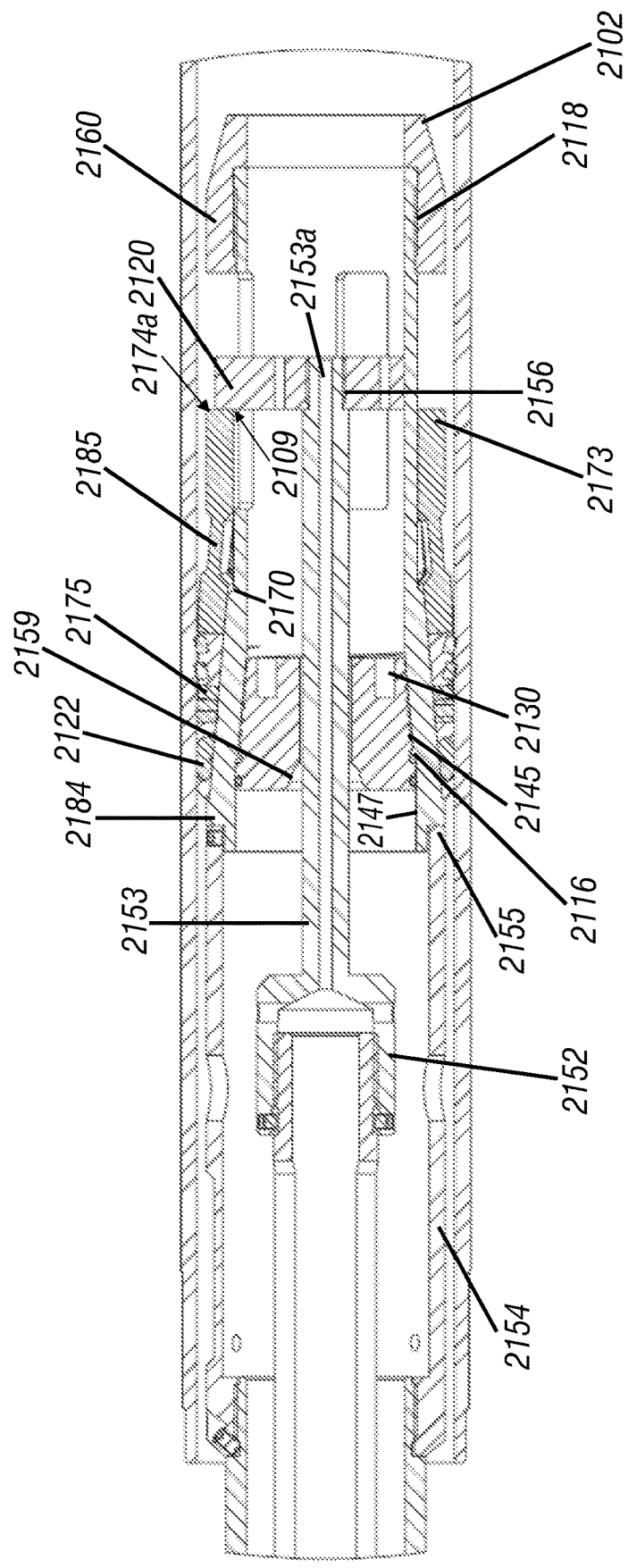
FIG. 22B shows a longitudinal side cross-sectional view of the downhole tool of FIG. 22A moved to a set position according to embodiments of the disclosure.
Figure 22D:
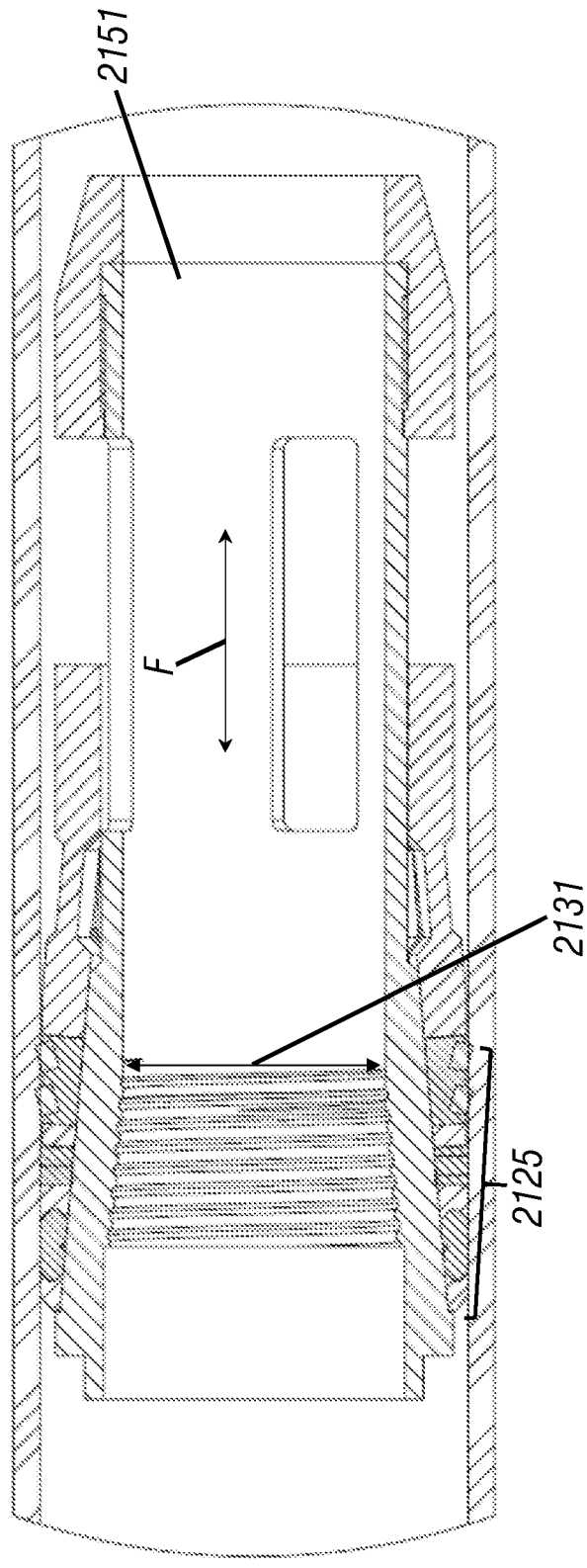
FIG. 22D shows a longitudinal side cross-sectional view of the downhole tool of FIG. 22A having various internal components removed therefrom according to embodiments of the disclosure.

Referring now to FIGS. 22A, 22B, 22C, and 22D together, a longitudinal cross-sectional view of a system having downhole tool run to a location within a tubular, a longitudinal side cross-sectional view of the downhole tool of FIG. 22A moved to a set position, a longitudinal side cross-sectional view of the downhole tool of FIG. 22A set in a tubular and separated from a workstring, and a longitudinal side cross-sectional view of a the downhole tool of FIG. 22A having various internal components removed therefrom, respectively, in accordance with embodiments disclosed herein, are shown.

System 2100 may include a wellbore 2106 formed in a subterranean formation with a tubular 2108 disposed therein. A workstring 2112 (shown only partially here and with a general representation, and which may include a part of a setting tool or device coupled with adapter 2152) may be used to position or run the downhole tool 2102 into and through the wellbore 2106 to a desired location.

The downhole tool 2102 may be configured, assembled, run, set, and usable in a similar manner to tool embodiments described herein and in other embodiments (such as in System 200, and so forth), and as otherwise understood to one of skill in the art. Components of the downhole tool 2102 may be arranged and disposed about a wedge mandrel 2114, as described herein and comparable to other embodiments, and as otherwise understood to one of skill in the art. Thus, downhole tool 2102 may be comparable or identical in aspects, function, operation, components, etc. as that of other tool embodiments disclosed herein.

The wedge mandrel 2114 may be made of a material as described herein and in accordance with embodiments of the disclosure, such as a composite filament wound material made by the Applicant. The wedge mandrel 2114 may be made other materials, such as a metallic material, for example, an aluminum-based, magnesium-based, or aluminum-magnesium-based material. The metallic material may be reactive, such as dissolvable, which is to say under certain conditions that wedge mandrel 2114 may begin to dissolve, and thus alleviating the need for drill thru. Just the same, the wedge mandrel may be made of reactive composite material formed from an initial mixture composition of embodiments herein.

Downhole tool 2102 may include a lower sleeve 2160 disposed around the wedge mandrel 2114. The lower sleeve 2160 may be threadingly engaged with the mandrel 2114. As a support platform 2121 is pulled in tension, various components disposed about mandrel 2114 between the support platform 2121 and a setting sleeve (2154, FIG. 22A) may begin to compress against one another. This force and resultant movement may ultimately cause compression and expansion of a seal element 2122.

Additional tension or load may be applied to the tool 2102 that results in movement of the wedge mandrel 2114 against a fingered member 2176. Accordingly, via interaction with angled surfaces of each other, one or more ends 2175 of the fingered member 2176 may be urged radially outward and into engagement with tubular 2108. The fingered member 2176 may be movingly (such as slidingly) engaged and disposed around the wedge mandrel 2114.

The setting sleeve 2154 may engage against a shoulder 2184 of the wedge mandrel 2114, which may accommodate to or provide ability for the transfer load through the rest of the tool 2102. The setting sleeve may be a grooved setting sleeve in accordance with embodiments herein.

Although many configurations are possible, the fingered member 2176 may generally have a circular body (or ring shaped) portion 2195 configured for positioning on or disposal around the wedge mandrel 2114. Extending from the circular body portion may be two or more fingers (dogs, protruding members, etc.) 2177. In the assembled tool configuration, the fingers 2177 may be referred to as facing "uphole" or toward the top (proximate end) of the tool 2102.

The fingered member 2176 may include a plurality of fingers 2177. In embodiments, there may be a range of about 6 to about 12 fingers 2177. The fingers 2177 may be configured symmetrically and equidistantly to each other. As the fingers 2177 are urged outwardly they may provide a synergistic effect of centralizing the downhole tool 2102, which may be of greater benefit in situations where the surrounding tubular has a horizontal orientation.

During setting, the fingered member 2176 (including fingers 2177, with respective underside 2197) may be urged along a proximate surface 2149 (or vice versa, the proximate surface 2149 may be urged against an underside of the fingered member 2176). The proximate surface 2149 may be an angled surface or taper of wedge mandrel 2114. Other components may be positioned proximate to the underside (or end 2175) of fingered member 2175, such as an insert 2199. As the fingered member 2176 and the surface 2149 are urged together, the fingers 2177 may be resultantly urged radially outward toward the inner surface of the tubular 2108. One or more ends 2175 of corresponding fingers 2177 may eventually come into contact with the tubular (such as at contact point 2186). Ends 2175 (of fingers) may be configured (such as by machining) with an end taper. The ends 2175 of the fingers 2177 may have surface area contact with the tubular 2108, as illustrated by a length 2189 of contact surfaces (proximate to contact point 2186).

The surface 2149 may be smooth and conical in nature, which may result in smooth, linear engagement with the fingered member 2176. The angled surface 2149 may transition to a more or less axial surface 2149a (i.e., a surface that is about parallel to a longitudinal axis 2158).

In aspects, the outer surface of the wedge mandrel 2114 may be configured with a detent (or notch) 2170, approximately at the transition point from angled surface 2149 to axial surface 2149a. In the assembled position, the ends 2175 of the fingers 2177 may reside or be positioned within or proximate to the detent 2170. The arrangement of the ends 2175 within the detent 2170 may prevent inadvertent operation of the fingered member 2176. In this respect, a certain amount of setting force is required to "bump" the ends of the fingers 2177 out of and free of the detent 2170 so that the fingered member 2176 and the surface 2149 can be urged together, and the fingers 2177 extended outwardly. As shown, the insert 2199 may be directly proximate to the detent 2170, and thus inbetween the detent 2170 and the finger ends 2177. In this respect, a certain amount of setting force is required to "bump" the insert 2199 out of and free of the detent 2170 so that it may be urged along the surface 2149.

The fingered member 2176 may be referred to as having a "transition zone" 2110, essentially being the part of the member where the fingers 2177 begin to extend away from the body 2195. In this respect, the fingers 2177 are connected to or integral with the body 2195. In operation as the fingers 2177 are urged radially outward, a flexing (or partial break or fracture) may occur within the transition zone 2110. The transition zone 2110 may include an outer surface 2137 and inner surface 2129. The outer surface 2137 and inner surface 2129 may be separated by a portion or amount of material 2185. The fingered member 2176 may be configured so that the flexing, break or fracture occurs within the material 2185. Flexing or fracture may be induced within the material as a result of one or more grooves. For example, the inner surface 2137 may have a first finger groove 2111. The outer surface 2137 may in addition or alternatively have a finger groove, such as a second finger groove 2113.

The presence of the material 2185 may provide a natural "hinge" effect whereby the fingers 2177 become moveable from the body (ring) 2195, such as when the fingered member 2176 is urged against surface 2149. After setting one or more fingers 2177 may remain at least partially connected with body 2195 in the transition zone 2110. The presence of the material 2185 may promote uniform flexing of the fingers 2177. The length of the fingers 2177 and/or amount of material 2185 are operational variables that may be modified to suit a particular need for a respective annulus size.

As shown in the Figures, the downhole tool 2102 may include other components, such as the seal element 2122. The seal element 2122 may be made of an elastomeric and/or poly material, such as rubber, nitrile rubber, Viton or polyurethane, and may be configured for positioning or otherwise disposed around the wedge mandrel 2114. The seal element 2122 may have an inner circumferential groove 2123. The presence of the groove 2123 may assist the seal element 2122 to initially buckle upon start of the setting sequence. The groove 2123 may have a size (e.g., width, depth, etc.) of about 0.25 inches.

On either side of the seal element may be a backup ring. As shown there may be a first backup ring 2157a and a second backup ring 2157b. In the assembled configuration, the insert 2199 may be positioned between the ends 2175 of the fingers 2177 and the second backup ring 2157b.

The fingers 2177 may have a respective gripper insert 2191 fitted or otherwise disposed therein. Although not limited to any particular number, type or size, there may be a respective gripper insert 2191 disposed in the finger(s) 2177. The gripper insert 2191 may be positioned within a window (or hole, opening, etc.) formed in any respective finger 2177. In this respect, the gripper insert 2191 may be positioned therein, wherein its underside may be proximate to the wedge mandrel outer surface.

The fingered member 2175 may have one or more recessed regions (or hole, opening, etc.) to accommodate respective dogs 2120 of the support platform 2121. Similarly, the wedge mandrel 2114 may have one or more mandrel windows 2119 also to accommodate respective dogs 2120 of the support platform.

Components of the downhole tool 2102 may be arranged and disposed about the wedge mandrel 2114, as described herein and in other embodiments, and as otherwise understood to one of skill in the art. Thus, downhole tool 2102 may be comparable or identical in aspects, function, operation, components, etc. as that of other tool embodiments provided for herein, and redundant discussion is limited for sake of brevity, while structural (and functional) differences are discussed in with detail, albeit in a non-limiting manner.

The tool 2102 may be deployed and set with a conventional setting tool (not shown) such as a Model 10, 20 or E-4

Setting Tool available from Baker Oil Tools, Inc., Houston, Tex. Once the tool 2102 reaches the set position within the tubular, the setting mechanism or workstring may be detached from the tool 2102 by various methods, resulting in the tool 2102 left in the surrounding tubular and one or more sections of the wellbore isolated.

Once the tool 2102 reaches the set position within the tubular 2108, the setting mechanism or workstring 2112 may be detached from the tool 2102 by various methods, resulting in the tool 2102 left in the surrounding tubular, whereby one or more sections of the wellbore may be isolated.

In an embodiment, once the tool 2102 is set, tension may be further applied to the setting tool/adapter 2152 until the elongated stud 2153 is detached from the support platform 2120. The amount of load applied to the adapter 2152 may cause separation (disconnect via tensile failure) in the range of about, for example, 20,000 to 40,000 pounds force. The load may be about 25,000 to 30,000 pounds force. In other applications, the load may be in the range of less than about 10,000 pounds force.

The adapter 2152 may include the stud 2153 configured with the threads thereon. In an embodiment, the stud may have external (male) threads and the wedge mandrel 2114 may have internal (female) threads; however, type or configuration of threads is not meant to be limited, and could be, for example, a vice versa female-male connection, respectively. The adapter 2152 may be made of a durable material, such as a metal or alloy like 4140 steel alloy. Although not necessary, there may be an adapter port 2153a within the stud 2153, which may be useful to provide pressure equalization. The stud 2153 may have a lateral (outer) diameter suitable enough for passing through bores 2138, 2139. In aspects, the lateral diameter may be about 1 inch. The lateral diameter may be in the range of about 0.5 inches to about 1.5 inches. The bores 2138, 2139 may have a comparable inner diameter.

Accordingly, the adapter 2152 may separate or detach from the downhole tool 2102, resulting in the workstring 2112 being able to separate from the tool 2102, which may be at a predetermined moment. The loads provided herein are non-limiting and are merely exemplary. The setting force may be determined by specifically designing the interacting surfaces of the tool and the respective tool surface angles.

Figure 22E:
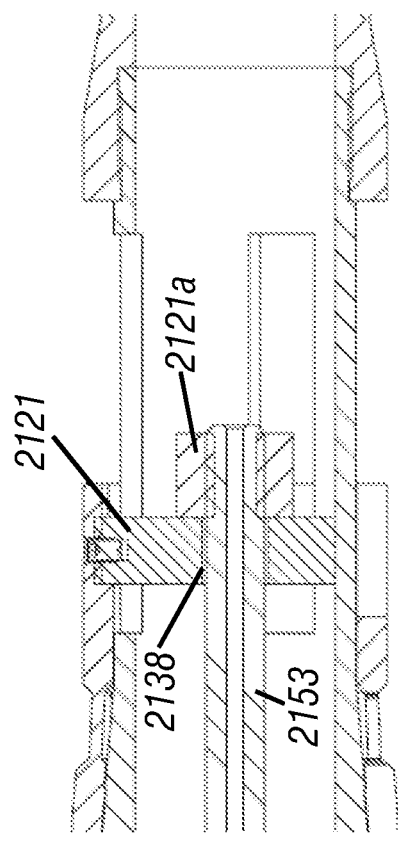
FIG. 22E shows a close-up side cross-sectional view of an alternative adapter connection to a downhole tool according to embodiments of the disclosure.

Referring briefly to FIG. 22E, a close-up side cross-sectional view of an alternative adapter connection to a downhole tool, in accordance with embodiments of the disclosure, is shown. As shown, stud 2153 may alternatively connect to a lower ring 2121a. In this respect, the stud 2153 may pass through a bore 2138 of a support plate 2121 (instead of engaging therewith) and instead threadingly engage into the lower ring 2121a. The lower ring 2121a may be made of filament wound composite material, which may be configured with shear threads. This type of configuration may be useful for predictability of shearing versus that of shearing from the metal support plate 2121.

Referring again to 22A-22D, the downhole tool 2102 may include the wedge mandrel 2114 configured with a bore 2151, and a respective inner bore surface 2147. The inner surface 2147 may include one or more threaded surfaces formed thereon. As such, there may be a first set of threads 2116 configured for coupling the wedge mandrel 2114 with corresponding threads 2145 of a ball seat insert 2135. Although not meant to be limited, each of these threads may be rounded threads.

The ball seat insert 2135 may be made of a material of embodiments herein, such as a reactive material (which may be metallic or plastic in nature). The ball seat insert 2135 may be configured to include one or more holes 2130 formed therein. Although not meant to be limited to any particular number, shape, orientation, or size, the holes 2130 may be longitudinal in orientation through the insert 2135. The presence of one or more holes 2130 may result in the surface(s) of the insert 2135 having greater exposure to the fluid that promotes reactivity of the material. One or more holes 2130 may extend entirely through the ball seat insert. However, other holes 2130 may only extend to a certain depth.

The ball seat insert 2135 may have an insert hollow or bore 2139, which may be suitable for the adapter shaft 2153 to pass therethrough. The wider end of the insert 2135 may have an insert groove, which may be generally circumferential in nature. The insert groove may be suitable for fitting an o-ring 2179 therein.

The insert 2135 may be configured with a ball seat surface 2159 such that a drop ball may come to rest and seat at in the seat. As applicable, the drop ball (not shown here) may be lowered into the wellbore and flowed toward the drop ball seat 2159. Alternatively, the ball may be held within the tool during run-in, thus alleviating the need for flowdown. The ball seat 2159 may be formed with a radius (i.e., circumferential rounded edge or surface).

The downhole tool 2102 may be run into wellbore to a desired depth or position by way of the workstring 2112 that may be configured with the setting device or mechanism. The workstring 2112 and setting sleeve 2154 may be part of the system 2100 utilized to run the downhole tool 2102 into the wellbore, and activate the tool 2102 to move from an unset (e.g., 21A) to set position (e.g., 21C). Although not meant to be limited to any particular type or configuration, the setting sleeve 2154 may be like of that other embodiments disclosed herein, such as that of FIGS. 11A-11C. Briefly, FIG. 21B illustrates how compression of a sleeve end 2155 with a should end 2184 of the wedge mandrel 2114 may occur at the beginning of the setting sequence, whereby subsequently tension may increase through the tool 2102.

Although not shown here, the downhole tool 2102 may include an anti-rotation assembly that includes an anti-rotation device or mechanism (e.g., see 282, FIGS. 2C and 2D, and related text), which may be a spring, a mechanically spring-energized composite tubular member, and so forth. The device may be configured and usable for the prevention of undesired or inadvertent movement or unwinding of the tool 2102 components.

On occasion it may be necessary or otherwise desired to produce a fluid from the formation while leaving a set plug in place. However, an inner diameter (ID) of a bore (e.g., 250, FIG. 2D) in a mandrel (214) may be too narrow to effectively and efficiently produce the fluid—thus in embodiments it may be desirous to have an oversized ID 2131 through the tool 2102. The ID of a conventional bore size is normally adequate to allow drop balls to pass therethrough, but may be inadequate for production. In order to produce desired fluid flow, it often becomes necessary to drill out a set tool—this requires a stop in operations, rig time, drill time, and related operator and equipment costs.

On the other hand, the presence of the oversized ID 2131 of bore 2151, and thus a larger cross-sectional area as compared to bore 250, provides effective and efficient production capability through the tool 2102 without the need to resort to drilling of the tool. However, a reduced wall thickness 2127 of mandrel 2114 may be problematic to the characteristics of the tool 2102, especially during the setting sequence. This may especially be the case for composite material.

As a large bore 2151 may result in reduced wall thickness 2127, this may in turn reduce tensile strength and collapse strength. As such the downhole tool 2102 may be configured in a manner to withstand the setting sequence, but yet be able to provide the oversized ID 2131.

In accordance with the disclosure, components of tool 2102 may be made of reactive materials (e.g., materials suitable for and are known to dissolve in downhole environments [including extreme pressure, temperature, fluid properties, etc.] after a brief or limited period of time (predetermined or otherwise) as may be desired). In an embodiment, a component made of a reactive material may begin to dissolve within about 3 to about 48 hours after setting of the downhole tool.

In aspects, the wedge mandrel 2114 may be made a material made from a composition described herein. The wedge mandrel 2114 may be made of a material that is adequate to provide durability and strength to the tool 2102 for a sufficient amount of time that includes run-in, setting and frac.

The downhole tool 2102 may include the wedge mandrel 2114 extending through the tool (or tool body) 2102, such that other components of the tool 2102 may be disposed therearound. The wedge mandrel 2114 may include the flowpath or bore 2151 formed therein (e.g., an axial bore). The bore 2151 may extend partially or for a short distance through the mandrel 2114, or the bore 2151 may extend through the entire wedge mandrel 2114, with an opening at its proximate end 2148 and oppositely at its distal end 2146.

The presence of the bore or other flowpath through the wedge mandrel 2114 may indirectly be dictated by operating conditions. That is, in most instances the tool 2102 may be large enough in outer diameter (e.g., in a range of about 4-5 inches) such that the bore 2151 may be correspondingly large enough (e.g., 3-4 inches) so that fluid F may be produced therethrough. One of skill would appreciate these ranges may generally be applicable to a 5.5" casing and that scale may be modified for the tool and any of its components as applicable to changes in casing ID.

As illustrated, the ball seat insert 2135 may be disposed at a depth (or length, distance, etc.) D from the proximate mandrel end 2148. The depth D may be of a distance whereby the ball seat 2159 may be proximately unaligned to where the seal element 2122 is initially positioned, as shown in FIG. 22A.

The location of the ball seat 2159 at depth D may be useful to obtain additional lateral strength once the ball 2163 rests therein. That is, significant forces are felt by the mandrel during the setting sequence, especially in the area of where the sealing element 2122 is energized, as well as pressure differential between the annulus external to the tool and the bore 2151 (in some instances the differential may be in the range about 10,000 psi). These forces may be transferred laterally through the wedge mandrel 2114, and since the mandrel 2114 may have a limited wall thickness 2127, there exists the possibility of collapse; however, the ball 2163, in conjunction with the ball seat insert 2135, may provide added strength and reinforcement in the lateral direction.

FIG. 22C illustrates how, upon setting, the ball 2163 may be urged against the ball seat 2159. In embodiments, a middle region of the energized sealing element 2122 may be substantially laterally proximate to a middle ball section of the ball 2163. Thus, the seal element 2122 may be movable along surface 2149.

The amount of pressure required to urge and wedge the ball 2163 against the ball seat 2159 may be predetermined. Thus, the size of the ball 2163 (e.g., ball diameter 2132), ball seat 2159, and radius (2159a) may be designed, as applicable.

The ball seat 2159 may be configured in a manner so that when 2163 seats therein, a flowpath through the wedge mandrel may be closed off (e.g., flow through the bore is restricted by the presence of the ball). The ball 2163 may be made of a composite material, whereby the ball 2163 may be capable of holding maximum pressures during downhole operations (e.g., fracing). In aspects, the ball 2163 may be made of a reactive material of embodiments herein. FIG. 22A illustrates how the downhole tool 2102 may have a 'ball in place' configuration, whereby the ball is disposed within the tool during setup, and thus alleviating the need for flowdown. Upon removable of the shaft 2153 from the insert bore 2139, the ball 2163 will be free to move into the seat 2159.

The support plate 2121 may be a generally round shaped component configured for engagement into the wedge mandrel 2114. During setting, the support plate 2121 will be pulled as a result of its attachment to the setting tool (via elongated shaft 2153). As the support plate 2121 is pulled, the components disposed about the wedge mandrel 2114 and between the support plate 2121 and end 2155 of setting sleeve 2154 may further compress against one another.

In embodiments, the support plate 2121 may be made of a material of embodiments herein, such as a reactive material (which may be metallic or plastic in nature). Generally speaking, the material of support plate 2121 may be configured to react. The time to react from start to finish (i.e., to the point where the support plate no longer has a durable engagement with the wedge mandrel 2114 may be in the range of about 3 hours to about 48 hours.

The support plate 2121 may be configured to include one or more holes 2134 formed therein. Although not meant to be limited to any particular number, shape, orientation, or size, the holes 2134 may be longitudinal in orientation through the plate 2121. The presence of one or more holes 2134 may result in the surface(s) of the support plate 2121 having greater exposure to the fluid that promotes reactivity of the material. One or more holes 2134 may extend entirely through the ball seat insert. However, other holes 2134 may only extend to a certain depth. The holes 2134 may be optimized to promote the most surface contact, yet at the same time not detract from the durability of the support plate 2121.

The support plate 2121 may have a plate hollow or bore 2138, which may be suitable for the adapter shaft (2153) to fit and engage therein. Accordingly, the support plate 2121 may have a set of plate threads 2124. The plate threads 2124 may be configured to mate with corresponding threads (i.e., 2156) of the elongated setting tool adapter shaft 2153. Although not meant to be limited, the threads 2124 may be shear threads.

The body of the support plate may include one or more protruding member or dogs 2120. As shown there may be about three dogs 2120. In the assembled configuration, an uphole side 2109 of the dogs 2120 may be engaged with an end surface 2174a of a downhole end 2173 of the fingered member 2176.

It should be apparent to one of skill in the art that the tool 2102 of the present disclosure may be configurable as a frac plug, a drop ball plug, bridge plug, etc. simply by utilizing one of a plurality of adapters or other optional components. In any configuration, once the tool 2102 is properly set, fluid pressure may be increased in the wellbore 2106, such that further downhole operations, such as fracture in a target zone, may commence.

The downhole tool 2102 may have one or more components made from drillable composite material(s), such as glass fiber/epoxy, carbon fiber/epoxy, glass fiber/PEEK, carbon fiber/PEEK, etc. Other resins may include phenolic, polyamide, etc. The downhole tool 2102 may have one or more components made of non-composite material, such as a metal or metal alloys. The downhole tool 2102 may have one or more components made of a reactive material (e.g., dissolvable, degradable, etc.).

Accordingly, components of tool 2102 may be made of non-dissolvable materials (e.g., materials suitable for and are known to withstand downhole environments [including extreme pressure, temperature, fluid properties, etc.] for an extended period of time (predetermined or otherwise) as may be desired).

Just the same, one or more components of a tool of embodiments disclosed herein may be made of a reactive material (e.g., a material suitable for and known to dissolve, degrade, etc. in downhole environments [including extreme pressure, temperature, fluid properties, etc.] after a brief or limited period of time (predetermined or otherwise) as may be desired). In an embodiment, a component of the downhole tool made of a reactive material may begin to react within about 3 to about 48 hours after setting of the downhole tool 2102.

The reactive material may be formed from an initial or starting mixture composition that may include about 100 parts by weight base resin system that comprises an epoxy with a curing agent (or 'hardener'). The final composition may be substantially the same as the initial composition, subject to differences from any reaction during curing.

The base resin may be desirably prone to break down in a high temp and/or high pressure aqueous environment. The epoxy may be a cycloaliphatic epoxy resin with a low viscosity and a high glass transition temperature. The epoxy may be characterized by having high adhesability with fibers. As an example, the epoxy may be 3,4-epoxycyclohexylmethyl-3',4'-epoxycyclohexane-carboxylate.

The hardener may be an anhydride, i.e., anhydride-based. For example, the curing agent may be a methyl carboxylic, such as methyl-5-norborene-2, 3-dicarboxylic anhydride. The hardener may include, and be pre-catalyzed with, an accelerator. The accelerator may be imidazole-based.

The accelerator may help in saving or reducing the curing time.

The ratio of epoxy to curing agent may be in the range of about 0.5 to about 1.5. In more particular aspects, the ratio may be about 0.9 to about 1.0.

Processing conditions of the base resin system may include multiple stages of curing.

The composition may include an additive comprising a clay. The additive may be a solid in granular or powder form. The additive may be about 0 to about 30 parts by weight of the composition of a montmorillonite-based clay. In aspects, the clay may be about 0 to about 20 parts by weight of the composition. The additive may be an organophilic clay.

An example of a suitable clay additive may be CLAYTONE® APA by BYK Additives, Inc.

The composition may include a glass, such as glass bubbles or spheres (including microspheres and/or nanospheres). The glass may be about 0 to about 20 parts by weight of the composition. In aspects, the glass may be about 5 to about 15 parts by weight of the composition.

An example of a suitable glass may be 3M Glass Bubbles 342XHS by 3M.

The composition may include a fiber. The fiber may be organic. The fiber may be a water-soluble fiber. The fiber may be in the range of about 0 to about 30 parts by weight of the composition. In aspects, the fiber may be in the range of about 15 to about 25 parts by weight.

The fiber may be made of a sodium polyacrylate-based material. The fiber may resemble a thread or string shape. In aspects, the fiber may have a fiber length in the range of about 0.1 mm to about 2 mm. The fiber length may be in the range of about 0.5 mm to about 1 mm. The fiber length may be in the range of substantially 0 mm to about 6 mm.

The fiber may be a soluble fiber like EVANESCE™ water soluble fiber from Technical Absorbents Ltd.

The composition is subjected to curing in order to yield a finalized product. A device of the disclosure may be formed during the curing process, or subsequently thereafter. The composition may be cured with a curing process of the present disclosure.

In other embodiments, components may be made of a material that may have brittle characteristics under certain conditions. In yet other embodiments, components may be made of a material that may have disassociatable characteristics under certain conditions.

One of skill in the art would appreciate that the material may be the same material and have the same composition, but that the physical characteristic of the material may change, and thus depend on variables such as curing procedures or downhole conditions.

The material may be a resin. The resin may be an anhydride-cured epoxy material. It may be possible to use sodium polyacrylate fiber in conjunction therewith, although any fiber that has dissolvable properties associated with it Advantages.

Embodiments herein provide for the ability to produce fluids, such as water, oil, other hydrocarbons, gaseous or liquidous, without having to drill out or remove an isolation tool. This saves time, reduces cost, and allows production to commence, without having to wait on a rig.

Embodiments of the downhole tool are smaller in size, which allows the tool to be used in slimmer bore diameters. Smaller in size also means there is a lower material cost per tool. Because isolation tools, such as plugs, are used in vast numbers, and are generally not reusable, a small cost savings per tool results in enormous annual capital cost savings.

A synergistic effect is realized because a smaller tool means faster drilling time is easily achieved. Again, even a small savings in drill-through time per single tool results in an enormous savings on an annual basis.

Advantageously, the configuration of components, and the resilient barrier formed by way of the composite member results in a tool that can withstand significantly higher pressures. The ability to handle higher wellbore pressure results in operators being able to drill deeper and longer wellbores, as well as greater frac fluid pressure. The ability to have a longer wellbore and increased reservoir fracture results in significantly greater production.

Embodiments of the disclosure provide for the ability to remove the workstring faster and more efficiently by reducing hydraulic drag.

As the tool may be smaller (shorter), the tool may navigate shorter radius bends in well tubulars without hanging up and presetting. Passage through shorter tool has lower hydraulic resistance and can therefore accommodate higher fluid flow rates at lower pressure drop. The tool may accommodate a larger pressure spike (ball spike) when the ball seats.

The composite member may beneficially inflate or umbrella, which aids in run-in during pump down, thus reducing the required pump down fluid volume. This constitutes a savings of water and reduces the costs associated with treating/disposing recovered fluids.

One piece slips assembly may be resistant to preset due to axial and radial impact allowing for faster pump down speed. This further reduces the amount of time/water required to complete frac operations.

While preferred embodiments of the disclosure have been shown and described, modifications thereof can be made by one skilled in the art without departing from the spirit and teachings of the disclosure. The embodiments described herein are exemplary only, and are not intended to be limiting. Many variations and modifications of embodiments disclosed herein are possible and are within the scope of the disclosure. Where numerical ranges or limitations are expressly stated, such express ranges or limitations should be understood to include iterative ranges or limitations of like magnitude falling within the expressly stated ranges or limitations. The use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the preferred embodiments of the present disclosure. The inclusion or discussion of a reference is not an admission that it is prior art to the present disclosure, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

What is claimed is:

1. A downhole tool suitable for use in a wellbore, the tool comprising:
    a wedge mandrel made of a composite filament wound material, the wedge mandrel further comprising:
        a distal end; a proximate end; an outer surface; and an inner flowbore extending through the wedge mandrel from the proximate end to the distal end, wherein the inner flowbore comprises a first set of threads at the distal end and a second set of threads at the proximate end;
    a fingered member disposed around the wedge mandrel;
    a seal element disposed around the wedge mandrel;
    an insert positioned between the fingered member and the seal element, and in proximity with an end of the fingered member;
    a ball seat insert made of a reactive metal-based material, the ball seat insert disposed in the inner flowbore and engaged with the first set of threads;
    a support platform disposed in the inner flowbore and engaged with the second set of threads; and
    a lower sleeve disposed around and engaged with the outer surface of wedge mandrel at the distal end,
    wherein the wedge mandrel further comprises a plurality of lateral windows configured for a plurality of respective support platform dogs to movingly engage therein, and wherein the fingered member also comprises a plurality of recessed regions configured for the plurality of respective support platform dogs to engage therein.

2. The downhole tool of claim 1, wherein the wedge mandrel further comprises an inner flowbore diameter in the range of 1.5 inches to 4 inches, wherein the ball seat insert comprises a ball seat formed therein, and a ball seat bore having an inner diameter in the range of 0.5 inches to 1.5 inches.

3. The downhole tool of claim 2, wherein upon setting of the downhole tool and pressurization via a ball positioned in the ball seat results in a middle of the ball being laterally proximate to a middle of the seal element.

4. The downhole tool of claim 3, wherein at least one or more components of the downhole tool or the ball is made of a cured reactive material formed from an initial mixture composition comprising: a cycloaliphatic epoxy resin and an anhydride curing agent.

5. The downhole tool of claim 1, the downhole tool further comprising:
    a first backup ring engaged with a first side of the seal element;
    a second backup ring engaged with a second side of the seal element, wherein the fingered member is made from a material comprising one or more of filament wound material, fiberglass cloth wound material, and molded fiberglass composite, and wherein the fingered member further comprises:
        a circular body;
        a plurality of fingers extending from the circular body;
        a longitudinal gap formed between respective fingers; and
        a transition zone between the circular body and the plurality of fingers,
        wherein the transition zone further comprises an inner member surface and an outer member surface, wherein the inner member surface comprises a first inner member groove, and wherein the outer member surface comprises a first outer member groove.

6. The downhole tool of claim 1, wherein the wedge mandrel comprises a first outer diameter at the distal end, a second outer diameter at the proximate end, and an angled linear transition surface therebetween, and wherein the second outer diameter is larger than the first outer diameter.

7. The downhole tool of claim 1, wherein at least one or more components of the downhole tool is made of a cured reactive material formed from an initial mixture composition comprising: a cycloaliphatic epoxy resin and an anhydride curing agent.

8. The downhole tool of claim 1, wherein the fingered member is made of composite filament wound material, and further comprises:
    a circular body; and
    a plurality of fingers extending from the circular body, at least one of the plurality of fingers comprising a gripper insert disposed therein.

9. The downhole tool of claim 8, wherein the gripper insert is made of metal, and is surface hardened by way of an induction process resulting in a gripper outer surface Rockwell hardness in the range of 40 to 60, and a gripper inner surface Rockwell hardness in the range of 10 to 25.

10. The downhole tool of claim 8, wherein the downhole tool is selected from a group consisting of a frac plug and a bridge plug, wherein the insert comprises a circular body, a first end, a second end, and a helical winding groove formed in the circular body between the first end and the second end, and wherein at least one or more components of the downhole tool is made of a reactive material formed from an initial mixture composition comprising: a cycloaliphatic epoxy resin and an anhydride curing agent.

11. A downhole tool for use in a wellbore, the tool comprising:
   a wedge mandrel further comprising:
      a distal end; a proximate end; an outer surface; and a flowbore extending through the wedge mandrel from the proximate end to the distal end,
   a fingered member disposed around the wedge mandrel;
   a seal element disposed around the wedge mandrel; and
   an insert positioned between the fingered member and the seal element, and in proximity with an end of the fingered member;
   a ball seat insert made of a reactive material, the ball seat insert disposed in the flowbore at the proximate end, and engaged with an inner surface of the flowbore;
   a support platform disposed in the flowbore at the distal end, and engaged with the inner surface; and
   a lower sleeve disposed around and engaged with the outer surface of wedge mandrel at the distal end,
   wherein the wedge mandrel further comprises a plurality of lateral windows configured for a plurality of respective support platform dogs to movingly engage therein, and wherein the fingered member also comprises a plurality of recessed regions configured for the plurality of respective support platform dogs to engage therein.

12. The downhole tool of claim 11, wherein the flowbore comprises an inner flowbore diameter in the range of 1.5 inches to 4 inches, wherein the ball seat insert comprises a ball seat formed therein, and a ball seat bore having an inner ball seat bore diameter in the range of 0.5 inches to 1.5 inches, and wherein the support platform comprises a support platform bore having an inner support platform bore diameter in the range of 0.5 inches to 1.5 inches.

13. The downhole tool of claim 12, wherein upon setting of the downhole tool and pressurization via a ball positioned in the ball seat results in a middle of the ball being laterally proximate to a middle of the seal element.

14. The downhole tool of claim 11, the downhole tool further comprising:
   a first backup ring engaged with a first side of the seal element;
   a second backup ring engaged with a second side of the seal element, wherein the fingered member further comprises:
      a circular body;
      a plurality of fingers extending from the circular body;
      a longitudinal gap formed between respective fingers; and
      a transition zone between the circular body and the plurality of fingers,
      wherein the transition zone further comprises an inner member surface and an outer member surface, wherein the inner member surface comprises a first inner member groove, and wherein the outer member surface comprises a first outer member groove.

15. The downhole tool of claim 11, wherein at least one or more components of the downhole tool is made of a cured reactive material formed from an initial mixture composition comprising: a cycloaliphatic epoxy resin and an anhydride curing agent.

16. The downhole tool of claim 11, wherein the wedge mandrel comprises a first outer diameter at the distal end, a second outer diameter at the proximate end, wherein the outer surface comprises an axially linear surface, an axially angled surface and a detent formed therebetween, wherein the second outer diameter is larger than the first outer diameter.

17. The downhole tool of claim 16, wherein the fingered member is made of composite filament wound material, and further comprises:
   a circular body; and
   a plurality of fingers extending from the circular body, at least one of the plurality of fingers comprising a gripper insert disposed therein.

18. The downhole tool of claim 17, wherein the gripper insert is made of metal, and is surface hardened resulting in a gripper outer surface Rockwell hardness in the range of 40 to 60, and a gripper inner surface Rockwell hardness in the range of 10 to 25, wherein the insert comprises a circular body, a first end, a second end, and a helical winding groove formed in the circular body between the first end and the second end.

19. A method of operating a downhole tool in order to isolate one or more sections of a wellbore, the method comprising:
   using a workstring to run the downhole tool into the wellbore to a desired position, the downhole tool comprising:
      a wedge mandrel further comprising:
         a distal end; a proximate end; an outer surface; and a flowbore extending through the wedge mandrel from the proximate end to the distal end;
      a fingered member disposed around the wedge mandrel;
      a seal element disposed around the wedge mandrel;
      a ball seat insert made of a reactive material, the ball seat insert disposed in the flowbore at the proximate end, and engaged with an inner surface of the flowbore;
      a support platform disposed in the flowbore at the distal end, and engaged with the inner surface; and
      a lower sleeve disposed around and engaged with the outer surface of wedge mandrel at the distal end;
      wherein the wedge mandrel further comprises a plurality of lateral windows configured for a plurality of respective support platform dogs to movingly engage therein, and wherein the fingered member also comprises a plurality of recessed regions configured for the plurality of respective support platform dogs to engage therein;
   actuating a setting device coupled with the downhole tool in order to set the downhole tool into at least partial engagement with a surrounding tubular;
   disconnecting the downhole tool from the setting device coupled therewith when the tensile load is sufficient to separation therefrom;
   seating a ball in a ball seat of the ball seat insert; and
   waiting an amount of time for the reactive material to react in a sufficient manner whereby a fluid may be produced through the flowbore.

20. The method of claim 19, wherein at least one component of the downhole tool or the ball is made of material made from an initial mixture composition comprising: a cycloaliphatic epoxy resin and an anhydride curing agent.

* * * * *